US012798262B2

(12) United States Patent
Aoki et al.

(10) Patent No.: US 12,798,262 B2
(45) Date of Patent: Nov. 17, 2026

(54) INK JET TEXTILE PRINTING METHOD AND SET

(71) Applicant: SEIKO EPSON CORPORATION, Tokyo (JP)

(72) Inventors: Kazuto Aoki, Shiojiri (JP); Naoki Yokoyama, Shiojiri (JP); Seiichi Matsushima, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 205 days.

(21) Appl. No.: 18/916,787

(22) Filed: Oct. 16, 2024

(65) Prior Publication Data

US 2025/0121611 A1 Apr. 17, 2025

(30) Foreign Application Priority Data

Oct. 17, 2023 (JP) ................................ 2023-178675
Mar. 28, 2024 (JP) ................................ 2024-053521

(51) Int. Cl.
*B41J 3/407* (2006.01)
*B41J 2/155* (2006.01)
*B41J 2/21* (2006.01)

(52) U.S. Cl.
CPC ............ *B41J 3/4078* (2013.01); *B41J 2/155* (2013.01); *B41J 2/2114* (2013.01)

(58) Field of Classification Search
CPC ........ B41J 3/4078; B41J 2/155; B41J 2/2114; D06P 5/30; D06P 1/5257; D06P 1/5285; D06P 1/673
See application file for complete search history.

(56) References Cited

U.S. PATENT DOCUMENTS

2022/0333301 A1* 10/2022 Ellis ...................... B41J 2/2114

FOREIGN PATENT DOCUMENTS

JP 2022-548985 A 11/2022

* cited by examiner

*Primary Examiner* — Bradley W Thies
(74) *Attorney, Agent, or Firm* — Harness, Dickey & Pierce, P.L.C.

(57) ABSTRACT

An ink jet textile printing method according to one embodiment of the present disclosure includes a reaction solution attaching step of attaching a reaction solution containing an aggregating agent that aggregates components in an ink, and water to a fabric using an ink jet method, a transparent ink attaching step of attaching a transparent ink composition containing anionic resin particles and water to a fabric using the ink jet method, and a colored ink attaching step of attaching a colored ink composition containing a pigment, resin particles, and water onto a region, to which the transparent ink composition is attached, using the ink jet method, in which the reaction solution attaching step and the transparent ink attaching step include Step 1, and in Step 1, a range of a minimum value of a total attachment amount of the reaction solution and the transparent ink composition per unit area/per unit time is 34 mg/(s·inch$^2$) or more, Step 1: applying the reaction solution and the transparent ink composition to the same region in the fabric in a single scanning of an ink jet head.

20 Claims, 12 Drawing Sheets

FIG. 4

TABLE 1

| INK TYPE | | REACTION SOLUTION 1 (CATION) | REACTION SOLUTION 2 (CATION) | REACTION SOLUTION 3 (CATION) | REACTION SOLUTION 4 (CATION) | REACTION SOLUTION 5 (CATION) | RESIN SOLUTION (ANION) | Wh INK (ANION) | Wh INK (ANION) |
|---|---|---|---|---|---|---|---|---|---|
| CLASSIFICATION | RAW MATERIAL NAME | COMPOSITION R1 | COMPOSITION R2 | COMPOSITION R3 | COMPOSITION R4 | COMPOSITION R5 | COMPOSITION G1 | COMPOSITION W1 | COMPOSITION W2 |
| AGGREGATING AGENT | LACTIC ACID | 5 | - | - | 1 | - | - | - | - |
| | MAGNESIUM SULFATE·HEPTAHYDRATE | - | 5 | - | - | - | - | - | - |
| | CALCIUM NITRATE·TETRAHYDRATE | - | - | 5 | - | - | - | - | - |
| PIGMENT | SOLID CONTENT OF TITANIUM OXIDE DISPERSION (ANIONIC RESIN DISPERSION PRODUCT) | - | - | - | - | - | - | 10 | 10 |
| RESIN PARTICLES | SOLID CONTENT CONCENTRATION OF URETHANE RESIN (TAKELAC WS-6021) | - | - | - | - | - | 10 | 10 | 10 |
| MOISTURIZER | GLYCERIN | - | - | - | - | - | - | 5 | 10 |
| pH ADJUSTER | KOH | - | - | - | 0.5 | - | - | - | - |
| ORGANIC SOLVENT | TRIETHYLENE GLYCOL | - | - | - | - | - | 5 | 5 | 5 |
| | TRIETHYLENE GLYCOL MONOBUTYL ETHER | - | - | - | - | - | 1 | 1 | 1 |
| | PROPYLENE GLYCOL | 25 | 25 | 25 | 25 | 25 | 25 | 6 | 6 |
| SURFACTANT | BYK-348 (HLB VALUE: 11) SILICON-BASED SURFACTANT | - | - | - | - | - | 0.5 | 0.5 | 0.5 |
| | OLFINE E1010 (HLB VALUE: 12) ACETYLENE-BASED SURFACTANT | 1 | 1 | 1 | 1 | 1 | - | - | - |
| SOLVENT | ION EXCHANGE WATER | BALANCE | BALANCE | BALANCE | BALANCE | BALANCE | BALANCE | BALANCE | BALANCE |
| pH OF INK | | 2-3 | 4-5 | 4-5 | 4-5 | 4-5 | 7-8 | 7-8 | 7-8 |
| VISCOSITY OF INK (mPa·s) | | 3.1 | 3.1 | 3.1 | 3.1 | 3.1 | 3.5 | 4.5 | 5.5 |
| SURFACE TENSION OF INK (mN/m) | | 33 | 33 | 33 | 33 | 33 | 24 | 24 | 24 |

FIG. 5

TABLE 2

| CLASSIFICATION | STEP a (RESIN LAYER FORMATION) | | | | | | | | | | | |
|---|---|---|---|---|---|---|---|---|---|---|---|---|
| | COMPOSITION No. OF REACTION SOLUTION | TRANSPARENT INK | Wh INK | | PRINTING AREA [inc$^2$] | APPLICATION AMOUNT OF INK PER PRINTING AREA [mg] | APPLICATION AMOUNT OF INK PER PRINTING AREA AT 1 Pass OF CARRIAGE [mg] | CARRIAGE MOVEMENT SPEED [inc/s] | NUMBER OF MAIN SCANS [scans] | NUMBER OF SUB-SCANS [scans] | PER UNIT AREA/ TIME AT CR1 PASS [mg/(s·inc$^2$)] | PRINTING TIME DIFFERENCE BETWEEN REACTION SOLUTION· TRANSPARENT INK |
| | COMPOSITION | COMPOSITION | COMPOSITION | FILLING HEAD ROW | | | | | | | | |
| EXAMPLE 1 | R1 | G1 | - | - | 10 | 562 | 562 | 6 | 1 | 0 | 34 | SIMULTANEOUS |
| EXAMPLE 2 | R1 | G1 | - | - | 10 | 562 | 562 | 12 | 1 | 0 | 67 | SIMULTANEOUS |
| EXAMPLE 3 | R2 | G1 | - | - | 10 | 562 | 562 | 12 | 1 | 0 | 67 | SIMULTANEOUS |
| EXAMPLE 4 | R3 | G1 | - | - | 10 | 562 | 562 | 12 | 1 | 0 | 67 | SIMULTANEOUS |
| EXAMPLE 5 | R1 | G1 | - | - | 10 | 562 | 281 | 12 | 2 | 1 | 67 | SIMULTANEOUS |
| EXAMPLE 6 | R1 | G1 | - | - | 10 | 562 | 140 | 12 | 4 | 3 | 67 | SIMULTANEOUS |
| EXAMPLE 7 | R1 | G1 | - | - | 10 | 562 | 562 | 12 | 1 | 0 | 67 | SIMULTANEOUS |
| EXAMPLE 8 | R4 | G1 | - | - | 10 | 562 | 562 | 12 | 1 | 0 | 67 | SIMULTANEOUS |
| EXAMPLE 9 | R1 | G1 | - | - | 10 | 562 | 562 | 12 | 1 | 0 | 67 | SIMULTANEOUS |
| EXAMPLE 10 | R1 | G1 | - | - | 10 | 562 | 562 | 12 | 1 | 0 | 67 | SIMULTANEOUS |
| EXAMPLE 11 | R1 | G1 | W1 | E/F/G/H | 10 | 562 | 562 | 12 | 1 | 0 | 67 | SIMULTANEOUS |
| EXAMPLE 12 | R1 | G1 | - | - | 10 | 562 | 562 | 24 | 1 | 0 | 135 | SIMULTANEOUS |
| EXAMPLE 13 | R1 | G1 | - | - | 10 | 562 | 562 | 40 | 1 | 0 | 225 | SIMULTANEOUS |
| COMPARATIVE EXAMPLE 1 | R1 | G1 | - | - | 10 | 562 | 562 | 4 | 1 | 0 | 22 | SIMULTANEOUS |
| COMPARATIVE EXAMPLE 2 | R2 | G1 | - | - | 10 | 562 | 562 | 4 | 1 | 0 | 22 | SIMULTANEOUS |
| COMPARATIVE EXAMPLE 3 | R3 | G1 | - | - | 10 | 562 | 562 | 4 | 1 | 0 | 22 | SIMULTANEOUS |
| COMPARATIVE EXAMPLE 4 | R1 | G1 | - | - | 10 | 562 | 562 | 12 | 2 | 0 | 67 | APPLICATION OF TRANSPARENT INK AFTER 30 SECONDS FROM REACTION SOLUTION PRINTING |
| COMPARATIVE EXAMPLE 5 | R1 | - | - | - | 10 | 562 | 562 | 12 | 1 | 0 | 67 | - |
| COMPARATIVE EXAMPLE 6 | - | - | - | - | - | - | - | - | - | - | - | - |

FIG. 6

TABLE 3

| CLASSIFICATION | STEP b (Wh INK LAYER FORMATION) | | | | | | | | | |
|---|---|---|---|---|---|---|---|---|---|---|
| | REACTION SOLUTION | Wh INK | PRINTING AREA [inc$^2$] | APPLICATION AMOUNT OF INK PER PRINTING AREA [mg] | APPLICATION AMOUNT OF INK PER PRINTING AREA AT 1 Pass OF CARRIAGE [mg] | CARRIAGE MOVEMENT SPEED [inc/s] | NUMBER OF MAIN SCANS [scans] | NUMBER OF SUB-SCANS [scans] | PER UNIT AREA/ TIME AT CR1 PASS [mg/(s·inc$^2$)] | LANDING TIME DIFFERENCE |
| | COMPOSITION | COMPOSITION | | | | | | | | |
| EXAMPLE 1 | R1 | W1 | 10 | 842 | 842 | 12 | 1 | 0 | 101 | SIMULTANEOUS |
| EXAMPLE 2 | R1 | W1 | 10 | 842 | 842 | 12 | 1 | 0 | 101 | SIMULTANEOUS |
| EXAMPLE 3 | R2 | W1 | 10 | 842 | 842 | 12 | 1 | 0 | 101 | SIMULTANEOUS |
| EXAMPLE 4 | R3 | W1 | 10 | 842 | 842 | 12 | 1 | 0 | 101 | SIMULTANEOUS |
| EXAMPLE 5 | R1 | W1 | 10 | 842 | 842 | 12 | 1 | 0 | 101 | SIMULTANEOUS |
| EXAMPLE 6 | R1 | W1 | 10 | 842 | 842 | 12 | 1 | 0 | 101 | SIMULTANEOUS |
| EXAMPLE 7 | R1 | W1 | 10 | 842 | 842 | 12 | 1 | 0 | 101 | SIMULTANEOUS |
| EXAMPLE 8 | R4 | W1 | 10 | 842 | 842 | 12 | 1 | 0 | 101 | SIMULTANEOUS |
| EXAMPLE 9 | R5 | W1 | 10 | 842 | 842 | 12 | 1 | 0 | 101 | SIMULTANEOUS |
| EXAMPLE 10 | R1 | W2 | 10 | 842 | 842 | 12 | 1 | 0 | 101 | SIMULTANEOUS |
| EXAMPLE 11 | - | - | - | - | - | - | - | - | - | - |
| EXAMPLE 12 | R1 | W1 | 10 | 842 | 842 | 12 | 1 | 0 | 101 | SIMULTANEOUS |
| EXAMPLE 13 | R1 | W1 | 10 | 842 | 842 | 12 | 1 | 0 | 101 | SIMULTANEOUS |
| COMPARATIVE EXAMPLE 1 | R1 | W1 | 10 | 842 | 842 | 12 | 1 | 0 | 101 | SIMULTANEOUS |
| COMPARATIVE EXAMPLE 2 | R2 | W1 | 10 | 842 | 842 | 12 | 1 | 0 | 101 | SIMULTANEOUS |
| COMPARATIVE EXAMPLE 3 | R3 | W1 | 10 | 842 | 842 | 12 | 1 | 0 | 101 | SIMULTANEOUS |
| COMPARATIVE EXAMPLE 4 | R1 | W1 | 10 | 842 | 842 | 12 | 1 | 0 | 101 | SIMULTANEOUS |
| COMPARATIVE EXAMPLE 5 | R1 | W1 | 10 | 842 | 842 | 12 | 1 | 0 | 101 | SIMULTANEOUS |
| COMPARATIVE EXAMPLE 6 | R1 | W1 | 10 | 842 | 842 | 12 | 1 | 0 | 101 | SIMULTANEOUS |

FIG. 7

TABLE 4

| CLASSIFICATION | STEP c (OC TREATMENT) | | | | | | | | STEP d (DRYING INK) | | |
|---|---|---|---|---|---|---|---|---|---|---|---|
| | TRANSPARENT INK COMPOSITION | PRINTING AREA [inc$^2$] | APPLICATION AMOUNT OF INK PER PRINTING AREA [mg] | APPLICATION AMOUNT OF INK PER PRINTING AREA AT 1 Pass OF CARRIAGE [mg] | CARRIAGE MOVEMENT SPEED [inc/s] | NUMBER OF MAIN SCANS [scans] | NUMBER OF SUB-SCANS [scans] | PER UNIT AREA/ TIME AT CR1 PASS [mg/(s·inc$^2$)] | DRYING DEVICE | DRYING TEMPERATURE [°C] | DRYING TIME [min] |
| EXAMPLE 1 | - | - | - | - | - | - | - | - | OPEN | 160 | 3 |
| EXAMPLE 2 | - | - | - | - | - | - | - | - | OPEN | 160 | 3 |
| EXAMPLE 3 | - | - | - | - | - | - | - | - | OPEN | 160 | 3 |
| EXAMPLE 4 | - | - | - | - | - | - | - | - | OPEN | 160 | 3 |
| EXAMPLE 5 | - | - | - | - | - | - | - | - | OPEN | 160 | 3 |
| EXAMPLE 6 | - | - | - | - | - | - | - | - | OPEN | 160 | 3 |
| EXAMPLE 7 | G1 | 10 | 281 | 281 | 12 | 1 | 0 | 33.7 | OPEN | 160 | 3 |
| EXAMPLE 8 | - | - | - | - | - | - | - | - | OPEN | 160 | 3 |
| EXAMPLE 9 | - | - | - | - | - | - | - | - | OPEN | 160 | 3 |
| EXAMPLE 10 | - | - | - | - | - | - | - | - | OPEN | 160 | 3 |
| EXAMPLE 11 | - | - | - | - | - | - | - | - | OPEN | 160 | 3 |
| EXAMPLE 12 | - | - | - | - | - | - | - | - | OPEN | 160 | 3 |
| EXAMPLE 13 | - | - | - | - | - | - | - | - | OPEN | 160 | 3 |
| COMPARATIVE EXAMPLE 1 | - | - | - | - | - | - | - | - | OPEN | 160 | 3 |
| COMPARATIVE EXAMPLE 2 | - | - | - | - | - | - | - | - | OPEN | 160 | 3 |
| COMPARATIVE EXAMPLE 3 | - | - | - | - | - | - | - | - | OPEN | 160 | 3 |
| COMPARATIVE EXAMPLE 4 | - | - | - | - | - | - | - | - | OPEN | 160 | 3 |
| COMPARATIVE EXAMPLE 5 | - | - | - | - | - | - | - | - | OPEN | 160 | 3 |
| COMPARATIVE EXAMPLE 6 | - | | - | - | - | - | - | - | OPEN | 160 | 3 |

FIG. 8

TABLE 5

| CLASSIFICATION | COLOR DEVELOPMENT | TEXTURE | RUBBING FASTNESS | | Wh INK CONTINUOUS PRINTING STABILITY | VISCOSITY OF MIXED LIQUID OF REACTION SOLUTION AND TRANSPARENT INK IN EQUIVALENT AMOUNTS [mPa·s] |
|---|---|---|---|---|---|---|
| | L* | | DRY | WET | | |
| EXAMPLE 1 | 85 | B | A | B | A | 350 |
| EXAMPLE 2 | 89 | A | A | A | A | 350 |
| EXAMPLE 3 | 86 | A | B | B | A | 50 |
| EXAMPLE 4 | 88 | A | A | B | A | 50 |
| EXAMPLE 5 | 89 | A | A | A | A | 350 |
| EXAMPLE 6 | 89 | A | A | A | A | 350 |
| EXAMPLE 7 | 92 | B | AA | AA | A | 350 |
| EXAMPLE 8 | 85 | B | B | B | A | 30 |
| EXAMPLE 9 | 85 | B | B | B | A | 350 |
| EXAMPLE 10 | 90 | A | B | B | AA | 350 |
| EXAMPLE 11 | 87 | A | A | A | A | 350 |
| EXAMPLE 12 | 91 | B | A | A | A | 350 |
| EXAMPLE 13 | 94 | B | A | A | A | 350 |
| COMPARATIVE EXAMPLE 1 | 83 | B | C | B | A | 350 |
| COMPARATIVE EXAMPLE 2 | 78 | B | C | C | A | 50 |
| COMPARATIVE EXAMPLE 3 | 82 | B | C | C | A | 50 |
| COMPARATIVE EXAMPLE 4 | 81 | A | C | C | A | 350 |
| COMPARATIVE EXAMPLE 5 | 83 | A | C | C | A | 350 |
| COMPARATIVE EXAMPLE 6 | 81 | A | C | B | A | 350 |

FIG. 14

TABLE 1

| INK TYPE | | REACTION SOLUTION 1 (CATION) | REACTION SOLUTION 2 (CATION) | REACTION SOLUTION 3 (CATION) | REACTION SOLUTION 4 (CATION) | RESIN SOLUTION 1 (ANION) | Wh INK 1 (ANION) |
|---|---|---|---|---|---|---|---|
| CLASSIFICATION | RAW MATERIAL NAME | COMPOSITION R1 | COMPOSITION R2 | COMPOSITION R3 | COMPOSITION R4 | COMPOSITION G1 | COMPOSITION W1 |
| AGGREGATING AGENT | LACTIC ACID | 3 | 0.3 | 6 | - | - | - |
| | MAGNESIUM SULFATE HEPTAHYDRATE | - | - | - | 5 | - | - |
| PIGMENT | SOLID CONTENT OF TITANIUM OXIDE DISPERSION (ANIONIC RESIN DISPERSION PRODUCT) | - | - | - | - | - | 10 |
| RESIN PARTICLES | SOLID CONTENT CONCENTRATION OF URETHANE RESIN (TAKELAC WS-6021) | - | - | - | - | 10 | 10 |
| MOISTURIZER (ORGANIC SOLVENT) | GLYCERIN | - | - | - | - | - | 5 |
| ORGANIC SOLVENT | TRIETHYLENE GLYCOL | - | - | - | - | 5 | 5 |
| | TRIETHYLENE GLYCOL MONOBUTYL ETHER | - | - | - | - | 1 | 1 |
| | PROPYLENE GLYCOL | 25 | 25 | 25 | 25 | 25 | 6 |
| SURFACTANT | BYK-348 (HLB VALUE: 11) SILICON-BASED SURFACTANT | - | - | - | - | 0.5 | 0.5 |
| | OLFINE E1010 (HLB VALUE: 12) ACETYLENE-BASED SURFACTANT | 0.5 | 0.5 | 0.5 | 0.5 | - | - |
| SOLVENT | ION EXCHANGE WATER | BALANCE | BALANCE | BALANCE | BALANCE | BALANCE | BALANCE |
| pH OF INK | | 2-3 | 2-3 | 2-3 | 4-5 | 7-8 | 7-8 |
| VISCOSITY OF INK (mPa·s) | | 3-4 | 3-4 | 3-4 | 3-4 | 3-4 | 4-5 |
| SURFACE TENSION OF INK (mN/m) | | 33 | 33 | 33 | 33 | 24 | 24 |

FIG. 15

TABLE 2

| ITEM | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 | COMPARATIVE EXAMPLE 1 |
|---|---|---|---|---|---|---|---|---|---|---|---|---|---|---|
| COMPOSITION No. | REACTION SOLUTION (COMPOSITION R) | 1 | 1 | 1 | 2 | 3 | 4 | 1 | 1 | 1 | 1 | 1 | 1 | 1 |
| | TRANSPARENT INK (COMPOSITION G) | 1 | 1 | 1 | 1 | 1 | 1 | 1 | 1 | 1 | 1 | 1 | 1 | 1 |
| | Wh INK (COMPOSITION W) | 1 | 1 | 1 | 1 | 1 | 1 | 1 | 1 | 1 | 1 | 1 | 1 | 1 |
| APPLICATION AMOUNT (REACTION SOLUTION + TRANSPARENT INK) [g/inch$^2$] | | 0.1 | 0.1 | 0.02 | 0.1 | 0.1 | 0.1 | 0.1 | 0.1 | 0.1 | 0.1 | 0.1 | 0.02 | 0.1 |
| APPLICATION AMOUNT RATIO (REACTION SOLUTION:TRANSPARENT INK) | | 1:1 | 1:1 | 1:1 | 1:1 | 1:1 | 1:1 | 1:1 | 1:1 | 1:10 | 10:1 | 1:1 | 1:1 | 1:1 |
| LANDING TIME DIFFERENCE (REACTION SOLUTION/TRANSPARENT INK) [s] | | 1> | 1> | 1> | 1> | 1> | 1> | 30 | 60 | 1> | 1> | 1> | 1> | 1> |
| PRESENCE OR ABSENCE OF USE OF SQUEEGEE (WIPING) AFTER APPLICATION OF TWO LIQUIDS (REACTION SOLUTION + TRANSPARENT INK) | | PRESENCE | PRESENCE | PRESENCE | PRESENCE | PRESENCE | PRESENCE | PRESENCE | PRESENCE | PRESENCE | PRESENCE | PRESENCE | PRESENCE | ABSENCE |
| TIME DIFFERENCE FROM APPLICATION OF TWO LIQUIDS TO SQUEEGEE (WIPING) [min] | | 1> | 1> | 1> | 1> | 1> | 1> | 1> | 1> | 1> | 1> | 30 | 1> | - |
| APPLICATION AMOUNT (Wh) [g/inch$^2$] | | 0.1 | 0.1 | 0.1 | 0.1 | 0.1 | 0.1 | 0.1 | 0.1 | 0.1 | 0.1 | 0.1 | 0.08 | 0.1 |
| TOTAL APPLICATION AMOUNT (REACTION SOLUTION + TRANSPARENT INK + Wh) [g/inch$^2$] | | 0.2 | 0.2 | 0.12 | 0.2 | 0.2 | 0.2 | 0.2 | 0.2 | 0.2 | 0.2 | 0.2 | 0.1 | 0.2 |
| VISCOSITY OF MIXED LIQUID (REACTION SOLUTION vs. TRANSPARENT INK) [mPa·s] | | 750-1500 | 750-1500 | 750-1500 | <500 | >1000 | 50-100 | 750-1500 | 750-1500 | 750-1500 | 750-1500 | 750-1500 | 750-1500 | 500-1000 |
| COLOR DEVELOPING PROPERTY (L*) | | A+ | A+ | A+ | B | A+ | A+ | A | B | B | A+ | A+ | B | B |
| IMAGE QUALITY DISTURBANCE (FLUFFING SUPPRESSION) | | A | A | B | B | A | B | B | B | B | B | B | B | C |
| CRACK OF Wh INK LAYER | | A | A | A | A | B | A | A | A | A | B | A | A | A |

INK JET TEXTILE PRINTING METHOD AND SET

The present application is based on, and claims priority from JP Application Serial Number 2023-178675, filed Oct. 17, 2023, and JP Application Serial Number 2024-053521, filed Mar. 28, 2024, the disclosures of which are hereby incorporated by reference herein in their entirety.

BACKGROUND

1. Technical Field

The present disclosure relates to an ink jet textile printing method and a set.

2. Related Art

In the related art, a technology for performing a treatment on a fabric using a reaction solution containing an aggregating agent that aggregates components in an ink in order to improve rubbing fastness or color developing properties is known in textile printing using an ink jet ink composition including a pigment as a coloring material (pigment textile printing).

For example, JP-T-2022-548985 describes an ink jet printing method for printing on a fiber product base material, the method including the following steps in the following order: a) providing the base material, b) applying a pre-treatment composition including a polyvalent cation and/or an acid salt, c) applying a transparent ink including a polymer binder by jetting, d) applying a white ink by jetting, and e) applying a non-white colored ink by jetting.

However, when the reaction solution was attached to the fabric through an ink jet method, neither of good rubbing fastness and good color developing properties could be obtained.

In addition, there was image quality disturbance due to fluffing of the fabric.

SUMMARY

According to an aspect of the first present disclosure, provided is an ink jet textile printing method including: a reaction solution attaching step of attaching a reaction solution containing an aggregating agent that aggregates components in an ink, and water to a fabric using an ink jet method; a transparent ink attaching step of attaching a transparent ink composition containing anionic resin particles and water to a fabric using the ink jet method; and a colored ink attaching step of attaching a colored ink composition containing a pigment, resin particles, and water onto a region, to which the transparent ink composition is attached, using the ink jet method, in which the reaction solution attaching step and the transparent ink attaching step include Step 1, and in Step 1, a range of a minimum value of a total attachment amount of the reaction solution and the transparent ink composition per unit area/per unit time is 34 mg/(s·inch$^2$) or more. Step 1: applying the reaction solution and the transparent ink composition to the same region in the fabric in a single scanning of an ink jet head.

According to an aspect of the first present disclosure, provided is a set used in the ink jet textile printing method of the above-described aspect, the set including the reaction solution; the transparent ink composition; and the colored ink composition.

According to an aspect of the second present disclosure, provided is an ink jet textile printing method including: a reaction solution attaching step of attaching a reaction solution containing an aggregating agent that aggregates components in an ink, and water to a fabric; a transparent ink attaching step of attaching a transparent ink composition containing anionic resin particles that react with the aggregating agent and are aggregated, and water to the fabric; a colored ink attaching step of attaching a colored ink composition containing a pigment, resin particles, and water onto a region of the fabric, to which the transparent ink composition is attached, using an ink jet method; and a pressure applying step of applying pressure to a region of the fabric, to which the reaction solution and the transparent ink composition are attached, after the reaction solution attaching step and the transparent ink attaching step, in which the fabric is mounted on a mounting table, and the reaction solution attaching step, the transparent ink attaching step, the pressure applying step, and the colored ink attaching step are performed without changing a relative positional relationship between the fabric and the mounting table between the respective steps.

According to an aspect of the second present disclosure, provided is an ink set used in the ink jet textile printing method of the above-described aspect, the ink set including: the reaction solution; the transparent ink composition; and the colored ink composition.

BRIEF DESCRIPTION OF THE DRAWINGS

FIG. 4 is a table showing composition examples of a reaction solution, a transparent ink composition, and a colored ink composition according to the first embodiment of the present disclosure.

FIG. 5 is a table showing recording conditions of an ink jet textile printing method according to each of Examples and each of Comparative Examples according to the first embodiment of the present disclosure.

FIG. 6 is a table showing recording conditions of the ink jet textile printing method according to each of Examples and each of Comparative Examples according to the first embodiment of the present disclosure.

FIG. 7 is a table showing recording conditions of the ink jet textile printing method according to each of Examples and each of Comparative Examples according to the first embodiment of the present disclosure.

FIG. 8 is a table showing evaluation results of the ink jet textile printing method according to each of Examples and each of Comparative Examples according to the first embodiment of the present disclosure.

FIG. 14 is Table 1 showing composition examples of a reaction solution, a transparent ink composition, and a colored ink composition according to the second embodiment of the present disclosure.

FIG. 15 is Table 2 showing recording conditions of an ink jet textile printing method according to each of Examples and Comparative Examples according to the second embodiment of the present disclosure.

DESCRIPTION OF EMBODIMENTS

Figure 1:
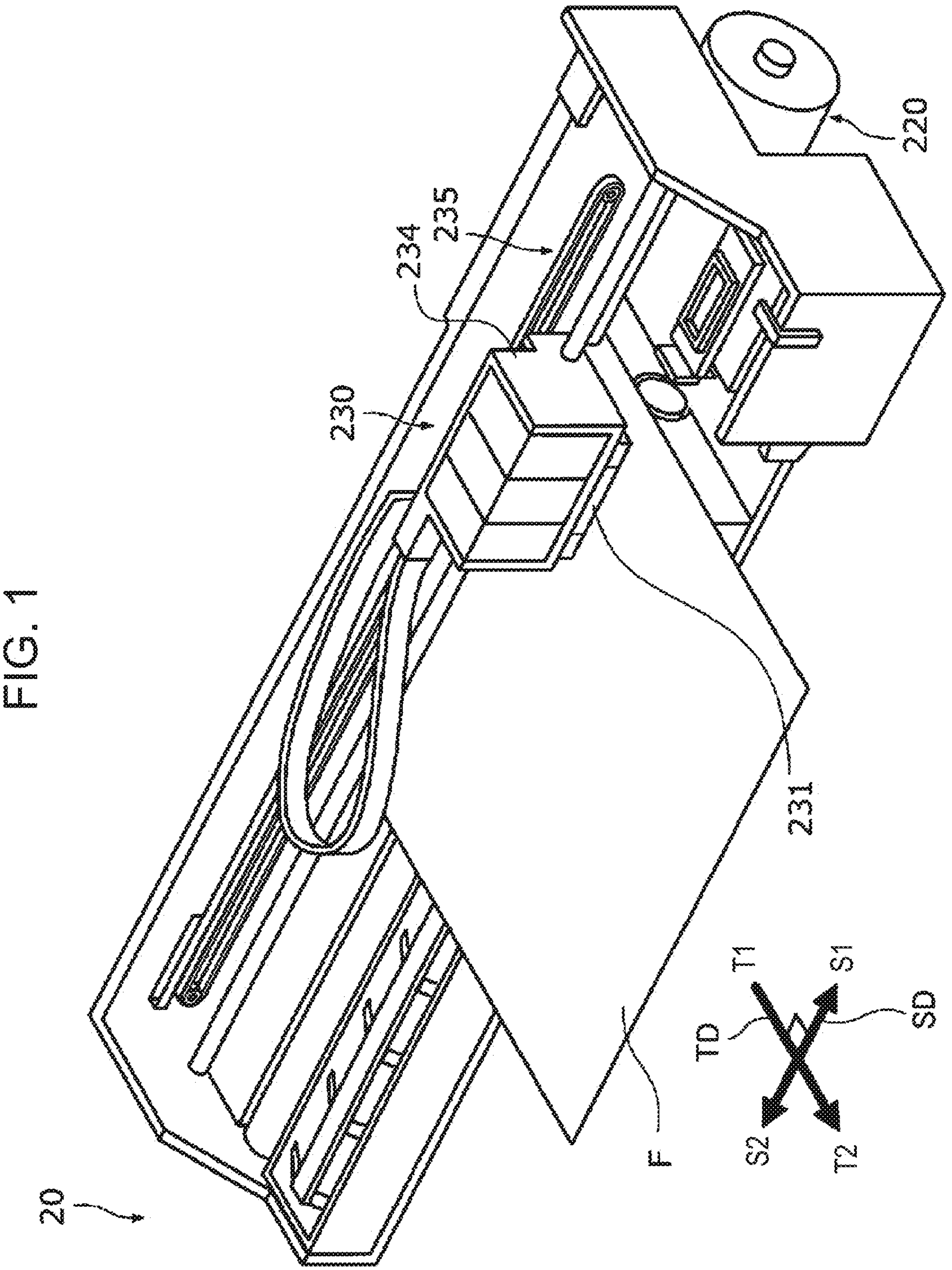
FIG. 1 is a perspective view of a serial printer according to a first embodiment of the present disclosure.

Hereinafter, the first embodiment of the present disclosure will be described. The embodiments described below describe examples of the present disclosure. The present disclosure is not limited to the following embodiments, and includes various modifications implemented within a range not changing the gist of the present disclosure. Furthermore, it should be noted that not all of the configurations described below are essential configurations of the present disclosure.

In the present specification, a numerical range indicated by using "to" means a range including numerical values described before and after "to" as a lower limit value and an upper limit value.

In the present specification, the "ink jet method" refers to a droplet ejecting method using an ink jet method.

In the present specification, "(meth)acrylic" represents acrylic or methacrylic and "(meth)acrylate" represents acrylate or methacrylate.

1. Ink Jet Textile Printing Method

An ink jet textile printing method according to one embodiment of the present disclosure includes a reaction solution attaching step of attaching a reaction solution containing an aggregating agent that aggregates components in an ink, and water to a fabric using an ink jet method, a transparent ink attaching step of attaching a transparent ink composition containing anionic resin particles and water to a fabric using the ink jet method; and a colored ink attaching step of attaching a colored ink composition containing a pigment, resin particles, and water onto a region, to which the transparent ink composition is attached, using the ink jet method, in which the reaction solution attaching step and the transparent ink attaching step include Step 1, Step 1: applying the reaction solution and the transparent ink composition to the same region in the fabric in a single scanning of an ink jet head, and in Step 1, a range of a minimum value of a total attachment amount of the reaction solution and the transparent ink composition per unit area/per unit time is 34 $mg/(s \cdot inch^2)$ or more.

In the related art, a treatment of attaching a reaction solution that aggregates the components of an ink to a fabric is performed in order to improve the color developing properties of a coloring material in ink jet textile printing. Since the treatment is usually performed using an apparatus or equipment different from an ink jet recording apparatus or is often performed manually, large-scale equipment or a complicated step was required. In this regard, studies were made on an aspect in which not only an ink but also a reaction solution is ejected using an ink jet method, and the reaction solution and the ink are continuously attached in the same apparatus. In such an aspect, it is not necessary to use another apparatus or equipment and the steps can be simplified.

However, in the aspect, along with an increase in the total amount of the reaction solution or the ink to be attached, it is more difficult to achieve both rubbing fastness and color developing properties. This is presumed to be because when the total amount of the reaction solution or the ink to be attached is large, the amount of moisture is increased, and thus, the aggregation action of the reaction solution with the landing of the ink is likely to be insufficient and a decrease in color developing properties occurs due to the penetration of the ink into the fabric.

It is also presumed that as the amount of moisture increases, i) the dryness decreases and the binding of the ink layer is likely to be insufficient, and ii) as a moisture content of the fabric increases, the penetrability of the ink into the fabric decrease, and thus, a gap is generated between the ink layer and the fabric surface layer, and the binding is likely to be insufficient, whereby the adhesion between the ink layer and the fabric is decreased and the rubbing fastness is decreased.

In particular, when printing is performed on a colored fabric, a white ink layer may be provided as a base to improve color developing properties. However, the attachment amount of the white ink in the printing is relatively large, whereby the total amount of the reaction solution or ink to be attached tends to be larger, and it is particularly difficult to achieve both rubbing fastness and color developing properties.

On the other hand, by using the ink jet textile printing method according to the present embodiment, the aggregating agent in the reaction solution aggregates the transparent ink composition on the fabric, thereby forming a transparent ink layer (a resin layer, a base) in the vicinity of a surface of the fabric. Here, since the fabric absorbs the droplets that land thereon, when the attachment amount of the droplets per unit time is different, the attachment mode is different even with the same attachment amount. That is, when the attachment amount of the droplets per unit time is small with respect to the absorption rate of the droplets in the fabric, the ink is less likely to remain in the vicinity of the fabric surface.

Therefore, by setting the total attachment amount per unit time and per unit area in the reaction solution or the transparent ink composition to be equal to or more than a predetermined value, that is, the instantaneous total attachment amount to be equal to or more than a predetermined value, a resin layer can be favorably in the vicinity of a surface of the fabric by aggregating the ink before the ink is penetrated into the fabric.

With such a resin layer favorably formed, even when a colored ink is further attached thereonto and the total attachment amount of the reaction solution and the ink is large, the penetration of the colored ink into the fabric can be suppressed and good color developing properties can be obtained. In addition, by configuring the resin layer to function as a binding layer between the fabric and the colored ink layer, good rubbing fastness can be obtained.

In the ink jet textile printing method according to the present embodiment, in a region in the fabric, where the reaction solution, the transparent ink composition, and the colored ink composition are attached, the total attachment amount of the reaction solution, the transparent ink composition, and the colored ink composition is preferably 100 $mg/inch^2$ or more. In this case, since the total amount of the reaction solution and the ink attached is relatively large, it is difficult to achieve both rubbing fastness and color developing properties, but in the ink jet textile printing method according to the present embodiment, good rubbing fastness and color developing properties can be obtained. An upper limit of the total attachment amount is not particularly limited, but is preferably 500 mg/inch$^2$ or less, more preferably 300 mg/inch$^2$ or less, still more preferably 200 mg/inch$^2$ or less, and particularly preferably 150 mg/inch$^2$ or less.

Hereinafter, each step of the ink jet textile printing method according to the present embodiment will be described.

1.1 Reaction Solution Attaching Step

The ink jet textile printing method according to the present embodiment includes a reaction solution attaching step of attaching a reaction solution containing an aggregating agent that aggregates components in an ink, and water to a fabric using an ink jet method.

1.1.1 Step 1

In the ink jet textile printing method according to the present embodiment, the reaction solution attaching step and a transparent ink attaching step described later include Step 1: applying the reaction solution and the transparent ink composition onto the same region in the fabric in a single scanning of an ink jet head. In addition, in Step 1, a range of the minimum value of the total attachment amount of the reaction solution and the transparent ink composition per unit area/per unit time is 34 mg/(s·inch$^2$) or more.

With the application through Step 1, the reaction solution and the transparent ink composition can be continuously applied to the fabric in the same apparatus.

Scanning

Here, the "scanning" in Step 1 means moving the ink jet head relative to the recording region in the fabric. In this case, the scanning may be performed by moving the ink jet head with respect to the fabric or by moving the fabric with respect to the ink jet head. In addition, the relative positional relationship between the ink jet head and the fabric may change by moving the positions of both of the ink jet head and the fabric.

Therefore, the "scanning" in Step 1 is to perform recording as a carriage 234 having an ink jet head 231 moves in a scanning direction SD that intersects the transport direction TD of the recording medium F, for example, in a serial-type ink jet recording apparatus 20 as shown in FIG. 1.

In a case of the serial-type recording method, the fabric may be transported between the respective scannings from the viewpoint of increasing a recording resolution. The transport of the fabric is performed by moving the relative positions of the ink jet head and the fabric in a direction that intersects a direction of the scanning. Furthermore, during the transport of the fabric, the ink jet head does not eject the ink or the like to be attached to the recording medium.

That is, in the ink jet textile printing method according to the present embodiment, Step 1 may be performed a plurality of times, the reaction solution attaching step and the transparent ink attaching step may include Step 2: transporting the fabric in a direction that intersects a direction of the scanning, and Step 2 may be performed between Steps 1 performed a plurality of times. This enables the reaction solution and the transparent ink composition to be applied onto the same region of the fabric in a plurality of batches.

More specifically, for example, in FIG. 1, when one transport length of the recording medium F in the transport direction TD is one fourth the length of the length in the transport direction TD of the nozzle row arranged in the direction that intersects a scanning direction SD of the ink jet head, Step 1 is performed four times in the same portion (the same scanning region) with respect to the rectangular scanning region having one length of the transport direction TD in the transport direction TD and extending in the scanning direction SD.

Step 1 to be performed a plurality of times may be performed two or more times, three or more times, or four or more times. An upper limit of the number of times of Step 1 is not particularly limited, but may be less than 20, less than 15, or less than 10. In addition, when Step 1 is performed n times (n is an integer of 2 or more), it is preferable that Step 2 is performed n—1 times. It is preferable that Step 1 and Step 2 are alternately repeatedly performed.

Figure 3:
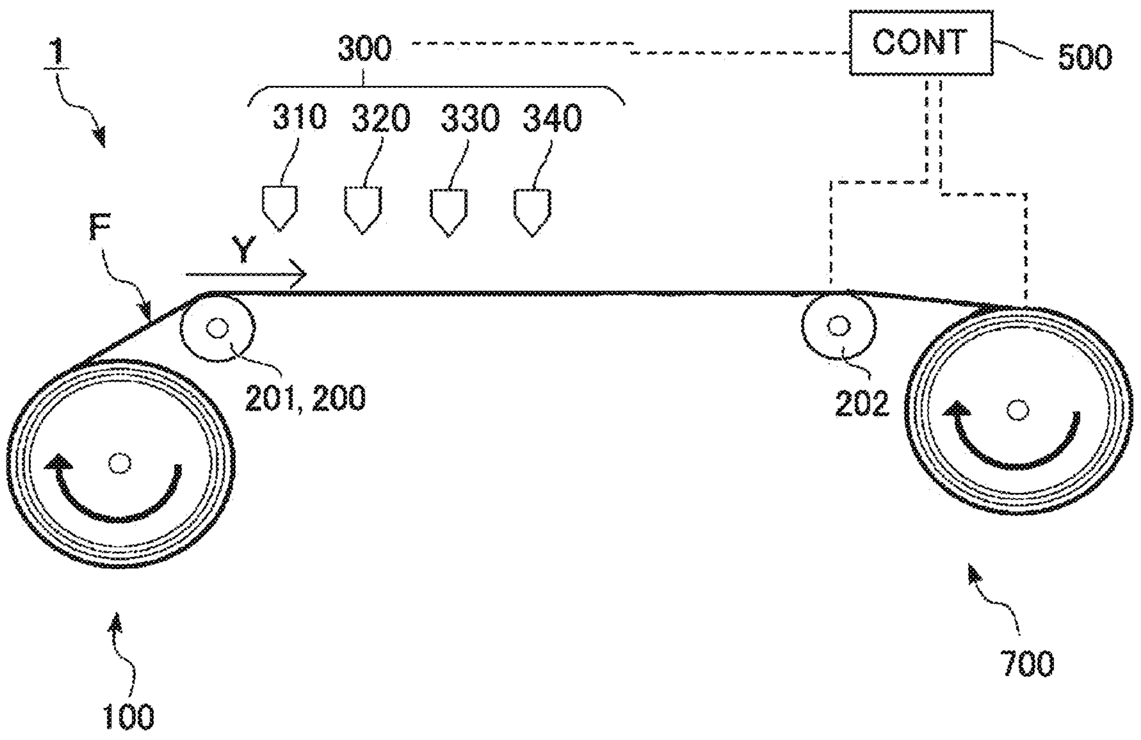
FIG. 3 is a schematic side view of a line printer according to the first embodiment of the present disclosure.

On the other hand, the "scanning" in Step 1 is to perform recording as the relative position of the recording medium F is moved in the direction that intersects a width direction thereof, for a line head 300 which has a length corresponding to the width of the recording medium F, in a line-type ink jet recording apparatus 1 as shown in FIG. 3. In the line-type recording, the ink jet head (line head) is not moved and is fixed during recording, and the recording is performed in a single scanning.

The "length corresponding to the width of the recording medium" is not limited to a case where the width of the recording medium and the length (width) of the line head completely match. The length may be a length equal to or more than the length corresponding to the width of the recording medium, or may be a length corresponding to the width (recording width) of the recording medium to which the ink is to be ejected (the image is to be recorded).

Attachment Amount Per Unit Area/Per Unit Time

In Step 1, a range of the minimum value of the total attachment amount of the reaction solution and the transparent ink composition per unit area/per unit time is 34 mg/(s·inch$^2$) or more, but is preferably 40 mg/(s·inch$^2$) or more, more preferably 45 mg/(s·inch$^2$) or more, still more preferably 50 mg/(s·inch$^2$) or more, particularly preferably 55 mg/(s·inch$^2$) or more, and more particularly preferably 60 mg/(s·inch$^2$) or more.

By setting the range of the minimum value to 34 mg/(s·inch$^2$) or more, the instantaneous total attachment amount increases and the ink is aggregated before the ink penetrates into the fabric, whereby a resin layer can be formed satisfactorily in the vicinity of a surface of the fabric.

A range of the maximum value of the total attachment amount of the reaction solution and the transparent ink composition per unit area/per unit time is not particularly limited, but is preferably 250 mg/(s·inch$^2$) or less, more preferably 225 mg/(s·inch$^2$) or less, still more preferably 200 mg/(s·inch$^2$) or less, even still more preferably 150 mg/(s·inch$^2$) or less, particularly preferably 100 mg/(s·inch$^2$) or less, and more particularly preferably 80 mg/(s·inch$^2$) or less.

When the range of the maximum value is within the range, there is a tendency that the texture of the fabric can be made better.

Furthermore, the total attachment amount of the reaction solution and the transparent ink composition per unit area/per unit time can be adjusted as appropriate by changing the printing area, the application amount of the ink, the carriage movement speed, the head drive frequency, or the like in a single scanning.

The printing area in a single scanning is preferably, for example, 3 to 30 $inch^2$, more preferably 5 to 20 $inch^2$, and still more preferably 7 to 15 $inch^2$.

An application amount of the reaction solution and the transparent ink composition in a single scanning is, for example, preferably 100 to 1,000 mg, more preferably 200 to 800 mg, and still more preferably 400 to 600 mg.

A carriage movement speed in a serial type is preferably, for example, 6 to 40 inch/s, more preferably 6 to 30 inch/s, still more preferably 6 to 20 inch/s, particularly preferably 8 to 17 inch/s, and more particularly preferably 10 to 15 inch/s.

In Step 1, a ratio (A/B) of an attachment amount (A) of the reaction solution per unit area/per unit time to an attachment amount (B) of the transparent ink composition per unit area/per unit time is preferably 0.5 to 2.0, more preferably 0.6 to 1.7, still more preferably 0.7 to 1.5, particularly preferably 0.8 to 1.3, and more particularly preferably 0.9 to 1.1. When the ratio (A/B) is within the range, there is a tendency that the resin layer can be formed more favorably in the vicinity of a surface of the fabric, and better color developing properties and rubbing fastness may be obtained.

1.1.2 Fabric

Examples of the form of the fabric used in the ink jet textile printing method according to the present embodiment include cloth, clothing, and other clothing ornaments. The cloth includes a woven fabric, a knitted fabric, a nonwoven fabric, and the like. The clothing and other clothing ornaments include sewn T-shirts, handkerchiefs, scarves, towels, handbags, and fabric furniture such as bags, curtains, sheets, bedspreads, and wallpaper, cloth before and after cutting as parts to be sewn, and the like. Examples of these forms include a long roll-shaped product, a product cut into a predetermined size, and a product having the shape of a manufactured product.

Examples of the material constituting the fabric include natural fibers such as cotton, linen, wool, and silk, synthetic fibers such as polypropylene, polyesters, acetate, triacetate, polyamide, and polyurethane, and biodegradable fibers such as polylactic acid, and blended fibers thereof may be used. Among these materials, the fabric is made of cotton, a polyester, or a blend of cotton and a polyester, which is preferably easily available.

In addition, the fabric preferably has an $L^+$ value of 75 or less. The $L^+$ value may be 60 or less, or may be 50 or less. In the textile printing on such a fabric, a relatively large amount of a colored ink composition (in particular, a white ink) may be attached in order to obtain excellent color developing properties. Therefore, it is particularly difficult to achieve both rubbing fastness and color developing properties. On the other hand, by using the ink jet textile printing method according to the present embodiment, even when such a fabric is used, excellent rubbing fastness and color developing properties can be obtain.

Furthermore, $L^+$ represents a brightness in the $L^+a^+b^+$ color space. The $L^+$ value can be measured using a known colorimeter, but can be measured using, for example, a Spectrolino (GretagMacbeth).

Furthermore, examples of the fabric having an $L^+$ value of 75 or less include a colored fabric colored with a dye or the like in advance. Examples of dyes with which the fabric is pre-colored include water-soluble dyes such as an acidic dye and a basic dye, disperse dyes used in combination with a dispersant (surfactant), and reactive dyes. As a method for coloring the fabric with a dye, a known method can be adopted depending on the fabric forming material or the fabric form.

From the viewpoint that the fabric is easily available and the effect of the present disclosure can be further enjoyed, it is preferable that the fabric has an $L^+$ of 75 or less, and is cotton, a polyester, or a blend of cotton and a polyester.

1.1.3 Reaction Solution

The reaction solution used in the reaction solution attaching step contains an aggregating agent that aggregates components in an ink, and water.

Hereinafter, each component contained in the reaction solution will be described.

Aggregating Agent

The reaction solution contains an aggregating agent that aggregates components in the ink. The aggregating agent has a function of aggregating at least one of the components by acting on the dispersibility of the anionic resin particles contained in the transparent ink composition, and the components such as pigments and resin particles included in the colored ink composition. A degree of aggregation of a dispersion by the aggregating agent varies depending on each type of the aggregating agent and the target, and can be adjusted. For example, by such an aggregation action, color developing properties of an image and fixing properties of the image can be enhanced.

The reaction solution preferably contains one or more selected from, for example, an organic acid, a polyvalent metal salt, and a cationic polymer as the aggregating agent. When such an aggregating agent is used, the rubbing fastness and the color developing properties may be more excellent.

Preferred examples of the organic acid include poly(meth)acrylic acid, formic acid, acetic acid, propionic acid, glycolic acid, oxalic acid, malonic acid, malic acid, maleic acid, ascorbic acid, succinic acid, glutaric acid, adipic acid, fumaric acid, citric acid, tartaric acid, lactic acid, pyruvic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, or salts thereof.

The organic acid may be used alone or in combination of two or more kinds thereof. Furthermore, the salt of the organic acid which is a metal salt is included in the following metal salts.

The polyvalent metal salt is a compound composed of a divalent or higher valent metal ions and an anion. Examples of the divalent or higher valent metal ions include ions of calcium, magnesium, copper, nickel, zinc, barium, aluminum, titanium, strontium, chromium, cobalt, iron, and the like. Among the metal ions constituting these polyvalent metal salts, at least one of the calcium ion and the magnesium ion is preferable from the viewpoint that the aggregability of the components of an ink is excellent.

The anion constituting the polyvalent metal salt is an inorganic ion or an organic ion. Examples of such an inorganic ion include a chloride ion, a bromine ion, an iodine ion, a formate ion, a nitrate ion, a sulfate ion, and a hydroxide ion. Examples of the organic ion include an organic acid ion, and examples of the organic acid ion include a carboxylic acid ion.

Specific examples of the polyvalent metal salt include calcium carbonate such as heavy calcium carbonate and light calcium carbonate, calcium formate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, aluminum acetate, calcium propionate, magnesium propionate, aluminum propionate, calcium lactate, magnesium lactate, and aluminum lactate. These polyvalent metal salts may be used alone or may be used in combination of two or more kinds thereof. Among these, at least any one of magnesium sulfate, calcium formate, calcium nitrate, aluminum lactate, and calcium propionate is preferable from the viewpoint that sufficient solubility in water is obtained. Furthermore, the metal salts may be metal salts having water of hydration in the raw material forms, such as magnesium sulfate-heptahydrate and magnesium sulfate-tetrahydrate.

The cationic polymer means a polymer compound having a cationic group. Examples of the cationic polymer include a cationic urethane resin, a cationic olefin resin, a cationic amine-based resin, and a cationic amide-based resin.

The cationic amine-based resin may be any of resins having an amino group, and examples thereof include an allylamine resin, a polyamine resin, and a quaternary ammonium salt polymer.

Examples of the allylamine resin include those having a structure derived from an allyl group in the main skeleton of the resin. Examples of the polyamine resin include those having an amino group in the main skeleton of the resin. Examples of the quaternary ammonium salt polymer include a resin having a quaternary ammonium salt in the structure. Among the cationic polymers, cationic amine-based resins are preferable since they have an excellent reactivity and are easily available.

The aggregating agent may be used alone or in combination of two or more kinds thereof.

From the viewpoint that the color developing properties and the rubbing fastness are more excellent, a lower limit of a content of the aggregating agent is preferably 0.5% by mass or more, more preferably 1% by mass or more, still more preferably 2% by mass or more, particularly preferably 3% by mass or more, and more particularly preferably 4% by mass or more with respect to a total mass of the reaction solution.

In addition, an upper limit of the content of the aggregating agent is not particularly limited, but is, for example, preferably 20% by mass or less, more preferably 15% by mass or less, still more preferably 10% by mass or less, particularly preferably 8% by mass or less, and more particularly preferably 7% by mass or less with respect to the total mass of the reaction solution.

Water

The reaction solution contains water. Examples of water include pure water such as ion exchange water, ultrafiltered water, reverse osmosis water, and distilled water, and water such as ultrapure water, from which ionic impurities are reduced. In addition, when water sterilized by irradiation with ultraviolet rays or addition of hydrogen peroxide or the like is used, the generation of bacteria or fungi when the reaction solution is stored for a long period of time can be suppressed.

A water content is preferably 40% by mass or more, more preferably 45% by mass or more, still more preferably 50% by mass or more, and particularly preferably 60% by mass or more with respect to the total mass of the reaction solution. An upper limit of the water content is not particularly limited, and is, for example, preferably 90% by mass or less, more preferably 85% by mass or less, and still more preferably 80% by mass or less with respect to the total mass of the reaction solution.

Organic Solvent

The reaction solution may contain an organic solvent. Examples of the organic solvent include esters, alkylene glycol ethers, cyclic esters, amides, alcohols, and polyhydric alcohols.

Esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, glycol diesters such as ethylene glycol diacetate, diethylene glycol diacetate, propylene glycol diacetate, dipropylene glycol diacetate, propionate ethylene glycol acetate, butyrate ethylene glycol acetate, butyrate diethylene glycol acetate, propionate diethylene glycol acetate, butyrate diethylene glycol acetate, propionate propylene glycol acetate, butyrate propylene glycol acetate, butyrate dipropylene glycol acetate, and propionate dipropylene glycol acetate.

The alkylene glycol ethers may be alkylene glycol monoethers or diethers, and alkyl ethers are preferable. Specific examples thereof include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether; alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Examples of the cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone; and compounds in which a hydrogen of a methylene group adjacent to a carbonyl group thereof is substituted with an alkyl group having from 1 to 4 carbon atoms.

Examples of the amides include cyclic amides, and acyclic amides. Examples of the acyclic amides include alkoxyalkylamides.

Examples of the cyclic amides include lactams. Examples of the lactams include pyrrolidones such as 2-pyrrolidone, 1-methyl-2-pyrrolidone, 1-ethyl-2-pyrrolidone, 1-propyl-2-pyrrolidone, and 1-butyl-2-pyrrolidone.

Examples of the alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and N,N-dimethylisobutyric acid amide.

Examples of the alcohols include a compound in which one hydrogen atom of an alkane is substituted with a hydroxyl group. The alkane preferably has 10 or less carbon atoms, more preferably 6 or less carbon atoms, and still more preferably 3 or less carbon atoms. The number of carbon atoms of the alkane is 1 or more, and is preferably 2 or more. The alkane may be a linear or branched-type. Examples of the alcohols include methanol, ethanol, n-propyl alcohol, iso-propyl alcohol, n-butanol, 2-butanol, tert-butanol, iso-butanol, n-pentanol, 2-pentanol, 3-pentanol, tert-pentanol, 2-phenoxy ethanol, benzyl alcohol, and phenoxy propanol.

Polyhydric alcohols have two or more hydroxyl groups in the molecule. The polyhydric alcohols can be divided into, for example, alkanediols and polyols.

Examples of the alkanediols include compounds in which an alkane is substituted with two hydroxyl groups. Examples of the alkanediols include 1,2-alkanediol which is a general term for compounds in which hydroxyl groups are substituted at the first and second positions of alkanes, and other alkanediols other than 1,2-alkanediol.

Examples of the 1,2-alkanediol include ethylene glycol, 1,2-propanediol (propylene glycol), 1,2-butanediol (1,2BD), 1,2-pentanediol (1,2PD), 1,2-hexanediol (1,2HD), 1,2-heptanediol, 1,2-octanediol, 1,2-nonanediol, 1,2-decanediol, 3-methyl-1,2-butanediol, 3-methyl-1,2-pentanediol, 4-methyl-1,2-pentanediol, 3,4-dimethyl-1,2-pentanediol, 3-ethyl-1,2-pentanediol, 4-ethyl-1,2-pentanediol, 3-methyl-1,2-hexanediol, 4-methyl-1,2-hexanediol, 5-methyl-1,2-hexanediol, 3,4-dimethyl-1,2-hexanediol, 3,5-dimethyl-1,2-hexanediol, 4,5-dimethyl-1,2-hexanediol, 3-ethyl-1,2-hexanediol, 4-ethyl-1,2-hexanediol, and 3-ethyl-4-methyl-1,2-hexanediol.

Examples of other alkanediols include 1,3-propanediol, 1,3-butylene glycol (also known as 1, 3-butanediol), 1,4-butanediol, 2,3-butanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 2-methylpentane-2,4-diol, 1,6-hexanediol, 2-ethyl-2-methyl-1,3-propanediol, and 2-methyl-2-propyl-1,3-propanediol.

Examples of the polyols include a condensate in which two or more molecules of an alkanediol are intermolecularly condensed between hydroxyl groups, and a compound having three or more hydroxyl groups.

Examples of the condensate in which two or more molecules of an alkanediol are intermolecularly condensed between hydroxyl groups include dialkylene glycol such as diethylene glycol and dipropylene glycol, and trialkylene glycols such as triethylene glycol and tripropylene glycol.

The compound having three or more hydroxyl groups has three or more hydroxyl groups having an alkane or polyether structure as a skeleton. Examples of the compound having three or more hydroxyl groups include glycerin, trimethylolethane, trimethylolpropane, 1,2,5-hexanetriol, 1,2,6-hexanetriol, pentaerythritol, and polyoxypropylenetriol.

The organic solvent may be used alone or in combination of two or more kinds thereof.

Among these, the organic solvent preferably includes an alkanediol, more preferably includes 1,2-alkanediol, and particularly preferably includes propylene glycol. When the organic solvent includes these solvents, the color developing properties and the rubbing fastness may be more excellent.

A content of the organic solvent is preferably 5% to 50% by mass, more preferably 10% to 40% by mass, still more preferably 15% to 35% by mass, and particularly preferably 20% to 30% by mass with respect to the total amount of the reaction solution. When the content of the organic solvent is within the range, the color developing properties and the rubbing fastness may be more excellent.

pH Adjuster

The reaction solution may contain a pH adjuster for the purpose of adjusting the pH. The pH adjuster is not particularly limited, but examples thereof include an appropriate combination of acids, bases, weak acids, and weak bases.

As examples of the acids and the bases used in such a combination, inorganic acids such as sulfuric acid, hydrochloric acid, and nitric acid; inorganic bases such as lithium hydroxide, sodium hydroxide, potassium hydroxide, dihydrogen potassium phosphate, hydrogen disodium phosphate, potassium carbonate, sodium carbonate, hydrogen sodium carbonate, and ammonia; organic bases such as triethanol amine, diethanol amine, monoethanol amine, tripropanol amine, triisopropanol amine, diisopropanol amine, and tris (hydroxymethyl)aminomethane (THAM); and organic acids such as adipic acid, citric acid, succinic acid, lactic acid, Good's buffers such as N,N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyl iminobisacetic acid (ADA), piperazine-1,4-bis(2-ethanesulfonic acid) (PIPES), N-(2-acetamide)-2-aminoethanesulfonic acid (ACES), cholamine chloride, N-tris(hydroxymethyl)methyl-2-aminoethanesulfonic acid (TES), acetamide glycine, tricine, glycine amide, and bicine, a phosphate buffer solution, a citrate buffer solution, a Tris buffer solution, or the like may be used. Among these, the inorganic bases are preferable, and potassium hydroxide is more preferable.

For the reaction solution, the pH adjuster may be used alone or may be used in combination of two or more kinds thereof. In addition, a total content of the pH adjusters with respect to the total mass of the reaction solution when the pH adjusters are used is, for example, 0.05% by mass or more and 3.0% by mass or less, and is more preferably 0.1% by mass or more and 1.0% by mass or less.

Surfactant

The reaction solution may contain a surfactant. The surfactant can be used to reduce a surface tension of the reaction solution and, for example, to adjust and improve the penetrability to a fabric. As the surfactant, any of a nonionic surfactant, an anionic surfactant, a cationic surfactant, and an amphoteric surfactant can be used, and these may further be used in combination. In addition, among the surfactants, acetylene-based surfactants (acetylene glycol-based surfactants), silicon-based surfactants, and fluorine-based surfactants can be more preferably used, and the silicon-based surfactants and the acetylene-based surfactants can be still more preferably used.

The acetylene-based surfactants (acetylene glycol-based surfactants) are not particularly limited, but examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (product names, manufactured by Air Products and Chemicals Inc.), OLFINE B, Y, P, A, STG, SPC, E1004, E1010, PD-001, PD-002W, PD-003, PD-004, PD-005, EXP. 4001, EXP. 4036, EXP. 4051, EXP. 4123, EXP. 4200, EXP. 4300, AF-103, AF-104, AK-02, SK-14, and AE-3 (product names, manufactured by Nissin Chemical Industry Co., Ltd.), and ACETYLENOL E00, E00P, E40, and E100 (product names, manufactured by Kawaken Fine Chemicals Co., Ltd.).

The silicon-based surfactant is not particularly limited, but preferred examples thereof include polysiloxane-based compounds. The polysiloxane-based compounds are not particularly limited, but examples thereof include a polyether-modified organosiloxane. Examples of a commercially available product of the polyether-modified organosiloxane include BYK-306, BYK-307, BYK-333, BYK-341, BYK-345, BYK-346, and BYK-348 (product names, manufactured by BYK Chemie Japan K. K.), and KF-351A, KF-352A, KF-353, KF-354L, KF-355A, KF-615A, KF-945, KF-640, KF-642, KF-643, KF-6020, X-22-4515, KF-6004, KF-6011, KF-6012, KF-6015, and KF-6017 (product names, manufactured by Shin-Etsu Chemical Co., Ltd.).

As the fluorine-based surfactant, a fluorine-modified polymer is preferably used, and specific examples thereof include BYK-340 (product name, manufactured by BYK Chemie Japan K. K.).

The surfactant may be used alone or may be used in combination of two or more kinds thereof.

The reaction solution preferably contains a surfactant having an HLB value of 10 or more, among the surfactants. When the surfactant has an HLB value of 10 or more, there is a tendency that the penetrability of the reaction solution into the fabric can be preferably adjusted and the reaction solution is more easily retained in the vicinity of a surface of the fabric. With this, there is a tendency that the color developing properties are more excellent.

In the present specification, the "value of hydrophile and lipophile balance (HLB value)" is a numerical indicating a hydrophile and lipophile balance of the compound. Here, the HLB value is a value calculated by a Griffin method and can be determined by the following equation (1).

$$HLB\ \text{Value} = 20 \times \text{Total sum of formula weight of hydrophilic part/Molecular weight} \quad (1)$$

Hereinafter, specific examples of the surfactant having an HLB value of 10 or more according to the Griffin method will be described.

Examples of the acetylene-based surfactants (acetylene glycol-based surfactants) having an HLB value of 10 or more include OLFINE E1010 (HLB value of 12), E1020 (HLB value of 15 to 16), EXP. 4200 (HLB value of 10 to 13), and EXP. 4123 (HLB value of 10 to 13) [product names, manufactured by Nissin Chemical Industry Co., Ltd.].

Examples of the silicon-based surfactant having an HLB value of 10 or more include BYK-348 (HLB value of 11) [product name, manufactured by BYK Chemie Japan K. K.], KF-6011 (HLB value of 14.5), KF-6013 (HLB value of 10), KF-6043 (HLB value of 14.5), KF-643 (HLB value of 14), KF-640 (HLB value of 14), KF-351A (HLB value of 12), and KF-354L (HLB value of 16) [product names, manufactured by Shin-Etsu Silicone Co., Ltd.], FZ-2105 (HLB value of 11), L-7604 (HLB value of 13), and FZ-2104 (HLB value of 14) [product names, manufactured by Dow Toray Co., Ltd.], and SILWET L-7604 (HLB value of 13), SILWET L-7607N (HLB value of 17), SILWET FZ-2104 (HLB value of 14), or SILWET FZ-2161 (HLB value of 20) [product name, manufactured by Nippon Unicar Co Ltd.].

A lower limit of a content of the surfactant is preferably 0.1% by mass or more, more preferably 0.3% by mass or more, still more preferably 0.5% by mass or more, and particularly preferably 0.7% by mass or more with respect to the total mass of the reaction solution.

In addition, an upper limit of the content of the surfactant is preferably 5% by mass or less, more preferably 3% by mass or less, still more preferably 2% by mass or less, and particularly preferably 1.5% by mass or less with respect to the total mass of the reaction solution. When the content of the surfactant is within the range, there is a tendency that the penetrability of the reaction solution to the fabric is easily adjusted to a preferable level.

Other Components

The reaction solution may contain additives such as a preservative and a fungicide, a rust inhibitor, a chelating agent, a viscosity modifier, a dissolution aid, and an antioxidant, depending on the necessity. When such an additive is contained, a content of the additive is preferably 0.1% to 5% by mass, more preferably 0.1% to 3% by mass, and still more preferably 0.1% to 1% by mass with respect to the total amount of the reaction solution.

In addition, the reaction solution may contain a coloring material such as a pigment, but a content of the coloring material is preferably 0.2% by mass or less, more preferably 0.1% by mass or less, and still more preferably 0.05% by mass or less with respect to the total mass of the reaction solution, with a lower limit of the content being 0% by mass. The reaction solution preferably contains no coloring material.

Physical Properties

From the viewpoint of reducing skin irritation, a pH of the reaction solution is preferably 2.0 or higher, more preferably 3.0 or higher, and still more preferably 4.0 or higher. From the same viewpoint, an upper limit of the pH is preferably 11.5 or less, more preferably 10 or less, still more preferably 7.0 or less, and particularly preferably 5.0 or less.

A viscosity of the reaction solution is preferably 1.0 to 10 mPa·s, more preferably 1.5 to 5.0 mPa·s, still more preferably 2.0 to 4.0 mPa·s, and particularly preferably 2.5 to 3.5 mPa·s. In particular, when the viscosity is 3.0 mPa·s or more, there is a tendency that better color developing properties are obtained. When the viscosity is 5.0 mPa·s or less, there is a tendency that better ejection stability is obtained. Furthermore, the viscosity can be measured using, for example, a viscoelasticity tester MCR-300 (product name), manufactured by Pysica.

A viscosity of the mixed liquid obtained by mixing the reaction solution and the transparent ink composition described later in equivalent amounts is preferably 50 mPa·s or more, more preferably 100 mPa·s or more, still more preferably 200 mPa·s or more, particularly preferably 300 mPa·s or more, and more particularly preferably 320 mPa·s or more. When the viscosity of the mixed liquid is within the range, a water absorption rate of the fabric is reduced, and the transparent ink layer (resin layer) can be formed more preferably in the vicinity of a surface of the fabric. With this, there is a tendency that the penetration of the colored ink into the fabric can be further suppressed and better color developing properties are obtained. In addition, by configuring the resin layer to function better as a binding layer between the fabric and the colored ink layer, there is a tendency that better rubbing fastness is obtained.

Furthermore, an upper limit of the viscosity of the mixed liquid obtained by mixing the reaction solution and the transparent ink composition described later in equivalent amounts is not particularly limited, but is preferably 10,000 mPa·s or less, more preferably 5,000 mPa·s or less, particularly preferably 2,500 mPa·s or less, and more particularly preferably 1,000 mPa·s or less.

A surface tension of the reaction solution is preferably 25 to 40 mN/m, more preferably 25 to 35 mN/m, still more preferably 27 to 35 mN/m, and particularly preferably 30 to 33 mN/m. Furthermore, the surface tension can be measured, for example, by a Wilhelmy method with a surface tension meter (manufactured by Kyowa Interface Science Co., Ltd., DY-300). The surface tension is preferably a measurement value at 20° C.

1.2 Transparent Ink Attaching Step

The ink jet textile printing method according to the present embodiment includes a transparent ink attaching step of attaching a transparent ink composition containing anionic resin particles and water to the fabric using the ink jet method.

Furthermore, the transparent ink attaching step and the above-described reaction solution attaching step include Step 1: applying the reaction solution and the transparent ink composition onto the same region in the fabric in a single scanning of an ink jet head. In addition, in Step 1, a range of a minimum value of a total attachment amount of the reaction solution and the transparent ink composition per unit area/per unit time is 34 mg/(s·inch$^2$) or more. Since the aspect of Step 1 is as described above, a description thereof will not be repeated.

1.2.1 Transparent Ink Composition

The transparent ink composition used in the transparent ink attaching step contains anionic resin particles and water.

Hereinafter, each component contained in the transparent ink composition will be described.

Anionic Resin Particles

The transparent ink composition contains anionic resin particles. Similar to the function of the resin particles, the anionic resin particles have a function as a so-called fixing resin which improves the adhesion of ink attached to the fabric. The anionic resin particles are often handled in the form of an emulsion, but may be in the form of powder.

The "anionic resin particles" refer to resin particles having a negative charge as a whole, and preferably have one or more anionic groups selected from a carboxyl group, a sulfonic acid group, a phosphoric acid group, and the like.

Examples of the resin particles include resin particles made of a urethane resin, an acryl resin (including a styrene-acryl resin), a fluorene resin, an olefin resin, a rosin-modified resin, a terpene resin, an ester resin, an amide resin, an epoxy resin, a vinyl chloride resin, a vinyl chloride-vinyl acetate copolymer, and an ethylene vinyl acetate resin. Among those, the urethane resin, the acryl resin, the olefin resin, and the ester resin are preferable. In addition, the resin particles may be used alone or in combination of two or more kinds thereof.

The urethane resin is a general term for resins having a urethane bond. For the urethane resin, a polyether-type urethane resin including an ether bond in the main chain, an ester-type urethane resin including an ester bond in the main chain, a carbonate-type urethane resin including a carbonate bond in the main chain, or the like may be used in addition to the urethane bond. In addition, a commercially available product may be used as the urethane resin, and examples thereof include Superflex 460, 460s, 840, and E-4000 (product name, manufactured by DKS Co., Ltd.), Resamine D-1060, D-2020, D-4080, D-4200, D-6300, and D-6455 (product name, manufactured by Dainichiseika Color & Chemicals MFG Co., Ltd.), Takelac WS-5100, WS-6021, and W-512-A-6 (product name, manufactured by Mitsui Chemicals Polyurethane Co., Ltd.), Sancure 2710 (product name, manufactured by LUBRIZOL), and Permarin UA-150 (product name, manufactured by Sanyo Chemical Industries Ltd.).

The acryl resin is a generic term for polymers obtained by polymerizing at least an acryl monomer such as a (meth) acrylic acid and a (meth)acrylate as one component, and examples thereof include a resin obtained from an acryl monomer, and a copolymer of an acryl monomer and a monomer other than the acryl monomer. The examples further include an acrylic-vinyl resin which is a copolymer of an acryl monomer and a vinyl monomer. In addition, examples of the vinyl monomer include styrene.

As the acryl monomer, acrylamide, acrylonitrile, and the like can also be used. For a resin emulsion using the acryl resin as a raw material, a commercially available product may be used, and for example, a product selected from FK-854 (product name, manufactured by CHUORIKA KOUGYO Co., Ltd.), Mowinyl 952B and 718A (product names, manufactured by The Nippon Synthetic Chemical Industry Co., Ltd.), Nipol LX852 and LX874 (product names, manufactured by Zeon Corporation), or the like may be used.

The styrene-acryl resin is a copolymer obtained from a styrene monomer and a (meth)acryl monomer, and examples thereof include a styrene-acrylic acid copolymer, a styrene-methacrylic acid copolymer, a styrene-methacrylic acid-acrylate copolymer, a styrene-α-methylstyrene-acrylic acid copolymer, and a styrene-α-methylstyrene-acrylic acid-acrylate copolymer. As the styrene-acryl resin, a commercially available product may be used, and for example, Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (product names, manufactured by BASF), Mowinyl 966A and 975N (product names, manufactured by The Nippon Synthetic Chemical Industry Co., Ltd.), VINYBLAN 2586 (manufactured by Nissin Chemical Industry Co., Ltd.), or the like may be used.

The olefin resin is a polymer having olefin such as ethylene, propylene, and butylene in the structural skeleton, and known ones can be selected as appropriate and used. As the olefin resin, a commercially available product can be used, for example, ARROWBASE CB-1200 and CD-1200 (product names, manufactured by Unitika Ltd.), or the like may be used.

The anionic resin particles are more preferably a urethane resin or an acryl resin, and still more preferably the urethane resin. In this case, there is a tendency that the rubbing fastness is excellent.

A glass transition temperature (Tg) of the resin particles is preferably −60° C. or higher and 50° C. or lower, more preferably −60° C. or higher and 40° C. or lower, and still more preferably −30° C. or higher and 10° C. or lower. With the glass transition temperature (Tg) of the resin particles within the range, there is a tendency that the fabric following property (texture) is more excellent. The glass transition temperature is measured in accordance with JIS K 7121 (Testing Methods for Transition Temperatures of Plastics), using, for example, a differential scanning calorimeter "DSC 7000", manufactured by Hitachi High-Tech Science Corporation.

A content (solid content concentration) of the anionic resin particles is preferably 1% to 30% by mass, more preferably 2% to 25% by mass, still more preferably 4% to 20% by mass, particularly preferably 6% to 15% by mass, and more particularly preferably 8% to 12% by mass with respect to the total amount of the transparent ink composition. When the content of the anionic resin particles is within the range, there is a tendency that more excellent color developing properties and rubbing fastness can be obtained.

Water

The transparent ink composition contains water. As the water, the same water as the above-described reaction solution can be used.

In addition, a water content is preferably 20% by mass or more, more preferably 30% by mass or more, still more preferably 40% by mass or more, and particularly preferably 50% by mass or more with respect to the total mass of the transparent ink composition. An upper limit of the water content is not particularly limited, but is, for example, preferably 90% by mass or less, more preferably 70% by mass or less, and still more preferably 60% by mass or less with respect to the total mass of the transparent ink composition.

Organic Solvent

The transparent ink composition may contain an organic solvent. A type and a content of the organic solvent can each be the same as those of the above-described reaction solution.

In the transparent ink composition, the organic solvent preferably includes an alkanediol, an alkylene glycol ether, and a trialkylene glycol, more preferably includes a 1,2-alkanediol, an alkylene glycol ether, and a trialkylene glycol, and still more preferably includes propylene glycol, triethylene glycol monobutyl ether, and triethylene glycol. When the organic solvent includes these solvents, the color developing properties and the rubbing fastness may be more excellent.

A content of the organic solvent is preferably 10% to 55% by mass, more preferably 15% to 45% by mass, still more preferably 20% to 40% by mass, and particularly preferably 25% to 35% by mass with respect to the total amount of the transparent ink composition. When the content of the organic solvent is within the range, the color developing properties and the rubbing fastness may be more excellent.

Surfactant

The transparent ink composition may contain a surfactant. A type and the like of the surfactant can be the same as those of the above-described reaction solution.

A lower limit of a content of the surfactant is preferably 0.05% by mass or more, more preferably 0.1% by mass or more, still more preferably 0.2% by mass or more, and particularly preferably 0.3% by mass or more with respect to the total mass of the transparent ink composition.

In addition, an upper limit of the content of the surfactant is preferably 3% by mass or less, more preferably 2% by mass or less, still more preferably 1% by mass or less, and particularly preferably 0.8% by mass or less with respect to the total mass of the transparent ink composition. When the content of the surfactant is within the range, there is a tendency that the penetrability of the transparent ink composition to the fabric is easily adjusted to a preferable level.

Other Components

The transparent ink composition may contain additives such as a pH adjuster, a preservative and a fungicide, a rust inhibitor, a chelating agent, a viscosity modifier, a dissolution aid, and an antioxidant, depending on the necessity. When such an additive is contained, a content of the additive is preferably 0.1% to 5% by mass, more preferably 0.1% to 3% by mass, and still more preferably 0.1% to 1% by mass with respect to the total amount of the transparent ink composition.

The transparent ink composition may also contain a coloring material such as a pigment, but a content of the coloring material is preferably 0.2% by mass or less, more preferably 0.1% by mass or less, and still more preferably 0.05% by mass or less with respect to the total mass of the transparent ink composition, with a lower limit thereof being 0% by mass. The transparent ink composition preferably does not contain a coloring material.

Physical Properties

From the viewpoint of reducing skin irritation, a pH of the transparent ink composition is preferably 2.0 or higher, more preferably 5.0 or higher, and still more preferably 7.0 or higher. From the same viewpoint, an upper limit of the pH is preferably 11.5 or less, more preferably 10 or less, still more preferably 9.0 or less, and particularly preferably 8.0 or less.

A viscosity of the transparent ink composition is preferably 1.0 to 10 mPa·s, more preferably 1.5 to 5.0 mPa·s, still more preferably 2.0 to 4.0 mPa·s, and particularly preferably 3.0 to 4.0 mPa·s. In particular, when the viscosity is 3.0 mPa·s or more, there is a tendency that better color developing properties are obtained. When the viscosity is 5.0 mPa·s or less, there is a tendency that better ejection stability is obtained.

A surface tension of the transparent ink composition is preferably 10 to 40 mN/m, more preferably 15 to 35 mN/m, still more preferably 20 to 30 mN/m, and particularly preferably 20 to 27 mN/m.

1.4 Colored Ink Attaching Step

The ink jet textile printing method according to the present embodiment includes a colored ink attaching step of attaching a colored ink composition containing a pigment, resin particles, and water onto a region, to which the transparent ink composition is attached, using the ink jet method.

Since the transparent ink composition attached in the above-described aspect is a resin layer formed favorably in the vicinity of a surface of the fabric, the penetration of the colored ink into the fabric can be suppressed and good color developing properties can be obtained. In addition, by configuring the resin layer to function as a binding layer between the fabric and the colored ink layer, good rubbing fastness can be obtained.

1.4.1 Reaction Solution Attaching Step Performed Simultaneously

From the viewpoint that excellent color developing properties, rubbing fastness, texture, and the like can be obtained, the above-mentioned reaction solution attaching step is preferably performed simultaneously with the colored ink attaching step.

Here, the reaction solution attaching step and the colored ink attaching step being performed "simultaneously" means that a time difference between the last landing of the reaction solution and the first landing of the colored ink composition in the same region in the fabric is within 10 seconds, more preferably within 5 seconds, still more preferably within 3 seconds, and particularly preferably within 1 second.

More specifically, when the reaction solution attaching step and the colored ink attaching step are performed "simultaneously", the reaction solution attaching step and the colored ink attaching step may include Step 3. Step 3: Applying the reaction solution and the colored ink composition to the same region on a fabric in a single scanning of an ink jet head The "scanning" in Step 3 means relatively moving the ink jet head with respect to the recording region in the fabric, and is the same as the "scanning" in the above-described Step 1.

That is, in a case of the serial-type recording method, Step 3 may be performed a plurality of times, and the reaction solution attaching step and the colored ink attaching step may include Step 4: transporting the fabric in a direction that intersects a direction of the scanning, and Step 4 may be performed between Steps 3 performed a plurality of times. This enables the reaction solution and the colored ink composition to be applied onto the same region of the fabric in a plurality of batches.

Step 3 to be performed a plurality of times may be performed two or more times, three or more times, or four or more times. An upper limit of the number of times of Step 3 is not particularly limited, but may be less than 20, less than 15, or less than 10. In addition, when Step 4 is performed n times (n is an integer of 2 or more), it is preferable that Step 3 is performed n—1 times. Step 3 and Step 4 are preferably alternately repeated.

The colored ink attaching step may be performed in the same scanning as in the above-described transparent ink attaching step, but is preferably performed in the different scannings.

When the colored ink attaching step and the transparent ink attaching step are performed in the same scanning, the "scanning" in Step 1 and the "scanning" in Step 3 described above are the same scanning. Therefore, the reaction solution attaching steps associated with Step 1 and Step 3 are the same step. That is, the reaction solution, the transparent ink composition, and the colored ink composition are applied to the same region in the fabric in a single scanning of the ink jet head. This enables the recording speed to be increased. Furthermore, when the fabric is transported between the respective scannings, the above-described Steps 2 and 4 are the same step.

On the other hand, when the colored ink attaching step and the transparent ink attaching step are performed in the different scannings, the "scanning" in Step 1 and the "scanning" in Step 3 described above are the different scanning. Therefore, the reaction solution attaching steps associated with Steps 1 and 3 are the different step. In this case, since the colored ink layer can be formed on the transparent ink layer (resin layer) more favorably formed, there is a tendency that the penetration of the colored ink into the fabric can be further suppressed and better color developing properties are obtained.

In Step 3, a range of the minimum value of a total attachment amount of the reaction solution and the colored ink composition per unit area/per unit time is preferably 50 mg/(s·inch$^2$) or more, more preferably 60 mg/(s·inch$^2$) or more, still more preferably 70 mg/(s·inch$^2$) or more, particularly preferably 80 mg/(s·inch$^2$) or more, and more particularly preferably 90 mg/(s·inch$^2$) or more.

By using the ink jet textile printing method according to the present embodiment, even when the total attachment amount of the reaction solution and the ink is large as described above, there is a tendency that the penetration of the colored ink into the fabric can be suppressed and good color developing properties are obtained.

A range of the maximum value of the total attachment amount of the reaction solution and the colored ink composition per unit area/per unit time is not particularly limited, but is preferably 500 mg/(s inch$^2$) or less, more preferably 400 mg/(s·inch$^2$) or less, still more preferably 300 mg/(s·inch$^2$) or less, even still more preferably 200 mg/(s·inch$^2$) or less, and particularly preferably 150 mg/(s·inch$^2$) or less.

When the range of the maximum value is within the range, there is a tendency that the color developing properties and the rubbing fastness can be made better.

Furthermore, the total attachment amount of the reaction solution and the colored ink composition per unit area/per unit time can be adjusted as appropriate by changing the printing area, the application amount of the ink, the carriage movement speed, the head drive frequency, or the like in a single scanning.

The printing area in a single scanning is preferably, for example, 3 to 30 inch$^2$, more preferably 5 to 20 inch$^2$, and still more preferably 7 to 15 inch$^2$.

An application amount of the reaction solution and the colored ink composition in a single scanning is, for example, preferably 200 to 2,000 mg, more preferably 400 to 1,500 mg, and still more preferably 800 to 1,000 mg.

A carriage movement speed in a serial type is preferably, for example, 6 to 40 inch/s, more preferably 6 to 30 inch/s, still more preferably 6 to 20 inch/s, particularly preferably 8 to 17 inch/s, and more particularly preferably 10 to 15 inch/s.

In Step 3, a ratio (A/C) of an attachment amount (A) of the reaction solution per unit area/per unit time to an attachment amount (C) of the colored ink composition per unit area/per unit time is preferably 0.1 to 1.5, more preferably 0.2 to 1.0, still more preferably 0.3 to 0.7, and particularly preferably 0.4 to 0.6. When the ratio (A/C) is within the range, there is a tendency that the resin layer can be formed more favorably in the vicinity of a surface of the fabric, there is a tendency that the penetration of the colored ink into the fabric can be further suppressed and better color developing properties are obtained.

1.4.2 Colored Ink Composition

The colored ink composition used in the colored ink attaching step contains a pigment, resin particles, and water.

Hereinafter, each component contained in the colored ink composition will be described.

Pigment

The colored ink composition contains a pigment. As the pigment, for example, an inorganic pigment or an organic pigment can be used. Furthermore, the pigment is one kind of the coloring material. Examples of the coloring material include a pigment and a dye.

The inorganic pigment is not particularly limited, and examples thereof include carbon blacks such as furnace black, lamp black, acetylene black, and channel black; and white pigments such as iron oxide, titanium oxide, zinc oxide, and silica.

Examples of the carbon blacks include Colour Index Generic Name (C. I.) Pigment Black 1, 7, and 11. Commercially available products may be used as the carbon blacks, for example, No. 2300, No. 900, MCF88, No. 33, No. 40, No. 45, No. 52, MA7, MA8, MA100, No. 2200B, and the like from Mitsubishi Chemical Corporation, Raven (registered trademark) 5750, 5250, 5000, 3500, 1255, 700, and the like from Columbia Carbon Inc., Regal (registered trademark) 400R, 330R, and 660R, Mogul (registered trademark) L, Monarch (registered trademark) 700, 800, 880, 900, 1000, 1100, 1300, 1400, and the like from Cabot Corporation, and Color Black FW1, FW2, FW2V, FW18, FW200, S150, S160, and S170, Printex (registered trademark) 35, U, V, and 140U, and Special Black 6, 5, 4A, 4, and the like from Degussa Corporation.

Examples of the white pigment include C. I. Pigment White 1, which is basic lead carbonate, C. I. Pigment White 4 made of zinc oxide, C. I. Pigment White 5 made of a mixture of zinc sulfide and barium sulfate, C. I. Pigment White 6 made of titanium dioxide, C. I. Pigment White 6: 1 made of titanium dioxide containing other metal oxides, C. I. Pigment White 7 made of zinc sulfide, C. I. Pigment White 18 made of calcium carbonate, C. I. Pigment White 19 made of clay, C. I. Pigment White 20 made of mica titanium, C. I. Pigment White 21 made of barium sulfate, C. I. Pigment White 22 made of gypsum, C. I. Pigment White 26 made of magnesium oxide and silicon dioxide, C. I. Pigment White 27 made of silicon dioxide, and C. I. Pigment White 28 made of anhydrous calcium silicate. Among these, C. I. Pigment White 6 which is excellent in color developing properties, masking properties, and the like is preferably used.

The average particle diameter of the white pigment is preferably 100 nm or more and 500 nm or less, more preferably 50 nm or more and 450 nm or less, and still more preferably 200 nm or more and 400 nm or less. By setting the average particle diameter of the white pigment within the range, there is a tendency that the ejection stability from the ink jet head can be ensured. In addition, there is a tendency that the masking properties can be improved. Furthermore, in the present specification, the "average particle diameter" refers to a volume-based particle size distribution, which is a particle diameter at 50% by volume cumulative distribution, unless otherwise specified. The average particle diameter is measured by the dynamic light scattering method or the laser diffraction light method described in JIS Z8825. Specifically, a particle size analyzer (for example, "Microtrac UPA" manufactured by Nikkiso Co., Ltd.) using the dynamic light scattering method as a measurement principle can be used.

Examples of the organic pigment include a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolo-pyrrole-based pigment, a perinone-based pigment, a quinophthalone-based pigment, an anthraquinone-based pigment, a thioindigo-based pigment, a benzoimidazolone-based pigment, an isoindolinone-based pigment, an azomethine-based pigment, and an azo-based pigment.

Specific examples of the organic pigment include the followings.

Examples of the cyan pigment include C. I. Pigment Blue 1, 2, 3, 15:3, 15:4, 15:34, 16, 22, and 60; and C. I. Vat Blue 4, 60, and preferably include one or a mixture of two or more selected from the group consisting of C. I. Pigment Blue 15:3, 15:4, and 60.

Examples of the magenta pigment include C. I. Pigment Red 5, 7, 12, 48 (Ca), 48 (Mn), 57 (Ca), 57:1, 112, 122, 123, 168, 184, and 202, and C. I. Pigment Violet 19, and preferably include one or a mixture of two or more selected from the group consisting of C. I. Pigment Red 122, 202, and 209, and C. I. Pigment Violet 19.

Examples of the yellow pigment include C. I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185, and preferably include a mixture of one or two or more selected from the group consisting of C. I. Pigment Yellow 74, 109, 110, 128, 138, 150, and 180.

Pigments of other colors can also be used. Examples thereof include an orange pigment and a green pigment.

The pigment may be used alone or may be used in combination of two or more kinds thereof.

The pigment contained in the colored ink composition is preferably a white pigment. A colored ink composition (white ink) containing a white pigment is suitable for forming a white ink layer as a base layer, but an attachment amount of the white ink is required to be relatively large. Therefore, there is a tendency that the total amount of the reaction solution or the ink to be attached increases, and it is particularly difficult to achieve both rubbing fastness and color developing properties. On the other hand, by using the ink jet textile printing method according to the present embodiment, even with a colored ink composition containing a white pigment, excellent rubbing fastness and color developing properties can be obtained.

A content of the pigment (in particular, the white pigment) is preferably 1% to 30% by mass, more preferably 2% to 25% by mass, still more preferably 4% to 20% by mass, particularly preferably 6% to 15% by mass, and more particularly preferably 8% to 12% by mass with respect to the total amount of the colored ink composition. When the content of the pigment is within the range, there is a tendency that the rubbing fastness can be made better and better color developing properties (whiteness) can be obtained.

The pigment may be used after being dispersed by using a pigment dispersant. In addition, the pigment may be used after being dispersed as a self-dispersing pigment by oxidizing or sulfonating a surface of the pigment with ozone, hypochlorous acid, fuming sulfuric acid, or the like.

The pigment dispersant has a function of dispersing the pigment in the ink. The pigment dispersant may be water-soluble, but is preferably not completely water-soluble, and it is considered that the pigment dispersant is partially or entirely bonded to or adsorbed on the pigment to enhance the hydrophilicity of a surface of the pigment to disperse the pigment.

The pigment dispersant is a polymer compound, and examples thereof include acrylic resins such as a poly(meth) acrylic acid, a (meth)acrylic acid-acrylonitrile copolymer, a (meth)acrylic acid-(meth)acrylate copolymer, a vinyl acetate-(meth)acrylate copolymer, a vinyl acetate-(meth) acrylic acid copolymer, a vinylnaphthalene-(meth)acrylic acid copolymer, a styrene-(meth)acrylic acid copolymer, a styrene-(meth)acrylic acid copolymer, a styrene-(meth) acrylic acid-(meth)acrylate copolymer, a styrene-α-methyl-styrene-(meth)acrylic acid copolymer, and a styrene-α-methylstyrene-(meth)acrylic acid-(meth)acrylate copolymer, and salts thereof.

In addition, examples of the pigment dispersant include resins such as maleic acid-based resins such as a styrene-maleic acid copolymer, a styrene-maleic anhydride copolymer, a vinylnaphthalene-maleic acid copolymer, and a vinyl acetate-maleate copolymer, and salts thereof; urethane-based resins with or without a cross-linked structure and salts thereof; polyvinyl alcohols; and a vinyl acetate-crotonic acid copolymer and a salt thereof.

Furthermore, the acrylic resin may be a copolymer of an acrylic monomer and another monomer, in addition to the polymer of the acrylic monomers as mentioned above. For example, an acrylic vinyl resin which is a copolymer with a vinyl-based monomer as another monomer is also referred to as an acrylic resin. In addition, for example, among the styrene-based resins, those which are copolymers of a styrene-based monomer and an acrylic monomer are also included in the acrylic resin. Furthermore, in a case of referring to the acrylic resin, salts and esterified products thereof are also included.

Examples of a commercially available product of the pigment dispersant include X-200, X-1, X-205, X-220, and X-228 (manufactured by Seiko PMC Corporation), Nopco Sperse (registered trademark) 6100 and 6110 (manufactured by San Nopco Ltd.), Joncryl 67, 586, 611, 678, 680, 682, and 819 (manufactured by BASF), DISPERBYK-190 (manufactured by BYK Chemie Japan K. K.); and N-EA137, N-EA157, N-EA167, N-EA177, N-EA197D, N-EA207D, and E-EN10 (manufactured by DKS Co., Ltd.).

Examples of a commercially available product of the acrylic pigment dispersant include BYK-187, BYK-190, BYK-191, BYK-194N, and BYK-199 (manufactured by BYK Chemie Japan K. K.), and Aron A-210, A6114, AS-1100, AS-1800, A-30SL, A-7250, and CL-2 (manufactured by Toagosei Co., Ltd.).

Examples of a commercially available product of the urethane-based pigment dispersant include BYK-182, BYK-183, BYK-184, and BYK-185 (manufactured by BYK Chemie Japan K. K.); TEGO Disperse 710 (manufactured by Evonik Tego Chemie GmbH); and Borchi (registered trademark) Gen 1350 (manufactured by OMG Borschers GmbH).

The pigment dispersant is preferably an anionic pigment dispersant. The "anionic pigment dispersant" refers to a pigment dispersant having a negative charge as a whole, and preferably has one or more anionic groups selected from a carboxyl group, a sulfonic acid group, a phosphoric acid group, and the like.

It is preferable that at least one of the pigment and resin particles described later in the colored ink composition is anionic. In this case, the aggregation action through the aggregating agent is excellent, and therefore, there is a tendency that better color developing properties can be obtained and better rubbing fastness can be obtained.

The expression that the pigment is anionic means that the pigment has a negative charge as a whole, and the pigment preferably has one or more anionic groups selected from a carboxyl group, a sulfonic acid group, a phosphoric acid group, and the like. The anionic group may be directly present on the pigment surface, or may be present via an anionic resin dispersant adsorbed or bonded to the pigment.

The pigment dispersant may be used alone or may be used in combination of two or more kinds thereof. The total content of the pigment dispersant is preferably 0.1% by mass or more and 30% by mass or less, more preferably 0.5% by mass or more and 25% by mass or less, still more preferably 1% by mass or more and 20% by mass or less, and particularly preferably 1.5% by mass or more and 15% by mass or less with respect to 100% by mass of the colored ink composition. When the content of the pigment dispersant is 0.1% by mass or more, there is a tendency that the dispersion stability of the pigment can be ensured. In addition, when the content of the pigment dispersant is 30% by mass or less, there is a tendency that the viscosity of the colored ink composition can be suppressed to be low.

In addition, a weight-average molecular weight of the pigment dispersant is more preferably 500 or more. By using such a pigment dispersant, there is a tendency that the odor is reduced and the dispersion stability of the pigment can be made better.

When a pigment (in particular, a white pigment) is dispersed by the pigment dispersant, a ratio of the pigment to the pigment dispersant is preferably 10:1 to 1:10, and more preferably 4:1 to 1:3.

Resin Particles

The colored ink composition contains resin particles. Since the resin particles can be in the same mode as the "resin particles" of the anionic resin particles contained in the above-described transparent ink composition, a description thereof will not be repeated.

The resin particles in the colored ink composition are preferably anionic. In this case, the aggregation action through the aggregating agent is excellent, and therefore, there is a tendency that better color developing properties can be obtained and better rubbing fastness can be obtained.

The resin particles in the colored ink composition are preferably a urethane resin or an acryl resin, and more preferably the urethane resin. In this case, there is a tendency that the rubbing fastness is excellent.

A glass transition temperature (Tg) of the resin particles in the colored ink composition is preferably −60° C. or higher and 50° C. or lower, more preferably −60° C. or higher and 40° C. or lower, and still more preferably −30° C. or higher and 10° C. or lower. With the glass transition temperature (Tg) of the resin particles within the range, there is a tendency that the fabric following property (texture) is more excellent.

A content (solid content concentration) of the resin particles is preferably 1% to 30% by mass, more preferably 2% to 25% by mass, still more preferably 4% to 20% by mass, particularly preferably 6% to 15% by mass, and more particularly preferably 8% to 12% by mass with respect to the total amount of the colored ink composition. When the content of the resin particles is within the range, there is a tendency that more excellent color developing properties and rubbing fastness can be obtained.

Water

The colored ink composition contains water. As the water, the same water as the above-described reaction solution can be used.

In addition, a water content is preferably 20% by mass or more, more preferably 30% by mass or more, still more preferably 40% by mass or more, and particularly preferably 50% by mass or more with respect to the total mass of the colored ink composition. An upper limit of the water content is not particularly limited, but is, for example, preferably 90% by mass or less, and more preferably 70% by mass or less with respect to the total mass of the colored ink composition.

Organic Solvent

The colored ink composition may contain an organic solvent. A type and a content of the organic solvent can each be the same as those of the above-described reaction solution.

In the colored ink composition, the organic solvent preferably includes an alkanediol, an alkylene glycol ether, and a trialkylene glycol, more preferably includes a 1,2-alkanediol, an alkylene glycol ether, and a trialkylene glycol, and still more preferably includes propylene glycol, triethylene glycol monobutyl ether, and triethylene glycol. When the organic solvent includes these solvents, the color developing properties and the rubbing fastness may be more excellent.

In addition, the colored ink composition further preferably contains 3.0% by mass or more, more preferably 4.0% by mass or more, and still more preferably 5.0% by mass or more of an organic solvent having a normal boiling point of 250° C. or higher. An upper limit of the content is not particularly limited, but is preferably 20% by mass or less, more preferably 15% by mass or less, and still more preferably 10% by mass or less.

When the organic solvent having a normal boiling point of 250° C. or higher is contained at a content within the range, there is a tendency that the nozzles of the ink jet head are kept moist and the ejection reliability (continuous printing stability) can be made better. Such an aspect is particularly useful when the reaction solution and the colored ink composition are attached to the same region of the fabric in the same scanning, in which the aggregates are likely to be generated in the nozzles.

Furthermore, examples of the organic solvent having a normal boiling point of 250° C. or higher include glycerin and polyethylene glycol monomethyl ether. Furthermore, the organic solvent having a normal boiling point of 250° C. or higher is also referred to as a moisturizer. The organic solvent having a normal boiling point of 250° C. or higher preferably has a normal boiling point of 270° C. or higher, and more preferably has a normal boiling point of 280° C. or higher.

A content of the organic solvent is preferably 5% to 50% by mass, more preferably 10% to 40% by mass, still more preferably 15% to 35% by mass, and particularly preferably 20% to 30% by mass with respect to the total amount of the colored ink composition. When the content of the organic solvent is within the range, the color developing properties and the rubbing fastness may be more excellent.

Surfactant

The colored ink composition may contain a surfactant. A type and the like of the surfactant can be the same as those of the above-described reaction solution.

A lower limit of a content of the surfactant is preferably 0.05% by mass or more, more preferably 0.1% by mass or more, still more preferably 0.2% by mass or more, and particularly preferably 0.3% by mass or more with respect to the total mass of the colored ink composition.

In addition, an upper limit of the content of the surfactant is preferably 3% by mass or less, more preferably 2% by mass or less, still more preferably 1% by mass or less, and particularly preferably 0.8% by mass or less with respect to the total mass of the colored ink composition. When the content of the surfactant is within the range, there is a tendency that the penetrability of the colored ink composition to the fabric is easily adjusted to a preferable level.

Other Components

The colored ink composition may contain additives such as a pH adjuster, a preservative and a fungicide, a rust inhibitor, a chelating agent, a viscosity modifier, a dissolution aid, and an antioxidant, depending on the necessity. When such an additive is contained, a content of the additive is preferably 0.1% to 5% by mass, more preferably 0.1% to 3% by mass, and still more preferably 0.1% to 1% by mass with respect to the total amount of the colored ink composition.

Physical Properties

From the viewpoint of reducing skin irritation, a pH of the colored ink composition is preferably 2.0 or higher, more preferably 5.0 or higher, and still more preferably 7.0 or higher. From the same viewpoint, an upper limit of the pH is preferably 11.5 or less, more preferably 10 or less, still more preferably 9.0 or less, and particularly preferably 8.0 or less.

The viscosity of the colored ink composition is preferably 1.0 to 10 mPa·s, more preferably 2.0 to 10 mPa·s, still more preferably 3.0 to 8.0 mPa·s, and particularly preferably 4.0 to 6.0 mPa·s. In particular, when the viscosity is 4.0 mPa·s or more, there is a tendency that better color developing properties are obtained. When the viscosity is 6.0 mPa·s or less, there is a tendency that better ejection stability is obtained.

A surface tension of the transparent ink composition is preferably 10 to 40 mN/m, more preferably 15 to 35 mN/m, still more preferably 20 to 30 mN/m, and particularly preferably 20 to 27 mN/m.

1.5 Second Transparent Ink Attaching Step

The ink jet textile printing method according to the present embodiment may further have a second transparent ink attaching step of attaching a second transparent ink composition containing anionic resin particles and water onto a region of the fabric, to which the colored ink composition is attached, using the ink jet method.

This makes the colored ink layer overcoated with the second transparent ink, whereby the rubbing fastness is further improved. In particular, there is an effect of being able to further suppress a change in color due to dry rubbing.

The attachment of the second transparent ink composition in the second transparent ink attaching step can be performed by relatively moving the ink jet head with respect to the recording region in the fabric.

In the second transparent ink attaching step, the reaction solution and the second transparent ink composition may be applied to the same region in the fabric in a single scanning of the ink jet head, in the same manner as the above-described transparent ink attaching step. The aspect of this case can be the same as in the above-described Step 1, and the attachment amount and the like can also be the same.

The range of the minimum value of the attachment amount of the second transparent ink per unit area/per unit time during a single scanning of the ink jet head is preferably 15 mg/(s·inch$^2$) or more, more preferably 20 mg/(s·inch$^2$) or more, still more preferably 25 mg/(s·inch$^2$) or more, and particularly preferably 30 mg/(s·inch$^2$) or more.

The range of the maximum value of the attachment amount of the second transparent ink per unit area/per unit time during a single scanning of the ink jet head is not particularly limited, but is preferably 150 mg/(s inch$^2$) or less, more preferably 100 mg/(s·inch$^2$) or less, still more preferably 75 mg/(s·inch$^2$) or less, and particularly preferably 50 mg/(s·inch$^2$) or less.

Furthermore, a total attachment amount of the second ink composition per unit area/per unit time can be adjusted as appropriate by changing the printing area, the application amount of the ink, the carriage movement speed, the head drive frequency, or the like in a single scanning.

The printing area in a single scanning is preferably, for example, 3 to 30 inch$^2$, more preferably 5 to 20 inch$^2$, and still more preferably 7 to 15 inch$^2$.

An application amount of the second ink composition in a single scanning is, for example, preferably 50 to 500 mg, more preferably 100 to 400 mg, and still more preferably 200 to 350 mg.

A carriage movement speed in a serial type is preferably, for example, 6 to 40 inch/s, more preferably 6 to 30 inch/s, still more preferably 6 to 20 inch/s, particularly preferably 8 to 17 inch/s, and more particularly preferably 10 to 15 inch/s.

The second transparent ink composition is the same as the above-described transparent ink composition, and thus, a description thereof will not be repeated. As the second transparent ink composition, the same composition as the above-described transparent ink composition may be used. It is preferable in that it is not necessary to separately provide the nozzle row and the recording apparatus can be miniaturized by using the same composition.

1.6 Heating and Drying Step

The ink jet textile printing method according to the present embodiment may be further provided with heating and drying the ink and the like attached to the fabric (heating and drying step) after the above-mentioned attaching step of the reaction solution and the ink.

The heating and drying method is not particularly limited, and examples thereof include a belt conveyor oven, a normal pressure steam method, a high pressure steam method, and a thermofix method. A heat source at the time of heating and drying is not particularly limited, but for example, an infrared lamp or the like can be used.

The heating and drying temperature is preferably a temperature at which the resin particles that can be included in the ink are fused and the medium such as water is volatilized. The heating and drying temperature is, for example, preferably 100° C. or higher and 250° C. or lower, more preferably 120° C. or higher and 230° C. or lower, still more preferably 140° C. or higher and 200° C. or lower, and particularly preferably 150° C. or higher and 180° C. or lower. Here, the heating and drying temperature in the heating and drying step refers to a surface temperature of an image and the like formed on the fabric. A time for carrying out heating and drying is not particularly limited, but is, for example, preferably 30 seconds or more and 20 minutes or less, and more preferably 2 minutes or more and 5 minutes or less.

1.7 Other Steps

The ink jet textile printing method according to the present embodiment may be provided with washing the fabric on which the recording is performed with water, performing heating and drying again, and the like. In the washing with water, as a soaping treatment, components such as ink not fixed on the fabric may be washed away using a hot soap liquid or the like, depending on the necessity.

1.8 Ink Jet Recording Apparatus

An ink jet recording apparatus which can be preferably used in the ink jet textile printing method according to the present embodiment will be described.

As an example of the ink jet recording apparatus, a perspective view of a serial printer is shown in FIG. 1. As shown in FIG. 1, a serial printer 20 is provided with a transport section 220 and a recording section 230. The transport section 220 transports a recording medium F fed to the serial printer to the recording section 230, and discharges the recording medium after recording to the outside of the serial printer. Specifically, the transport section 220 has each feeding roller and transports the fed recording medium F in a transport direction TD.

In addition, the recording section 230 is provided with a carriage 234, on which an ink jet head 231 having nozzles that eject a reaction solution, nozzles that eject a transparent ink composition, and nozzles that eject a colored ink composition, each to the recording medium F fed from the transport section 220, is mounted, and a carriage moving mechanism 235 that moves the carriage 234 in a scanning direction SD of the recording medium F.

Figure 2:
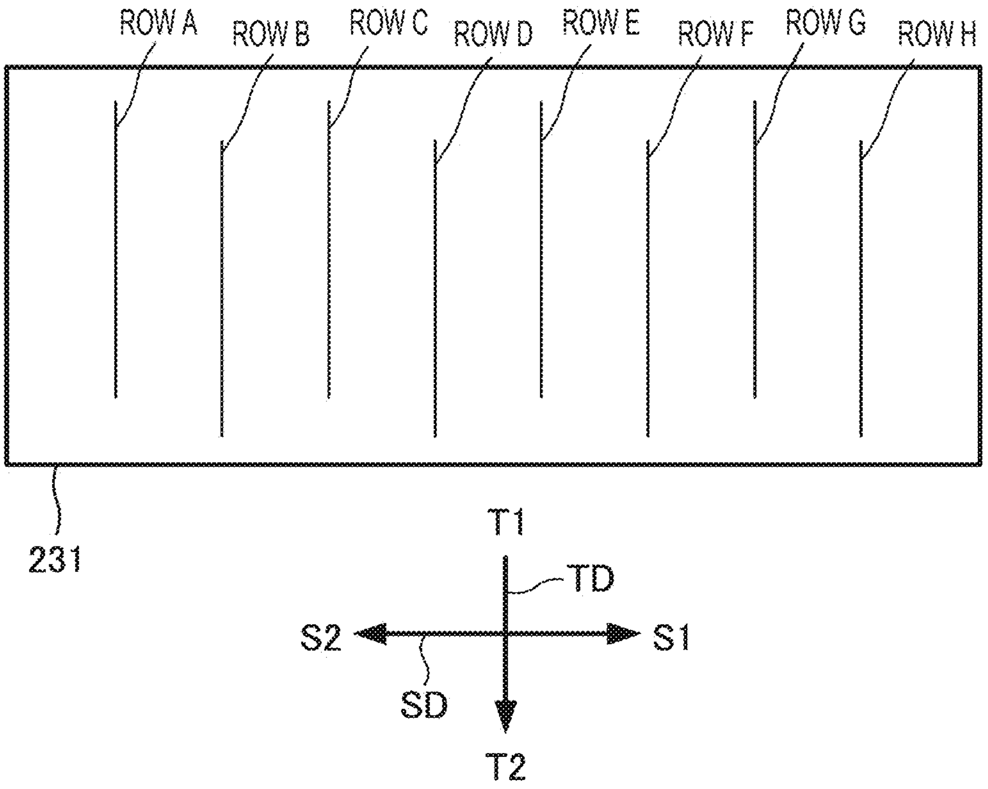
FIG. 2 is a schematic view showing an example of a nozzle row arrangement of an ink jet head according to the first embodiment of the present disclosure.

FIG. 2 shows an example of each nozzle row contained in the nozzle surface of the ink jet head 231. In FIG. 2, the ink jet head 231 has a plurality of nozzle rows made up of a plurality of nozzles arranged along a direction (transport direction TD) that intersects a direction in which the ink jet head 231 is moved (scanning direction SD), in which the rows are rows A to H arranged along the scanning direction SD.

At this time, by arranging the nozzle rows that eject the reaction solution such that in a case of being projected along the scanning direction SD, the nozzle rows that eject the reaction solution overlap with at least a part of the nozzle rows that eject the transparent ink composition in the transport direction TD, the above-described Step 1 (application of the reaction solution and the transparent ink composition in a single scanning of the ink jet head to the same region in the fabric) can be performed. Similarly, when the nozzle rows that eject the reaction solution are arranged such that in a case of being projected along the scanning direction SD, the nozzle rows that eject the reaction solution overlap with at least a part of the nozzle rows that eject the colored ink composition in the transport direction TD, the above-described Step 3 (application of the reaction solution and the colored ink composition in a single scanning of the ink jet head to the same region in the fabric) can be performed.

The ink and the like to be ejected from each nozzle row are selected as appropriate, but for example, it is preferable to select rows A to B as the nozzle rows that eject the reaction solution, rows C to D as the nozzle rows that eject the transparent ink composition, and rows E to H as the nozzle row that eject the colored ink composition.

In a case of a serial printer, a head having a length smaller than the width of the recording medium is provided as the ink jet head 231, and recording is performed as the head moves in the scanning direction SD that intersects the transport direction TD of the recording medium F. In addition, in the serial printer, the head 231 is mounted on the carriage 234 that moves in a predetermined direction, and the head moves by means of the movement of the carriage to eject the ink composition and the reaction solution onto the recording medium. The transport of the recording medium may be performed between the respective scannings.

In addition, the ink jet device is not limited to the serial-type printer and may be a line-type printer. A schematic side view of the line printer as another example of the ink jet recording apparatus is shown in FIG. 3. As shown in FIG. 3, a line printer 1 is provided with a feeding section 100, a transport mechanism 200 that transports a recording medium in a transport direction, a line head 300 that ejects an ink to the recording medium to attach the ink to the recording medium, a control section 500, and a discharge section 700.

The transport mechanism is a mechanism that transports the recording medium in the transport direction. In FIG. 3, a roll-shaped recording medium F is supplied from the feeding section 100 to the transport mechanism 200, and the transport mechanism 200 is configured to be able to transport the recording medium F fed from the feeding section 100 to the line head 300. Specifically, the transport mechanism 200 has a first feeding roller 201 and a second feeding roller 202, and is configured to be able to transport the fed recording medium F to the line head 300 downstream in the transport direction. As the transport method for the transport mechanism 200, a method known in the related art can be appropriately used, or one or a plurality of rollers, a belt transported by a roller, or the like may be used.

The line printer 1 has a line head 300 having a length corresponding to a width of the recording medium F. The line head 300 may be composed of a plurality of line jets, and in FIG. 3, the line head 300 is composed of a first line head 310, a second line head 320, a third line head 330, and a fourth line head 340. Furthermore, when it is not necessary to distinguish the first line head 310, the second line head 320, the third line head 330, and the fourth line head 340, the line heads are simply referred to as a line head 300.

The line head 300 has cavities that accommodate the reaction solution, the transparent ink composition, and the colored ink composition (the ink and the like), an ejection drive section provided for each cavity, and nozzles that eject the ink and the like. A plurality of the cavities, and the ejection drive section and the nozzles provided for each cavity may be each independently provided in one head. The ejection drive section can be formed using an electromechanical conversion element such as a piezoelectric element that changes the volume of the cavity through mechanical deformation; an electronic heat conversion element that generates and ejects air bubbles in the ink by generating heat; or the like.

The line head 300 is preferably configured, for example, to eject the reaction solution from the first line head 310 and the transparent ink composition from the second line head 320. In this way, the above-described Step 1 can be suitably performed. In addition, it is preferable to eject the reaction solution from the third line head 330 and the colored ink composition from the fourth line head 340. In this way, it is easy to perform the reaction solution attaching step and the colored ink attaching step simultaneously.

In the line printer, the head is fixed (substantially) without moving, and recording is performed in a single scanning of the ink jet head. The line printer is more advantageous than the serial printer in terms of a recording speed.

2. Set

The set according to one embodiment of the present disclosure is a set used in the above-described ink jet textile printing method, the set including the reaction solution; the transparent ink composition; and the colored ink composition, each described above.

By using the set according to the present embodiment, good color developing properties and rubbing fastness can be obtained. Since the reaction solution, the transparent ink composition, and the colored ink composition included in the set are as described above, descriptions thereof will not be repeated.

Hereinafter, a second embodiment of the present disclosure will be described. The embodiments described below describe examples of the present disclosure. The present disclosure is not limited to the following embodiments, and includes various modifications implemented within a range not changing the gist of the present disclosure. Furthermore, it should be noted that not all of the configurations described below are essential configurations of the present disclosure.

In the present specification, a numerical range indicated by using "to" means a range including numerical values described before and after "to" as a lower limit value and an upper limit value.

In the present specification, the "ink jet method" refers to a droplet ejecting method using an ink jet method.

In the present specification, "(meth)acrylic" represents acrylic or methacrylic and "(meth)acrylate" represents acrylate or methacrylate.

1. Ink Jet Textile Printing Method

The ink jet textile printing method according to one embodiment of the present disclosure includes a reaction solution attaching step of attaching a reaction solution containing an aggregating agent that aggregates components in an ink, and water to a fabric, a transparent ink attaching step of attaching a transparent ink composition containing anionic resin particles that react with the aggregating agent and are aggregated, and water to the fabric, a colored ink attaching step of attaching a colored ink composition containing a pigment, resin particles, and water onto a region of the fabric, to which the transparent ink composition is attached, using the ink jet method, and a pressure applying step of applying pressure to a region of the fabric, to which the reaction solution and the transparent ink composition are attached, after the reaction solution attaching step and the transparent ink attaching step, in which the fabric is mounted on a mounting table, and the reaction solution attaching step, the transparent ink attaching step, the pressure applying step, and the colored ink attaching step are performed without changing a relative positional relationship between the fabric and the mounting table between the respective steps.

In the related art, a treatment of attaching a reaction solution that aggregates the components of an ink to a fabric is performed in order to improve the color developing properties of a coloring material in ink jet textile printing. Since the treatment is usually performed using an apparatus or equipment different from an ink jet recording apparatus or is often performed manually, large-scale equipment or a complicated step was required. In this regard, studies were made on an aspect in which the reaction solution and the ink are continuously attached to the same apparatus or the like.

In such an aspect, it is not necessary to use another apparatus or equipment and the steps can be simplified.

However, when the reaction solution and the ink are continuously attached to the same apparatus or the like, the fluffing of the fabric cannot be suppressed and the image quality disturbance is likely to occur.

On the other hand, by using the ink jet textile printing method according to the present embodiment, the aggregating agent in the reaction solution aggregates the components of the transparent ink on the fabric, thereby forming a high-viscosity gel-like aggregate in the vicinity of a surface of the fabric. In a case of applying a pressure (wiping) with a rubber blade or the like to the fabric surface to which the aggregate is attached, the fluff is fixed in a fallen state by the viscosity of the gel-like aggregate. Then, by attaching the colored ink thereonto, an effect of the fluffing of the printing surface can be reduced, leading to formation of an image.

Hereinafter, each step of the ink jet textile printing method according to the present embodiment will be described.

1.1 Reaction Solution Attaching Step

The ink jet textile printing method according to the present embodiment includes a reaction solution attaching step of attaching a reaction solution containing an aggregating agent that aggregates components in an ink, and water to a fabric.

1.1.1 Attachment Mode

A unit for attaching the reaction solution to the fabric is not particularly limited, and examples thereof include dip coating in which the fabric is dipped in the reaction solution, roller coating in which the reaction solution is attached using a brush, a roller, a spatula, a roll coater, or the like, spray coating in which the reaction solution is jetted by a spray device, and ink jet coating in which the reaction solution is attached using an ink jet method. Among these, the ink jet method is preferable, and the reaction solution attaching step and a transparent ink attaching step described later are preferably performed using the ink jet method. In this case, the reaction solution and the transparent ink can be selectively attached to an image forming region of a colored ink to be attached to the fabric by a colored ink attaching step described later, and the occurrence of treatment marks in a non-image forming region can be suppressed.

A total application amount of the reaction solution and the transparent ink composition described later is preferably 0.02 g/inch$^2$ or more, more preferably 0.05 g/inch$^2$ or more, still more preferably 0.07 g/inch$^2$ or more, and particularly preferably 0.10 g/inch$^2$ or more. When the total application amount is within the range, there is a tendency that the fluff fixing effect is further improved and the image quality disturbance due to the fluffing of the fabric can be further reduced.

An upper limit of the total application amount is not particularly limited, but is preferably 1.0 g/inch$^2$ or less, more preferably 0.50 g/inch$^2$ or less, still more preferably 0.30 g/inch$^2$ or less, and particularly preferably 0.15 g/inch$^2$ or less.

An application amount ratio of the reaction solution to the transparent ink composition described later is preferably 1:10 to 10:1, more preferably 3:10 to 10:3, still more preferably 5:10 to 10:5, particularly preferably 7:10 to 10:7, and more particularly preferably 9:10 to 10:9. When the application amount ratio is within the range, there is a tendency that the fluff fixing effect is further improved and the image quality disturbance due to the fluffing of the fabric can be further reduced.

A time difference between the attachment of the reaction solution and the attachment of the transparent ink composition to the same region of the fabric is preferably within 30 seconds, more preferably within 15 seconds, still more preferably within 5 seconds, still more preferably within 1 second, particularly preferably within 0.5 seconds, and more particularly preferably within 0.1 seconds. When the time difference is within the range, there is a tendency that the image quality disturbance due to the fluffing of the fabric can be further reduced and the color developing properties can be made better.

The reaction solution attaching step and the transparent ink attaching step described later preferably include Step 1.

Step 1: Applying the Reaction Solution and the Transparent Ink Composition to the Same Region in the Fabric in the Same Single Scanning By the application through Step 1, the reaction solution and the transparent ink composition can be continuously applied to the fabric using the ink jet method in the same apparatus, and there is a tendency that the image quality disturbance due to the fluffing of the fabric can be further reduced and the color developing properties can be made better.

Here, the "scanning" in Step 1 means moving the ink jet head relative to the recording region in the fabric. In this case, the scanning may be performed by moving the ink jet head with respect to the fabric or by moving the fabric with respect to the ink jet head. In addition, the relative positional relationship between the ink jet head and the fabric may change by moving the positions of both of the ink jet head and the fabric.

Figure 9:
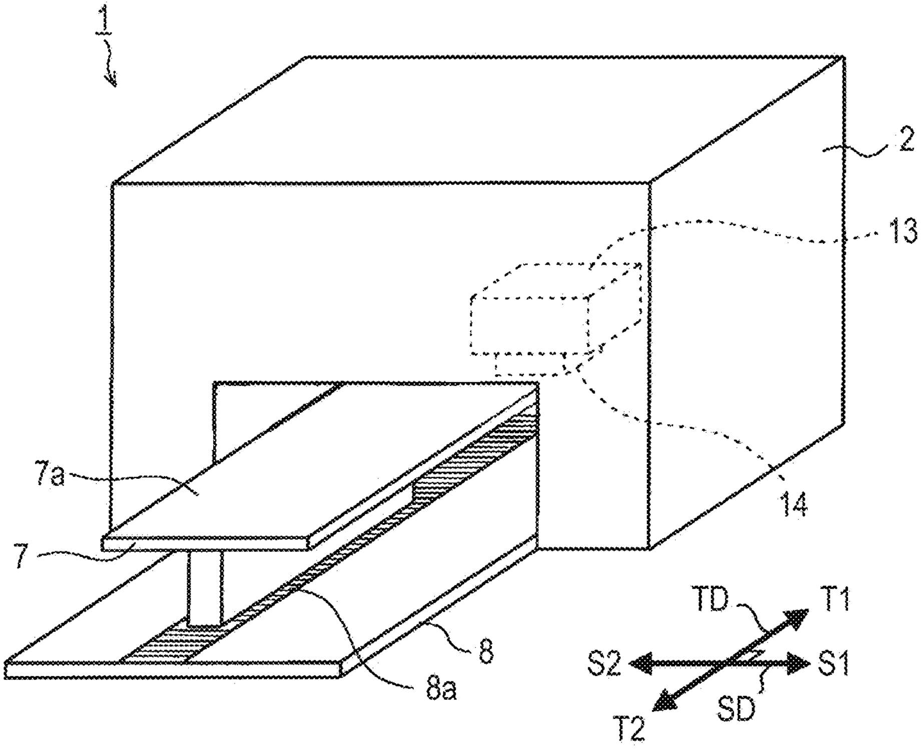
FIG. 9 is a perspective view of an ink jet textile printing apparatus according to a second embodiment of the present disclosure.
Figure 10:
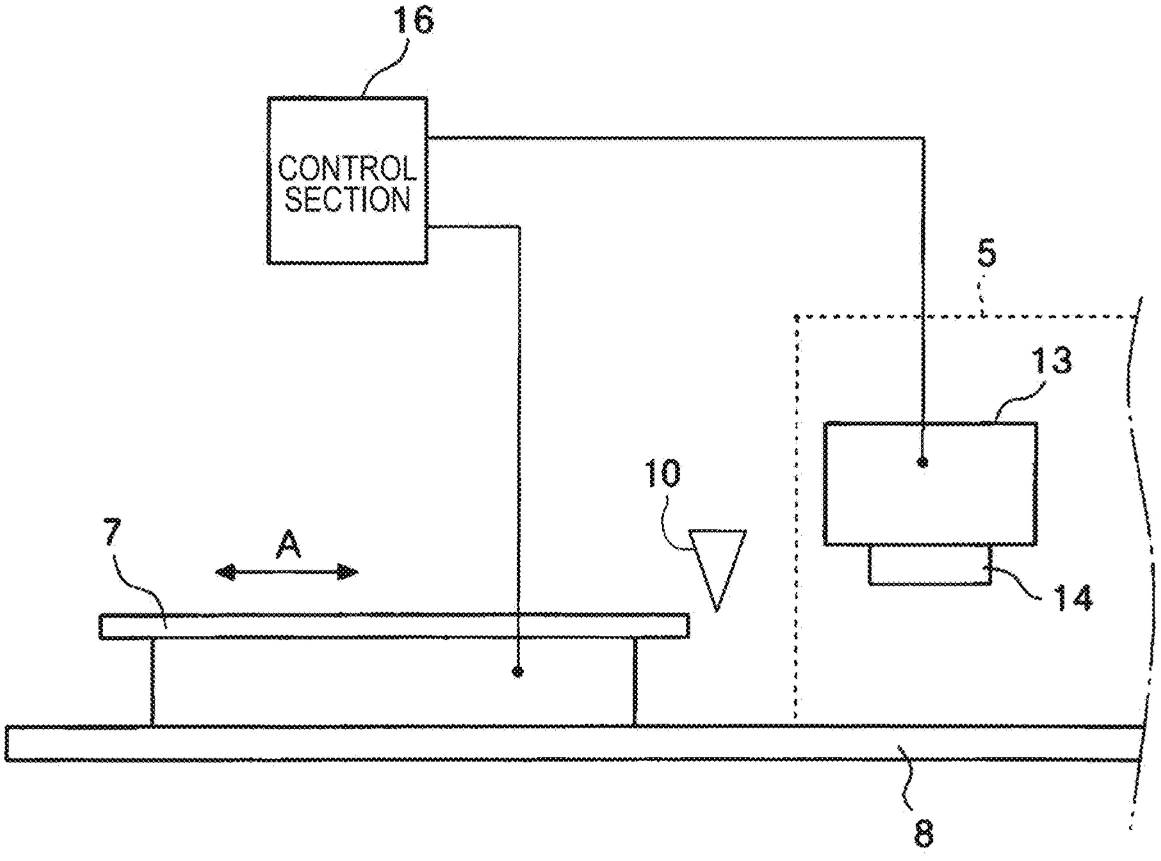
FIG. 10 is a schematic side view of the ink jet textile printing apparatus according to the second embodiment of the present disclosure.

Therefore, the "scanning" in Step 1 is to perform recording as a carriage 13 having an ink jet head 14 moves in a scanning direction SD that intersects the moving direction TD of a textile-printed material P mounted on a mounting table 7, for example, in a serial type ink jet textile printing apparatus 1 as shown in FIGS. 9 and 10.

Figure 13:
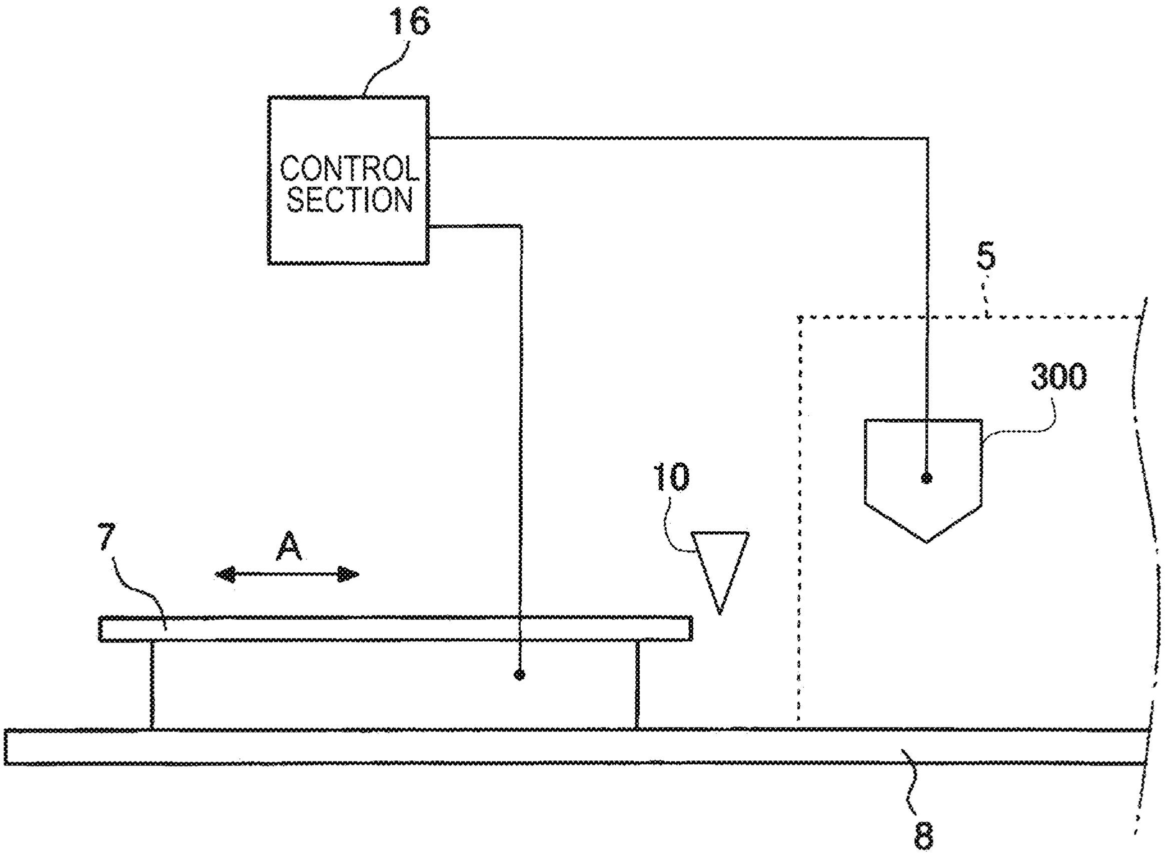
FIG. 13 is a schematic side view of a line printer according to the second embodiment of the present disclosure.

On the other hand, the "scanning" in Step 1 may be to perform recording as the relative position of the fabric is moved in the direction that intersects a width direction thereof, for a line head 300 which has a length corresponding to the width of the fabric, in a line-type printer as shown in FIG. 13. In the line-type recording, the ink jet head (line head) is not moved and is fixed during recording, and the recording is performed in a single scanning.

The "length corresponding to the width of the fabric" is not limited to a case where the width of the fabric and the length (width) of the line head completely match. The length may be a length equal to or more than the length corresponding to the width of the fabric, or may be a length corresponding to the width of the fabric (recording width) to which the ink is to be ejected (the image is to be recorded).

1.1.2 Reaction Solution

The reaction solution used in the reaction solution attaching step contains an aggregating agent that aggregates components in an ink, and water. Hereinafter, each component contained in the reaction solution will be described.

1.1.2.1 Aggregating Agent

The reaction solution contains an aggregating agent that aggregates components in the ink. The aggregating agent has a function of aggregating at least one of the components by acting on the dispersibility of the anionic resin particles contained in the transparent ink composition, and the components such as pigments and resin particles included in the colored ink composition. A degree of aggregation of a dispersion by the aggregating agent varies depending on each type of the aggregating agent and the target, and can be adjusted. For example, by such an aggregation action, color developing properties of an image and fixing properties of the image can be enhanced.

The reaction solution preferably contains one or more selected from, for example, an organic acid, a polyvalent metal salt, and a cationic polymer as the aggregating agent. When such an aggregating agent is used, the rubbing fastness and the color developing properties may be more excellent.

Preferred examples of the organic acid include poly(meth) acrylic acid, formic acid, acetic acid, propionic acid, glycolic acid, oxalic acid, malonic acid, malic acid, maleic acid, ascorbic acid, succinic acid, glutaric acid, adipic acid, fumaric acid, citric acid, tartaric acid, lactic acid, pyruvic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, or salts thereof.

The organic acid may be used alone or in combination of two or more kinds thereof. Furthermore, the salt of the organic acid which is a metal salt is included in the following metal salts.

The polyvalent metal salt is a compound composed of a divalent or higher valent metal ions and an anion. Examples of the divalent or higher valent metal ions include ions of calcium, magnesium, copper, nickel, zinc, barium, aluminum, titanium, strontium, chromium, cobalt, iron, and the like. Among the metal ions constituting these polyvalent metal salts, at least one of the calcium ion and the magnesium ion is preferable from the viewpoint that the aggregability of the components of an ink is excellent.

The anion constituting the polyvalent metal salt is an inorganic ion or an organic ion. Examples of such an inorganic ion include a chloride ion, a bromine ion, an iodine ion, a formate ion, a nitrate ion, a sulfate ion, and a hydroxide ion. Examples of the organic ion include an organic acid ion, and examples of the organic acid ion include a carboxylic acid ion.

Specific examples of the polyvalent metal salt include calcium carbonate such as heavy calcium carbonate and light calcium carbonate, calcium formate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, aluminum acetate, calcium propionate, magnesium propionate, aluminum propionate, calcium lactate, magnesium lactate, and aluminum lactate. These polyvalent metal salts may be used alone or may be used in combination of two or more kinds thereof. Among these, at least any one of magnesium sulfate, calcium formate, calcium nitrate, aluminum lactate, and calcium propionate is preferable from the viewpoint that sufficient solubility in water is obtained. Furthermore, the metal salts may be metal salts having water of hydration in the raw material forms, such as magnesium sulfate-heptahydrate and calcium nitrate-tetrahydrate.

The cationic polymer means a polymer compound having a cationic group. Examples of the cationic polymer include a cationic urethane resin, a cationic olefin resin, a cationic amine-based resin, and a cationic amide-based resin.

The cationic amine-based resin may be any of resins having an amino group, and examples thereof include an allylamine resin, a polyamine resin, and a quaternary ammonium salt polymer.

Examples of the allylamine resin include those having a structure derived from an allyl group in the main skeleton of the resin. Examples of the polyamine resin include those having an amino group in the main skeleton of the resin. Examples of the quaternary ammonium salt polymer include a resin having a quaternary ammonium salt in the structure. Among the cationic polymers, cationic amine-based resins are preferable since they have an excellent reactivity and are easily available.

The aggregating agent may be used alone or in combination of two or more kinds thereof.

From the viewpoint that the color developing properties and the rubbing fastness are more excellent, a lower limit of a content of the aggregating agent is, for example, preferably 0.5% by mass or more, more preferably 1% by mass or more, still more preferably 2% by mass or more, particularly preferably 3% by mass or more, and more particularly preferably 4% by mass or more with respect to a total amount of the reaction solution.

In addition, an upper limit of the content of the aggregating agent is not particularly limited, but is, for example, preferably 20% by mass or less, more preferably 15% by mass or less, still more preferably 10% by mass or less, particularly preferably 8% by mass or less, and more particularly preferably 6% by mass or less with respect to the total amount of the reaction solution.

In particular, the aggregating agent contains an organic acid, which is contained in the amount of preferably 1% to 6% by mass, more preferably 1% to 5% by mass, and still more preferably 2% to 4% by mass with respect to the total amount of the reaction solution. In this case, there is a tendency that the transparent ink composition can be aggregated more effectively, the fluff fixing effect is further improved, and the image quality disturbance due to the fluffing of the fabric can be further reduced.

1.1.2.2 Water

The reaction solution contains water. Examples of water include pure water such as ion exchange water, ultrafiltered water, reverse osmosis water, and distilled water, and water such as ultrapure water, from which ionic impurities are reduced. In addition, when water sterilized by irradiation with ultraviolet rays or addition of hydrogen peroxide or the like is used, the generation of bacteria or fungi when the reaction solution is stored for a long period of time can be suppressed.

A water content is preferably 40% by mass or more, more preferably 45% by mass or more, still more preferably 50% by mass or more, and particularly preferably 60% by mass or more with respect to the total amount of the reaction solution. An upper limit of the water content is not particularly limited, and is, for example, preferably 90% by mass or less, more preferably 85% by mass or less, and still more preferably 80% by mass or less with respect to the total amount of the reaction solution.

1.1.2.3 Organic Solvent

The reaction solution may contain an organic solvent. Examples of the organic solvent include esters, alkylene glycol ethers, cyclic esters, amides, alcohols, and polyhydric alcohols.

Esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate; and glycol diesters such as ethylene glycol diacetate, diethylene glycol diacetate, propylene glycol diacetate, dipropylene glycol diacetate, propionate ethylene glycol acetate, butyrate ethylene glycol acetate, butyrate diethylene glycol acetate, propionate diethylene glycol acetate, butyrate diethylene glycol acetate, propionate propylene glycol acetate, butyrate propylene glycol acetate, butyrate dipropylene glycol acetate, and propionate dipropylene glycol acetate.

The alkylene glycol ethers may be alkylene glycol monoethers or diethers, and alkyl ethers are preferable. Specific examples thereof include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether; and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Examples of the cyclic esters include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone; and compounds in which a hydrogen of a methylene group adjacent to a carbonyl group thereof is substituted with an alkyl group having 1 to 4 carbon atoms.

Examples of the amides include cyclic amides, and acyclic amides. Examples of the acyclic amides include alkoxyalkylamides.

Examples of the cyclic amides include lactams. Examples of the lactams include pyrrolidones such as 2-pyrrolidone, 1-methyl-2-pyrrolidone, 1-ethyl-2-pyrrolidone, 1-propyl-2-pyrrolidone, and 1-butyl-2-pyrrolidone.

Examples of the alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and N,N-dimethylisobutyric acid amide.

Examples of the alcohols include a compound in which one hydrogen atom of an alkane is substituted with a hydroxyl group. The alkane preferably has 10 or less carbon atoms, more preferably 6 or less carbon atoms, and still more preferably 3 or less carbon atoms. The number of carbon atoms of the alkane is 1 or more, and is preferably 2 or more. The alkane may be a linear or branched-type. Examples of the alcohols include methanol, ethanol, n-propyl alcohol, iso-propyl alcohol, n-butanol, 2-butanol, tert-butanol, iso-butanol, n-pentanol, 2-pentanol, 3-pentanol, tert-pentanol, 2-phenoxy ethanol, benzyl alcohol, and phenoxy propanol.

Polyhydric alcohols have two or more hydroxyl groups in the molecule. The polyhydric alcohols can be divided into, for example, alkanediols and polyols.

Examples of the alkanediols include compounds in which an alkane is substituted with two hydroxyl groups. Examples of the alkanediols include 1,2-alkanediol which is a general term for compounds in which hydroxyl groups are substituted at the first and second positions of alkanes, and other alkanediols other than 1,2-alkanediol.

Examples of the 1,2-alkanediol include ethylene glycol, 1,2-propanediol (propylene glycol), 1,2-butanediol (1,2BD), 1,2-pentanediol (1,2PD), 1,2-hexanediol (1,2HD), 1,2-heptanediol, 1,2-octanediol, 1,2-nonanediol, 1,2-decanediol, 3-methyl-1,2-butanediol, 3-methyl-1,2-pentanediol, 4-methyl-1,2-pentanediol, 3,4-dimethyl-1,2-pentanediol, 3-ethyl-1,2-pentanediol, 4-ethyl-1,2-pentanediol, 3-methyl-1,2-hexanediol, 4-methyl-1,2-hexanediol, 5-methyl-1,2-hexanediol, 3,4-dimethyl-1,2-hexanediol, 3,5-dimethyl-1,2-hexanediol, 4,5-dimethyl-1,2-hexanediol, 3-ethyl-1,2-hexanediol, 4-ethyl-1,2-hexanediol, and 3-ethyl-4-methyl-1,2-hexanediol.

Examples of other alkanediols include 1,3-propanediol, 1,3-butylene glycol (also known as 1,3-butanediol), 1,4-butanediol, 2,3-butanediol, 1, 5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 2-methylpentane-2,4-diol, 1,6-hexanediol, 2-ethyl-2-methyl-1,3-propanediol, and 2-methyl-2-propyl-1,3-propanediol.

Examples of the polyols include a condensate in which two or more molecules of an alkanediol are intermolecularly condensed between hydroxyl groups, and a compound having three or more hydroxyl groups.

Examples of the condensate in which two or more molecules of an alkanediol are intermolecularly condensed between hydroxyl groups include dialkylene glycol such as diethylene glycol and dipropylene glycol, and trialkylene glycols such as triethylene glycol and tripropylene glycol.

The compound having three or more hydroxyl groups has three or more hydroxyl groups having an alkane or polyether structure as a skeleton. Examples of the compound having three or more hydroxyl groups include glycerin, trimethylolethane, trimethylolpropane, 1,2,5-hexanetriol, 1,2,6-hexanetriol, pentaerythritol, and polyoxypropylenetriol.

The organic solvent may be used alone or in combination of two or more kinds thereof.

Among these, the organic solvent preferably includes an alkanediol, more preferably includes 1,2-alkanediol, and particularly preferably includes propylene glycol. When the organic solvent includes these solvents, the color developing properties and the rubbing fastness may be more excellent.

A content of the organic solvent is preferably 5% to 50% by mass, more preferably 10% to 40% by mass, still more preferably 15% to 35% by mass, and particularly preferably 20% to 30% by mass with respect to the total amount of the reaction solution. When the content of the organic solvent is within the range, the color developing properties and the rubbing fastness may be more excellent.

1.1.2.4 Surfactant

The reaction solution may contain a surfactant. The surfactant can be used to reduce a surface tension of the reaction solution and, for example, to adjust and improve the penetrability to a fabric. As the surfactant, any of a nonionic surfactant, an anionic surfactant, a cationic surfactant, and an amphoteric surfactant can be used, and these may further be used in combination. In addition, among the surfactants, acetylene-based surfactants (acetylene glycol-based surfactants), silicon-based surfactants, and fluorine-based surfactants can be more preferably used, and the acetylene-based surfactants can be still more preferably used.

The acetylene-based surfactants (acetylene glycol-based surfactants) are not particularly limited, but examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (product names, manufactured by Air Products and Chemicals Inc.), OLFINE B, Y, P, A, STG, SPC, E1004, E1010, PD-001, PD-002W, PD-003, PD-004, PD-005, EXP. 4001, EXP. 4036, EXP. 4051, EXP. 4123, EXP. 4200, EXP. 4300, AF-103, AF-104, AK-02, SK-14, and AE-3 (product names, manufactured by Nissin Chemical Industry Co., Ltd.), and ACETYLENOL E00, E00P, E40, and E100 (product names, manufactured by Kawaken Fine Chemicals Co., Ltd.).

The silicon-based surfactant is not particularly limited, but preferred examples thereof include polysiloxane-based compounds. The polysiloxane-based compounds are not particularly limited, but examples thereof include a polyether-modified organosiloxane. Examples of a commercially available product of the polyether-modified organosiloxane include BYK-306, BYK-307, BYK-333, BYK-341, BYK-345, BYK-346, and BYK-348 (product names, manufactured by BYK Chemie Japan K. K.), and KF-351A, KF-352A, KF-353, KF-354L, KF-355A, KF-615A, KF-945, KF-640, KF-642, KF-643, KF-6020, X-22-4515, KF-6004, KF-6011, KF-6012, KF-6015, and KF-6017 (product names, manufactured by Shin-Etsu Chemical Co., Ltd.).

As the fluorine-based surfactant, a fluorine-modified polymer is preferably used, and specific examples thereof include BYK-340 (product name, manufactured by BYK Chemie Japan K. K.).

The surfactant may be used alone or may be used in combination of two or more kinds thereof.

The reaction solution preferably contains a surfactant having an HLB value of 10 or more, among the surfactants. When the surfactant has an HLB value of 10 or more, there is a tendency that the penetrability of the reaction solution into the fabric can be preferably adjusted and the reaction solution is more easily retained in the vicinity of a surface of the fabric. With this, there is a tendency that the color developing properties are more excellent.

In the present specification, the "value of hydrophile and lipophile balance (HLB value)" is a numerical indicating a hydrophile and lipophile balance of the compound. Here, the HLB value is a value calculated by a Griffin method and can be determined by the following equation (1).

$$HLB\ \text{Value} = 20 \times \text{Total sum of formula weight of hydrophilic part/Molecular weight} \quad (1)$$

Hereinafter, specific examples of the surfactant having an HLB value of 10 or more according to the Griffin method will be described.

Examples of the acetylene-based surfactants (acetylene glycol-based surfactants) having an HLB value of 10 or more include OLFINE E1010 (HLB value of 12), E1020 (HLB value of 15 to 16), EXP. 4200 (HLB value of 10 to 13), and EXP. 4123 (HLB value of 10 to 13) [product names, manufactured by Nissin Chemical Industry Co., Ltd.].

Examples of the silicon-based surfactant having an HLB value of 10 or more include BYK-348 (HLB value of 11) [product name, manufactured by BYK Chemie Japan K. K.], KF-6011 (HLB value of 14.5), KF-6013 (HLB value of 10), KF-6043 (HLB value of 14.5), KF-643 (HLB value of 14), KF-640 (HLB value of 14), KF-351A (HLB value of 12), and KF-354L (HLB value of 16) [product names, manufactured by Shin-Etsu Silicone Co., Ltd.], FZ-2105 (HLB value of 11), L-7604 (HLB value of 13), and FZ-2104 (HLB value of 14) [product names, manufactured by Dow Toray Co., Ltd.], and SILWET L-7604 (HLB value of 13), SILWET L-7607N (HLB value of 17), SILWET FZ-2104 (HLB value of 14), or SILWET FZ-2161 (HLB value of 20) [product name, manufactured by Nippon Unicar Co Ltd.].

When the reaction solution contains a surfactant, the content of the surfactant is preferably 5.0% by mass or less, more preferably 3.0% by mass or less, still more preferably 2.0% by mass or less, particularly preferably 1.5% by mass or less, and more particularly preferably 1.0% by mass or less with respect to the total amount of the reaction solution. When the content of the surfactant is within the range, in particular, 2.0% by mass or less, there is a tendency that a mixed liquid viscosity when the reaction solution and the transparent ink are mixed easily increases, the fluff fixing effect is further improved, and the image quality disturbance due to the fluffing of the fabric can be further reduced.

A lower limit of the content of the surfactant is not particularly limited, but is preferably 0.1% by mass or more, more preferably 0.3% by mass or more, and still more preferably 0.5% by mass or more with respect to the total amount of the reaction solution.

1.1.2.5 Other Components

The reaction solution may contain additives such as a pH adjuster, a preservative and a fungicide, a rust inhibitor, a chelating agent, a viscosity modifier, a dissolution aid, and an antioxidant, depending on the necessity. When such an additive is contained, a content of the additive is preferably 0.05% to 5% by mass, more preferably 0.1% to 3% by mass, and still more preferably 0.1% to 1% by mass with respect to the total amount of the reaction solution.

The pH adjuster is not particularly limited, but examples thereof include an appropriate combination of acids, bases, weak acids, and weak bases.

As examples of the acids and the bases used in such a combination, inorganic acids such as sulfuric acid, hydrochloric acid, and nitric acid; inorganic bases such as lithium hydroxide, sodium hydroxide, potassium hydroxide, dihydrogen potassium phosphate, hydrogen disodium phosphate, potassium carbonate, sodium carbonate, hydrogen sodium carbonate, and ammonia; organic bases such as triethanol amine, diethanol amine, monoethanol amine, tripropanol amine, triisopropanol amine, diisopropanol amine, and tris (hydroxymethyl)aminomethane (THAM); and organic acids such as adipic acid, citric acid, succinic acid, lactic acid, Good's buffers such as N,N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyl iminobisacetic acid (ADA), piperazine-1,4-bis(2-ethanesulfonic acid) (PIPES), N-(2-acetamide)-2-aminoethanesulfonic acid (ACES), cholamine chloride, N-tris(hydroxymethyl)methyl-2-aminoethanesulfonic acid (TES), acetamide glycine, tricine, glycine amide, and bicine, a phosphate buffer solution, a citrate buffer solution, a Tris buffer solution, or the like may be used. Among these, the inorganic bases are preferable, and potassium hydroxide is more preferable.

For the reaction solution, the pH adjuster may be used alone or may be used in combination of two or more kinds thereof. In addition, a total content of the pH adjusters with respect to the total amount of the reaction solution when the pH adjusters are used is, for example, 0.05% by mass or more and 3.0% by mass or less, and is more preferably 0.1% by mass or more and 1.0% by mass or less.

In addition, the reaction solution may contain a coloring material such as a pigment, but a content of the coloring material is preferably 0.2% by mass or less, more preferably 0.1% by mass or less, and still more preferably 0.05% by mass or less with respect to the total amount of the reaction solution, with a lower limit of the content being 0% by mass. The reaction solution preferably contains no coloring material.

1.1.2.6 Physical Properties

From the viewpoint of reducing skin irritation, a pH of the reaction solution is preferably 2.0 or higher, more preferably 3.0 or higher, and still more preferably 4.0 or higher. From the same viewpoint, an upper limit of the pH is preferably 11.5 or less, more preferably 10 or less, still more preferably 7.0 or less, and particularly preferably 5.0 or less.

A viscosity of the reaction solution is preferably 1.0 to 10 mPa·s, more preferably 3.5 to 8.0 mPa·s, and still more preferably 2.0 to 4.0 mPa·s at 20° C. In particular, when the viscosity is 3.0 mPa·s or more, there is a tendency that better color developing properties are obtained. When the viscosity is 8.0 mPa·s or less, there is a tendency that better ejection stability is obtained. Furthermore, the viscosity can be measured using, for example, a viscoelasticity tester MCR-300 (product name), manufactured by Pysica.

A viscosity (for example, a viscosity after 3 minutes of mixing) of a mixed liquid obtained by mixing the reaction solution and the transparent ink composition described later in equivalent amounts is preferably 50 mPa·s or more, more preferably 100 mPa·s or more, still more preferably 300 mPa·s or more, particularly preferably 500 mPa·s or more, and more particularly preferably 750 mPa·s or more at 20° C. When the viscosity of the mixed liquid is within the range, a water absorption rate of the fabric is reduced, and the transparent ink layer (resin layer) can be formed more preferably in the vicinity of a surface of the fabric. With this, there is a tendency that the penetration of the colored ink into the fabric can be further suppressed and better color developing properties are obtained. In addition, by configuring the resin layer to function better as a binding layer between the fabric and the colored ink layer, there is a tendency that better rubbing fastness is obtained.

Furthermore, an upper limit of the viscosity of the mixed liquid obtained by mixing the reaction solution and the transparent ink composition described later in equivalent amounts is not particularly limited, but is preferably 10,000 mPa·s or less, more preferably 5,000 mPa·s or less, particularly preferably 2,500 mPa·s or less, and more particularly preferably 1,500 mPa·s or less at 20° C.

In particular, it is preferable that the viscosity of each of the reaction solution and the transparent ink composition described later is 3 to 8 mPa·s at 20° C., and a viscosity of a mixed liquid of the reaction solution and the transparent ink composition in equivalent amounts is 50 mPa·s or more at 20° C. In this case, there is a tendency that better ejection stability can be obtained and the fluff fixing effect is further improved, and thus, the image quality disturbance due to the fluffing of the fabric can be further reduced.

A surface tension of the reaction solution is preferably 25 to 40 mN/m, more preferably 25 to 35 mN/m, still more preferably 27 to 35 mN/m, and particularly preferably 30 to 33 mN/m. Furthermore, the surface tension can be measured, for example, by a Wilhelmy method with a surface tension meter (manufactured by Kyowa Interface Science Co., Ltd., DY-300). The surface tension is preferably a measurement value at 20° C.

1.2 Transparent Ink Attaching Step

The ink jet textile printing method according to the present embodiment includes a transparent ink attaching step of attaching a transparent ink composition containing anionic resin particles that react with an aggregating agent and are aggregated, and water to the fabric.

1.2.1 Attachment Mode

A unit for attaching the transparent ink to the fabric can be the same as that for the above-described reaction solution. In addition, the total application amount and the application amount ratio of the reaction solution to the transparent ink composition, the time difference between the attachment of the reaction solution and the attachment of the transparent ink composition in the same region of the fabric, and the attachment mode of Step 1 and the like are as described above in the above-mentioned reaction solution attaching step, and thus, a description thereof will not be repeated.

1.2.2 Transparent Ink Composition

The transparent ink composition used in the transparent ink attaching step contains anionic resin particles that react with an aggregating agent and are aggregated, and water. Hereinafter, each component contained in the transparent ink composition will be described.

1.2.2.1 Anionic Resin Particles

The transparent ink composition contains anionic resin particles. Similar to the function of the resin particles, the anionic resin particles have a function as a so-called fixing resin which improves the adhesion of ink attached to the fabric. In addition, the anionic resin particles also have a function of reacting with the above-mentioned aggregating agent to be aggregated and increase the viscosity of the transparent ink composition. The anionic resin particles are often handled in the form of an emulsion, but may be in the form of powder.

The "anionic resin particles" refer to resin particles having a negative charge as a whole, and preferably have one or more anionic groups selected from a carboxyl group, a sulfonic acid group, a phosphoric acid group, and the like.

Examples of the resin particles include resin particles made of a urethane resin, an acryl resin (including a styrene-acryl resin), a fluorene resin, an olefin resin, a rosin-modified resin, a terpene resin, an ester resin, an amide resin, an epoxy resin, a vinyl chloride resin, a vinyl chloride-vinyl acetate copolymer, and an ethylene vinyl acetate resin. Among those, the urethane resin, the acryl resin, the olefin resin, and the ester resin are preferable. In addition, the resin particles may be used alone or in combination of two or more kinds thereof.

The urethane resin is a general term for resins having a urethane bond. For the urethane resin, a polyether-type urethane resin including an ether bond in the main chain, an ester-type urethane resin including an ester bond in the main chain, a carbonate-type urethane resin including a carbonate bond in the main chain, or the like may be used in addition to the urethane bond. In addition, a commercially available product may be used as the urethane resin, and examples thereof include Superflex 460, 460s, 840, and E-4000 (product name, manufactured by DKS Co., Ltd.), Resamine D-1060, D-2020, D-4080, D-4200, D-6300, and D-6455 (product name, manufactured by Dainichiseika Color & Chemicals MFG Co., Ltd.), Takelac WS-5100, WS-6021, and W-512-A-6 (product name, manufactured by Mitsui Chemicals Polyurethane Co., Ltd.), Sancure 2710 (product name, manufactured by LUBRIZOL), and Permarin UA-150 (product name, manufactured by Sanyo Chemical Industries Ltd.).

The acryl resin is a generic term for polymers obtained by polymerizing at least an acryl monomer such as a (meth) acrylic acid and a (meth)acrylate as one component, and examples thereof include a resin obtained from an acryl monomer, and a copolymer of an acryl monomer and a monomer other than the acryl monomer. The examples further include an acrylic-vinyl resin which is a copolymer of an acryl monomer and a vinyl monomer. In addition, examples of the vinyl monomer include styrene.

As the acryl monomer, acrylamide, acrylonitrile, and the like can also be used. For a resin emulsion using the acryl resin as a raw material, a commercially available product may be used, and for example, a product selected from FK-854 (product name, manufactured by CHUORIKA KOUGYO Co., Ltd.), Mowinyl 952B and 718A (product names, manufactured by The Nippon Synthetic Chemical Industry Co., Ltd.), Nipol LX852 and LX874 (product names, manufactured by Zeon Corporation), or the like may be used.

The styrene-acryl resin is a copolymer obtained from a styrene monomer and a (meth)acryl monomer, and examples thereof include a styrene-acrylic acid copolymer, a styrene-methacrylic acid copolymer, a styrene-methacrylic acid-acrylate copolymer, a styrene-α-methylstyrene-acrylic acid copolymer, and a styrene-α-methylstyrene-acrylic acid-acrylate copolymer. As the styrene-acryl resin, a commercially available product may be used, and for example, Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (product names, manufactured by BASF), Mowinyl 966A and 975N (product names, manufactured by The Nippon Synthetic Chemical Industry Co., Ltd.), VINYBLAN 2586 (manufactured by Nissin Chemical Industry Co., Ltd.), or the like may be used.

The olefin resin is a polymer having olefin such as ethylene, propylene, and butylene in the structural skeleton, and known ones can be selected as appropriate and used. As the olefin resin, a commercially available product can be used, for example, ARROWBASE CB-1200 and CD-1200 (product names, manufactured by Unitika Ltd.), or the like may be used.

The anionic resin particles are more preferably a urethane resin or an acryl resin, and still more preferably the urethane resin. In this case, there is a tendency that the rubbing fastness is more excellent.

A glass transition temperature (Tg) of the resin particles is preferably −60° C. or higher and 50° C. or lower, more preferably −60° C. or higher and 40° C. or lower, and still more preferably −30° C. or higher and 10° C. or lower. With the glass transition temperature (Tg) of the resin particles within the range, there is a tendency that the fabric following property (texture) is more excellent. The glass transition temperature is measured in accordance with JIS K 7121 (Testing Methods for Transition Temperatures of Plastics), using, for example, a differential scanning calorimeter "DSC 7000", manufactured by Hitachi High-Tech Science Corporation.

A content (solid content concentration) of the anionic resin particles is preferably 1% to 30% by mass, more preferably 2% to 25% by mass, still more preferably 4% to 20% by mass, particularly preferably 6% to 15% by mass, and more particularly preferably 8% to 12% by mass with respect to the total amount of the transparent ink composition. When the content of the anionic resin particles is within the range, there is a tendency that more excellent color developing properties and rubbing fastness can be obtained.

1.2.2.2 Water

The transparent ink composition contains water. As the water, the same water as the above-described reaction solution can be used.

In addition, a water content is preferably 20% by mass or more, more preferably 30% by mass or more, still more preferably 40% by mass or more, and particularly preferably 50% by mass or more with respect to the total amount of the transparent ink composition. An upper limit of the water content is not particularly limited, but is, for example, preferably 90% by mass or less, more preferably 70% by mass or less, and still more preferably 60% by mass or less with respect to the total amount of the transparent ink composition.

1.2.2.3 Organic Solvent

The transparent ink composition may contain an organic solvent. A type and a content of the organic solvent can each be the same as those of the above-described reaction solution.

In the transparent ink composition, the organic solvent preferably includes an alkanediol, an alkylene glycol ether, and a trialkylene glycol, more preferably includes a 1,2-alkanediol, an alkylene glycol ether, and a trialkylene glycol, and still more preferably includes propylene glycol, triethylene glycol monobutyl ether, and triethylene glycol. When the organic solvent includes these solvents, the color developing properties and the rubbing fastness may be more excellent.

A content of the organic solvent is preferably 10% to 55% by mass, more preferably 15% to 45% by mass, still more preferably 20% to 40% by mass, and particularly preferably 25% to 35% by mass with respect to the total amount of the transparent ink composition. When the content of the organic solvent is within the range, the color developing properties and the rubbing fastness may be more excellent.

1.2.2.4 Surfactant

The transparent ink composition may contain a surfactant. A type and the like of the surfactant can be the same as those of the above-described reaction solution. The transparent ink composition preferably contains a silicone-based surfactant as the surfactant.

A lower limit of a content of the surfactant is preferably 0.05% by mass or more, more preferably 0.1% by mass or more, still more preferably 0.2% by mass or more, and particularly preferably 0.3% by mass or more with respect to the total amount of the transparent ink composition.

In addition, an upper limit of the content of the surfactant is preferably 3% by mass or less, more preferably 2% by mass or less, still more preferably 1% by mass or less, and particularly preferably 0.8% by mass or less with respect to the total amount of the transparent ink composition. When the content of the surfactant is within the range, there is a tendency that the penetrability of the transparent ink composition to the fabric is easily adjusted to a preferable level.

1.2.2.5 Other Components

The transparent ink composition may contain additives such as a pH adjuster, a preservative and a fungicide, a rust inhibitor, a chelating agent, a viscosity modifier, a dissolution aid, and an antioxidant, depending on the necessity. When such an additive is contained, a content of the additive is preferably 0.1% to 5% by mass, more preferably 0.1% to 3% by mass, and still more preferably 0.1% to 1% by mass with respect to the total amount of the transparent ink composition.

The transparent ink composition may also contain a coloring material such as a pigment, but a content of the coloring material is preferably 0.2% by mass or less, more preferably 0.1% by mass or less, and still more preferably 0.05% by mass or less with respect to the total amount of the transparent ink composition, with a lower limit thereof being 0% by mass. The transparent ink composition preferably does not contain a coloring material.

1.2.2.6 Physical Properties

From the viewpoint of reducing skin irritation, a pH of the transparent ink composition is preferably 2.0 or higher, more preferably 5.0 or higher, and still more preferably 7.0 or higher. From the same viewpoint, an upper limit of the pH is preferably 11.5 or less, more preferably 10 or less, still more preferably 9.0 or less, and particularly preferably 8.0 or less.

A viscosity of the transparent ink composition is preferably 1.0 to 10 mPa·s, more preferably 1.5 to 8 mPa·s, still more preferably 3.0 to 8.0 mPa·s, even still more preferably 3.0 to 5.0 mPa·s, and particularly preferably 3.0 to 4.0 mPa·s at 20° C. In particular, when the viscosity is 3.0 mPa·s or more, there is a tendency that better color developing properties are obtained. When the viscosity is 8.0 mPa·s or less, there is a tendency that better ejection stability is obtained.

A surface tension of the transparent ink composition is preferably 10 to 40 mN/m, more preferably 15 to 35 mN/m, still more preferably 20 to 30 mN/m, and particularly preferably 20 to 27 mN/m at 20° C.

1.3 Colored Ink Attaching Step

The ink jet textile printing method according to the present embodiment includes a colored ink attaching step of attaching a colored ink composition containing a pigment, resin particles, and water onto a region of the fabric, to which the transparent ink composition is attached, using the ink jet method.

Since the transparent ink composition attached in the above-described aspect is a resin layer formed favorably in the vicinity of a surface of the fabric, there is a tendency that the penetration of the colored ink into the fabric can be suppressed and good color developing properties can be obtained. In addition, by configuring the resin layer to function as a binding layer between the fabric and the colored ink layer, there is a tendency that good rubbing fastness can be obtained.

1.3.1 Attachment Mode

An application amount of the colored ink composition is preferably 0.01 to 1 g/inch$^2$, more preferably 0.03 to 0.5 g/inch$^2$, still more preferably 0.05 to 0.3 g/inch$^2$, and particularly preferably 0.07 to 0.15 g/inch$^2$.

In addition, a total attachment amount of the reaction solution, the transparent ink composition, and the colored ink composition is preferably 100 mg/inch$^2$ or more, more preferably 120 mg/inch$^2$ or more, still more preferably 150 mg/inch$^2$ or more, particularly preferably 180 mg/inch$^2$ or more, and more particularly preferably 200 mg/inch$^2$ or more. When the total attachment amount is within the range, since the total amount of the reaction solution and the ink attached is relatively large, it is difficult to achieve both rubbing fastness and color developing properties, but in the ink jet textile printing method according to the present embodiment, there is a tendency that good rubbing fastness and color developing properties can be obtained.

An upper limit of the total attachment amount is not particularly limited, but is preferably 500 mg/inch$^2$ or less, more preferably 300 mg/inch$^2$ or less, and still more preferably 250 mg/inch$^2$ or less.

1.3.2 Colored Ink Composition

The colored ink composition used in the colored ink attaching step contains a pigment, resin particles, and water. Hereinafter, each component contained in the colored ink composition will be described.

1.3.2.1 Pigment

The colored ink composition contains a pigment. As the pigment, for example, an inorganic pigment or an organic pigment can be used. Furthermore, the pigment is one kind of the coloring material. Examples of the coloring material include a pigment and a dye.

The inorganic pigment is not particularly limited, and examples thereof include carbon blacks such as C. I. Pigment Black 6 (lamp black, vegetable black), C. I. Pigment Black 7 (furnace black, channel black, thermal black, acetylene black), C. I. Pigment Black 8 (charcoal black), and C. I. Pigment Black 10 (graphite); and white pigments such as iron oxide, titanium oxide, zinc oxide, and silica.

Examples of the carbon black include No. 2300, 900, MCF88, No. 20B, No. 33, No. 40, No. 45, No. 52, MA7, MA8, MA100, and No. 2200B, manufactured by Mitsubishi Chemical Corporation; Color Black FW1, FW2, FW2V, FW18, FW200, S150, S160, S170, Pretex 35, U, V, 140U, Special Black 6, 5, 4A, 4, and 250, manufactured by Degussa Corporation; Conductex SC, and Raven 1255, 5750, 5250, 5000, 3500, 1255, and 700, manufactured by Columbia Carbon Inc.; and Regal 400R, 330R, and 660R, Mogul L, Monarch 700, 800, 880, 900, 1000, 1100, 1300, and 1400, and Elftex 12, manufactured by Cabot Corporation.

Examples of the white pigment include C. I. Pigment White 1, which is basic lead carbonate, C. I. Pigment White 4 made of zinc oxide, C. I. Pigment White 5 made of a mixture of zinc sulfide and barium sulfate, C. I. Pigment White 6 made of titanium dioxide, C. I. Pigment White 6: 1 made of titanium dioxide containing other metal oxides, C. I. Pigment White 7 made of zinc sulfide, C. I. Pigment White 18 made of calcium carbonate, C. I. Pigment White 19 made of clay, C. I. Pigment White 20 made of mica titanium, C. I. Pigment White 21 made of barium sulfate, C. I. Pigment White 22 made of gypsum, C. I. Pigment White 26 made of magnesium oxide and silicon dioxide, C. I. Pigment White 27 made of silicon dioxide, and C. I. Pigment White 28 made of anhydrous calcium silicate. Among these, C. I. Pigment White 6 which is excellent in color developing properties, masking properties, and the like is preferably used.

The average particle diameter of the white pigment is preferably 100 nm or more and 500 nm or less, more preferably 50 nm or more and 450 nm or less, and still more preferably 200 nm or more and 400 nm or less. By setting the average particle diameter of the white pigment within the range, there is a tendency that the ejection stability from the ink jet head can be ensured. In addition, there is a tendency that the masking properties can be improved. Furthermore, in the present specification, the "average particle diameter" refers to a volume-based particle size distribution, which is a particle diameter at 50% by volume cumulative distribution, unless otherwise specified. The average particle diameter is measured by the dynamic light scattering method or the laser diffraction light method described in JIS Z8825. Specifically, a particle size analyzer (for example, "Microtrac UPA" manufactured by Nikkiso Co., Ltd.) using the dynamic light scattering method as a measurement principle can be used.

Examples of the organic pigment include a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolo-pyrrole-based pigment, a perinone-based pigment, a quinophthalone-based pigment, an anthraquinone-based pigment, a thioindigo-based pigment, a benzoimidazolone-based pigment, an isoindolinone-based pigment, an azomethine-based pigment, and an azo-based pigment.

Specific examples of the organic pigment include the followings.

Examples of the cyan pigment include C. I. Pigment Blue 1, 2, 3, 15:3, 15:4, 15:34, 16, 22, and 60; and C. I. Vat Blue 4, 60, and preferably include one or a mixture of two or more selected from the group consisting of C. I. Pigment Blue 15:3, 15:4, and 60.

Examples of the magenta pigment include C. I. Pigment Red 5, 7, 12, 48 (Ca), 48 (Mn), 57 (Ca), 57:1, 112, 122, 123, 168, 184, and 202, and C. I. Pigment Violet 19, and preferably include one or a mixture of two or more selected from the group consisting of C. I. Pigment Red 122, 202, and 209, and C. I. Pigment Violet 19.

Examples of the yellow pigment include C. I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185, and preferably include a mixture of one or two or more selected from the group consisting of C. I. Pigment Yellow 74, 109, 110, 128, 138, 150, and 180.

Pigments of other colors can also be used. Examples thereof include an orange pigment and a green pigment.

The pigment may be used alone or may be used in combination of two or more kinds thereof.

The pigment contained in the colored ink composition is preferably a white pigment. A colored ink composition (white ink) containing a white pigment is suitable for forming a white ink layer as a base layer, but an attachment amount of the white ink is required to be relatively large. Therefore, there is a tendency that the total amount of the reaction solution or the ink to be attached increases, and it is particularly difficult to achieve both rubbing fastness and color developing properties. On the other hand, by using the ink jet textile printing method according to the present embodiment, even with a colored ink composition containing a white pigment, there is a tendency that excellent rubbing fastness and color developing properties can be obtained.

A content of the pigment (in particular, the white pigment) is preferably 1% to 30% by mass, more preferably 2% to 25% by mass, still more preferably 4% to 20% by mass, particularly preferably 6% to 15% by mass, and more particularly preferably 8% to 12% by mass with respect to the total amount of the colored ink composition. When the content of the pigment is within the range, there is a tendency that the rubbing fastness can be made better and better color developing properties (whiteness) can be obtained.

The pigment may be used after being dispersed by using a pigment dispersant. In addition, the pigment may be used after being dispersed as a self-dispersing pigment by oxidizing or sulfonating a surface of the pigment with ozone, hypochlorous acid, fuming sulfuric acid, or the like.

The pigment dispersant has a function of dispersing the pigment in the ink. The pigment dispersant may be water-soluble, but is preferably not completely water-soluble, and it is considered that the pigment dispersant is partially or entirely bonded to or adsorbed on the pigment to enhance the hydrophilicity of a surface of the pigment to disperse the pigment.

The pigment dispersant is a polymer compound, and examples thereof include acrylic resins such as a poly(meth)acrylic acid, a (meth)acrylic acid-acrylonitrile copolymer, a (meth)acrylic acid-(meth)acrylate copolymer, a vinyl acetate-(meth)acrylate copolymer, a vinyl acetate-(meth)acrylic acid copolymer, a vinylnaphthalene-(meth)acrylic acid copolymer, a styrene-(meth)acrylic acid copolymer, a styrene-(meth)acrylic acid copolymer, a styrene-(meth)acrylic acid-(meth)acrylate copolymer, a styrene-α-methylstyrene-(meth)acrylic acid copolymer, and a styrene-α-methylstyrene-(meth)acrylic acid-(meth)acrylate copolymer, and salts thereof.

In addition, examples of the pigment dispersant include resins such as maleic acid-based resins such as a styrene-maleic acid copolymer, a styrene-maleic anhydride copolymer, a vinylnaphthalene-maleic acid copolymer, and a vinyl acetate-maleate copolymer, and salts thereof; urethane-based resins with or without a cross-linked structure and salts thereof; polyvinyl alcohols; and a vinyl acetate-crotonic acid copolymer and a salt thereof.

Furthermore, the acrylic resin may be a copolymer of an acrylic monomer and another monomer, in addition to the polymer of the acrylic monomers as mentioned above. For example, an acrylic vinyl resin which is a copolymer with a vinyl-based monomer as another monomer is also referred to as an acrylic resin. In addition, for example, among the styrene-based resins, those which are copolymers of a styrene-based monomer and an acrylic monomer are also included in the acrylic resin. Furthermore, in a case of referring to the acrylic resin, salts and esterified products thereof are also included.

Examples of a commercially available product of the pigment dispersant include X-200, X-1, X-205, X-220, and X-228 (manufactured by Seiko PMC Corporation), Nopco Sperse (registered trademark) 6100 and 6110 (manufactured by San Nopco Ltd.), Joncryl 67, 586, 611, 678, 680, 682, and 819 (manufactured by BASF), DISPERBYK-190 (manufactured by BYK Chemie Japan K. K.); and N-EA137, N-EA157, N-EA167, N-EA177, N-EA197D, N-EA207D, and E-EN10 (manufactured by DKS Co., Ltd.).

Examples of a commercially available product of the acrylic pigment dispersant include BYK-187, BYK-190, BYK-191, BYK-194N, and BYK-199 (manufactured by BYK Chemie Japan K. K.), and Aron A-210, A6114, AS-1100, AS-1800, A-30SL, A-7250, and CL-2 (manufactured by Toagosei Co., Ltd.).

Examples of a commercially available product of the urethane-based pigment dispersant include BYK-182, BYK-183, BYK-184, and BYK-185 (manufactured by BYK Chemie Japan K. K.); TEGO Disperse 710 (manufactured by Evonik Tego Chemie GmbH); and Borchi (registered trademark) Gen 1350 (manufactured by OMG Borschers GmbH).

The pigment dispersant is preferably an anionic pigment dispersant. The "anionic pigment dispersant" refers to a pigment dispersant having a negative charge as a whole, and preferably has one or more anionic groups selected from a carboxyl group, a sulfonic acid group, a phosphoric acid group, and the like.

It is preferable that at least one of the pigment and resin particles described later in the colored ink composition is anionic. In this case, the aggregation action through the aggregating agent is excellent, and therefore, there is a tendency that better color developing properties can be obtained and better rubbing fastness can be obtained.

The expression that the pigment is anionic means that the pigment has a negative charge as a whole, and the pigment preferably has one or more anionic groups selected from a carboxyl group, a sulfonic acid group, a phosphoric acid group, and the like. The anionic group may be directly present on the pigment surface, or may be present via an anionic resin dispersant adsorbed or bonded to the pigment.

The pigment dispersant may be used alone or may be used in combination of two or more kinds thereof. The total content of the pigment dispersant is preferably 0.1% by mass or more and 30% by mass or less, more preferably 0.5% by mass or more and 25% by mass or less, still more preferably 1% by mass or more and 20% by mass or less, and particularly preferably 1.5% by mass or more and 15% by mass or less with respect to 100% by mass of the colored ink composition. When the content of the pigment dispersant is 0.1% by mass or more, there is a tendency that the dispersion stability of the pigment can be ensured. In addition, when the content of the pigment dispersant is 30% by mass or less, there is a tendency that the viscosity of the colored ink composition can be suppressed to be low.

In addition, a weight-average molecular weight of the pigment dispersant is more preferably 500 or more. By using such a pigment dispersant, there is a tendency that the odor is reduced and the dispersion stability of the pigment can be made better.

When a pigment (in particular, a white pigment) is dispersed by the pigment dispersant, a ratio of the pigment to the pigment dispersant is preferably 10:1 to 1:10, and more preferably 4:1 to 1:3.

1.3.2.2 Resin Particles

The colored ink composition contains resin particles. Since the resin particles can be in the same mode as the "resin particles" of the anionic resin particles contained in the above-described transparent ink composition, a description thereof will not be repeated.

The resin particles in the colored ink composition are preferably anionic. In this case, the aggregation action through the aggregating agent is excellent, and therefore, there is a tendency that better color developing properties can be obtained and better rubbing fastness can be obtained.

The resin particles in the colored ink composition are preferably a urethane resin or an acryl resin, and more preferably the urethane resin. In this case, there is a tendency that the rubbing fastness is excellent.

A glass transition temperature (Tg) of the resin particles in the colored ink composition is preferably −60° C. or higher and 50° C. or lower, more preferably −60° C. or higher and 40° C. or lower, and still more preferably −30° C. or higher and 10° C. or lower. With the glass transition temperature (Tg) of the resin particles within the range, there is a tendency that the fabric following property (texture) is more excellent.

A content (solid content concentration) of the resin particles is preferably 1% to 30% by mass, more preferably 2% to 25% by mass, still more preferably 4% to 20% by mass, particularly preferably 6% to 15% by mass, and more particularly preferably 8% to 12% by mass with respect to the total amount of the colored ink composition. When the content of the resin particles is within the range, there is a tendency that more excellent color developing properties and rubbing fastness can be obtained.

1.3.2.3 Water

The colored ink composition contains water. As the water, the same water as the above-described reaction solution can be used.

In addition, a water content is preferably 20% by mass or more, more preferably 30% by mass or more, still more preferably 40% by mass or more, and particularly preferably 50% by mass or more with respect to the total amount of the colored ink composition. An upper limit of the water content is not particularly limited, but is, for example, preferably 90% by mass or less, and more preferably 70% by mass or less with respect to the total amount of the colored ink composition.

1.3.2.4 Organic Solvent

The colored ink composition may contain an organic solvent. A type and a content of the organic solvent can each be the same as those of the above-described reaction solution.

In the colored ink composition, the organic solvent preferably includes an alkanediol, an alkylene glycol ether, and a trialkylene glycol, more preferably includes a 1,2-alkanediol, an alkylene glycol ether, and a trialkylene glycol, and still more preferably includes propylene glycol, triethylene glycol monobutyl ether, and triethylene glycol. When the organic solvent includes these solvents, the color developing properties and the rubbing fastness may be more excellent.

In addition, the colored ink composition further preferably contains 3.0% by mass or more, more preferably 4.0% by mass or more, and still more preferably 5.0% by mass or more of an organic solvent having a normal boiling point of 250° C. or higher. An upper limit of the content is not particularly limited, but is preferably 20% by mass or less, more preferably 15% by mass or less, and still more preferably 10% by mass or less.

When the organic solvent having a normal boiling point of 250° C. or higher is contained at a content within the range, there is a tendency that the nozzles of the ink jet head are kept moist and the ejection reliability (continuous printing stability) can be made better.

Furthermore, examples of the organic solvent having a normal boiling point of 250° C. or higher include glycerin and polyethylene glycol monomethyl ether. Furthermore, the organic solvent having a normal boiling point of 250° C. or higher is also referred to as a moisturizer. The organic solvent having a normal boiling point of 250° C. or higher preferably has a normal boiling point of 270° C. or higher, and more preferably has a normal boiling point of 280° C. or higher.

A content of the organic solvent is preferably 1% to 30% by mass, more preferably 3% to 25% by mass, still more preferably 5% to 20% by mass, and particularly preferably 7% to 17% by mass with respect to the total amount of the colored ink composition. When the content of the organic solvent is within the range, the color developing properties and the rubbing fastness may be more excellent.

1.3.2.5 Surfactant

The colored ink composition may contain a surfactant. A type and the like of the surfactant can be the same as those of the above-described reaction solution. The colored ink composition preferably contains a silicone-based surfactant as the surfactant.

A lower limit of a content of the surfactant is preferably 0.05% by mass or more, more preferably 0.1% by mass or more, still more preferably 0.2% by mass or more, and particularly preferably 0.3% by mass or more with respect to the total amount of the colored ink composition.

In addition, an upper limit of the content of the surfactant is preferably 3% by mass or less, more preferably 2% by mass or less, still more preferably 1% by mass or less, and particularly preferably 0.8% by mass or less with respect to the total amount of the colored ink composition. When the content of the surfactant is within the range, there is a tendency that the penetrability of the colored ink composition to the fabric is easily adjusted to a preferable level.

1.3.2.6 Other Components

The colored ink composition may contain additives such as a pH adjuster, a preservative and a fungicide, a rust inhibitor, a chelating agent, a viscosity modifier, a dissolution aid, and an antioxidant, depending on the necessity. When such an additive is contained, a content of the additive is preferably 0.1% to 5% by mass, more preferably 0.1% to 3% by mass, and still more preferably 0.1% to 1% by mass with respect to the total amount of the colored ink composition.

1.3.2.7 Physical Properties

From the viewpoint of reducing skin irritation, a pH of the colored ink composition is preferably 2.0 or higher, more preferably 5.0 or higher, and still more preferably 7.0 or higher. From the same viewpoint, an upper limit of the pH is preferably 11.5 or less, more preferably 10 or less, still more preferably 9.0 or less, and particularly preferably 8.0 or less.

The viscosity of the colored ink composition is preferably 1.0 to 10 mPa·s, more preferably 2.0 to 10 mPa·s, still more preferably 3.0 to 8.0 mPa·s, and particularly preferably 4.0 to 6.0 mPa·s at 20° C. In particular, when the viscosity is 4.0 mPa·s or more, there is a tendency that better color developing properties are obtained. When the viscosity is 6.0 mPa·s or less, there is a tendency that better ejection stability is obtained.

A surface tension of the colored ink composition is preferably 10 to 40 mN/m, more preferably 15 to 35 mN/m, still more preferably 20 to 30 mN/m, and particularly preferably 20 to 27 mN/m at 20° C.

1.4 Pressure Applying Step

The ink jet textile printing method according to the present embodiment includes a pressure applying step of applying pressure to a region of the fabric, to which the reaction solution and the transparent ink composition are attached, after the reaction solution attaching step and the transparent ink attaching step.

The pressure applying unit is not particularly limited as long as it can apply pressure to the fluff in a region of the fabric to which the reaction solution and transparent ink composition are attached. Examples of the units include a method in which pressure is applied without direct contact with the fabric and a method in which pressure is applied by direct contact with the fabric.

Examples of the pressure application which is performed by non-contact with the fabric, include pressure application by blowing air with a blower or the like.

Examples of the pressure applying unit performed by direct contact with the fabric include a pressure applying unit through surface contact and a pressure applying unit through line contact.

Examples of the pressure application through surface contact include pressure application through a surface of a plate or the like.

Examples of the line contact pressure application include applying pressure with a roller, a squeegee, or the like.

The pressure applying step is preferably performed through direct contact between the fabric and the pressure applying unit, and more preferably performed through line contact between the fabric and the pressure applying unit. In this case, each step including the pressure applying step can be easily performed in the same apparatus, and the step can be further simplified.

A pressure applied in the pressure applying step is not particularly limited as long as the fluff of the fabric can be fallen down, but is, for example, preferably 1,000 Pa or less, more preferably 100 Pa or less, still more preferably 10 Pa or less, particularly preferably 1 Pa or less, more particularly preferably 0.1 Pa or less, still more particularly preferably 0.01 Pa or less, and yet still more particularly preferably 0.001 Pa or less.

The pressure applying step is preferably performed before the above-described colored ink attaching step. In this case, there is a tendency that the fluff fixing effect can be further improved, and thus, the image quality disturbance due to the fluffing of the fabric can be further reduced.

In addition, the pressure applying step is preferably performed within 30 minutes after the above-described transparent ink attaching step, more preferably within 20 minutes, still more preferably within 10 minutes, particularly preferably within 5 minutes, and more particularly preferably within 1 minute. In this case, since the transparent ink is not completely dried and the pressure is applied in a state of a gel-like aggregate, there is a tendency that the aggregate is likely to be fixed in a state where the fluff is fallen down by the viscosity, the fluff fixing effect is further improved, and the image quality disturbance due to the fluffing of the fabric is further reduced.

1.5 Fabric Position Between Respective Steps

The fabric is mounted on a mounting table, and the reaction solution attaching step, the transparent ink attaching step, the pressure applying step, and the colored ink attaching step are performed without changing a relative positional relationship between the fabric and the mounting table between the respective steps. As a result, each step can be continuously performed and the step can be simplified.

Examples of the form of the fabric used in the ink jet textile printing method according to the present embodiment include cloth, clothing, and other clothing ornaments. The cloth includes a woven fabric, a knitted fabric, a nonwoven fabric, and the like. The clothing and other clothing ornaments include sewn T-shirts, handkerchiefs, scarves, towels, handbags, and fabric furniture such as bags, curtains, sheets, bedspreads, and wallpaper, cloth before and after cutting as parts to be sewn, and the like. Examples of these forms include a long roll-shaped product, a product cut into a predetermined size, and a product having the shape of a manufactured product.

Examples of the material constituting the fabric include natural fibers such as cotton, linen, wool, and silk, synthetic fibers such as polypropylene, polyesters, acetate, triacetate, polyamide, and polyurethane, and biodegradable fibers such as polylactic acid, and blended fibers thereof may be used. Among these materials, the fabric is made of cotton, a polyester, or a blend of cotton and a polyester, which is preferably easily available.

The fabric is preferably a fabric having fluff. In particular, the fabric preferably has fluff in which fibers protrude from a fiber bundle constituting a fabric, and the length of the fluff in the vertical direction from a surface of the fiber bundle to the apex of the fluff is preferably 50 μm or more, and more preferably 100 μm or more, from the viewpoint that the effect of the present disclosure can be further enjoyed. In such a fabric, a problem of image quality disturbance due to the fluffing is more likely to occur. On the other hand, by using the ink jet textile printing method according to the present embodiment, even when such a fabric is used, an effect of the fluffing on the printing surface can be reduced to form an image.

The length can be measured by a known unit, for example, a digital microscope (KEYENCE, VHX-5000), and an average value (arithmetic mean) of a plurality of fluffs (for example, 10 points) may be determined as the length.

Furthermore, the "fiber bundle" refers to a plurality of fibers that are bundled, and has a substantially circular cross-section. In addition, the "fluff" refers to an end part of the short fiber that stands up from a surface of the fiber bundle, and an end part of the short fiber that exists inside the fiber bundle is not referred to as fluff.

In addition, it is preferable that the fabric has a value of a brightness $L^+$ in an $L^+a^+b^+$ color system of 70 or less. The $L^+$ value may be 60 or less, or may be 50 or less. In the textile printing on such a fabric, a white ink (base) and a color ink may be used as the colored ink composition in order to obtain excellent color developing properties. When the white ink is exposed on the fabric surface by fluffing, the image quality is likely to be significantly disturbed. On the other hand, by using the ink jet textile printing method according to the present embodiment, even when such a fabric is used, an effect of the fluffing on the printing surface can be reduced to form an image.

Furthermore, the $L^+$ value can be measured using a known colorimeter, but can be measured using, for example, a Spectrolino (GretagMacbeth).

Furthermore, examples of the fabric having an $L^+$ value of 70 or less include a colored fabric colored with a dye or the like in advance. Examples of dyes with which the fabric is pre-colored include water-soluble dyes such as an acidic dye and a basic dye, disperse dyes used in combination with a dispersant (surfactant), and reactive dyes. As a method for coloring the fabric with a dye, a known method can be adopted depending on a fabric forming material or a fabric form.

1.6 Heating and Drying Step

The ink jet textile printing method according to the present embodiment may be provided with heating and drying the ink or the like attached to the fabric (heating and drying step) after the above-mentioned colored ink attaching step.

The heating and drying method is not particularly limited, and examples thereof include a belt conveyor oven, a normal pressure steam method, a high pressure steam method, and a thermofix method. A heat source at the time of heating and drying is not particularly limited, but for example, an infrared lamp or the like can be used.

The heating and drying temperature is preferably a temperature at which the resin particles that can be included in the ink are fused and the medium such as water is volatilized. The heating and drying temperature is, for example, preferably 100° C. or higher and 250° C. or lower, more preferably 120° C. or higher and 230° C. or lower, still more preferably 140° C. or higher and 200° C. or lower, and particularly preferably 150° C. or higher and 180° C. or lower. Here, the heating and drying temperature in the heating and drying step refers to a surface temperature of an image and the like formed on the fabric. A time for carrying out heating and drying is not particularly limited, but is, for example, preferably 30 seconds or more and 20 minutes or less, and more preferably 2 minutes or more and 5 minutes or less.

1.7 Other Steps

The ink jet textile printing method according to the present embodiment may be provided with washing the fabric on which the recording is performed with water; performing heating and drying again; and the like. In the washing with water, as a soaping treatment, components such as ink not fixed on the fabric may be washed away using a hot soap liquid or the like, depending on the necessity.

1.8. Ink Jet Textile Printing Apparatus

An ink jet textile printing apparatus which can be preferably used in the ink jet textile printing method according to the present embodiment will be described.

Figure 11:
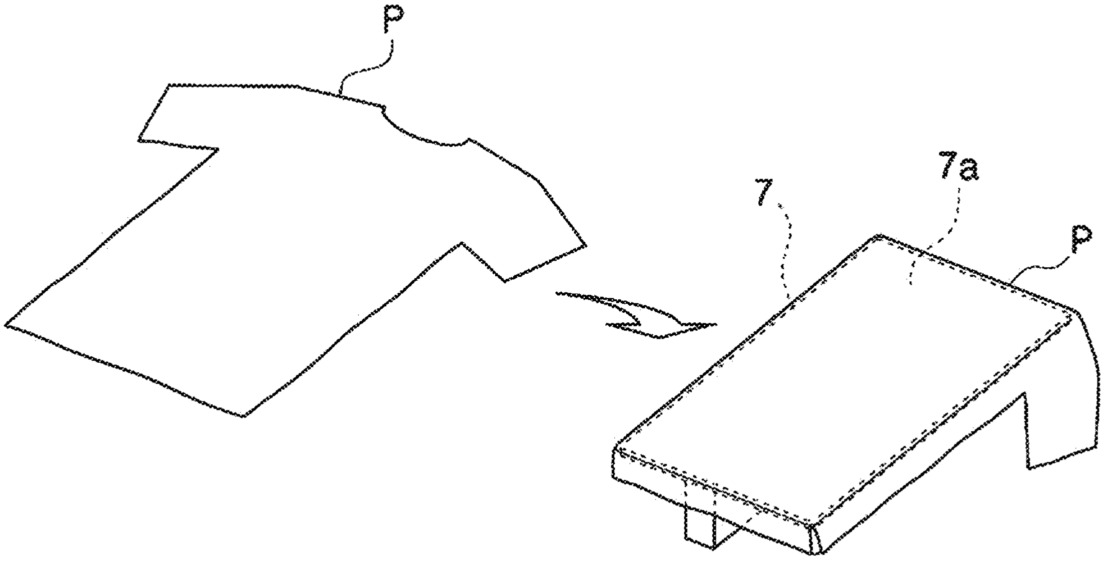
FIG. 11 is a view showing a textile-printed material and a state of a textile-printed material mounted on a mounting table according to the second embodiment of the present disclosure.

FIG. 9 is an external perspective view of an ink jet textile printing apparatus 1, FIG. 10 is a schematic view of a textile-printed material transport path of the ink jet textile printing apparatus 1, and FIG. 11 is a view showing a textile-printed material P and a state of the textile-printed material P mounted on a mounting table 7.

As shown in FIG. 9, the ink jet textile printing apparatus 1 is provided with a guide table 8 at a bottom section of an apparatus main body 2, and configured such that the mounting table 7 is guided by a guide section 8*a* formed on the guide table 8 in the moving direction TD (the direction of an arrow A in FIG. 10) of the textile-printed material P.

The mounting table 7 is a smooth table on which the textile-printed material P is mounted, and is configured such that the textile-printed material P is mounted on a mounting surface 7*a* as shown in FIG. 11 (in which a T-shirt is shown as an example of the textile-printed material P in FIG. 11), and the textile-printed material P can pass through a textile printing execution section 5 by moving the mounting table 7, on which the textile-printed material P is mounted, in the transport direction A. Incidentally, the illustration and the description of a drive mechanism that drives the mounting table 7 are omitted in the present specification. As described above, the mounting table 7 and the drive mechanism that drives the mounting table 7 constitute a moving unit that moves the textile-printed material P.

In addition, the mounting table 7 may be attachable to and detachable from the apparatus main body 2. As a result, the mounting table 7 can be removed from the apparatus main body 2 and transported with the textile-printed material P being mounted on the mounting table 7, or the mounting table 7 can be mounted on a heating device separately prepared from the apparatus main body 2 to heat the textile-printed material P.

The ink jet head 14 constituting the textile printing execution section 5 is an ink jet head of a known structure having a plurality of nozzle rows in which a plurality of nozzles are arranged, the nozzles having nozzles that eject a reaction solution, nozzles that eject a transparent ink composition, and nozzles that eject a colored ink composition. The ink jet head 14 is mounted on the carriage 13 driven back and forth in a direction (the scanning direction SD in FIG. 9: the back side direction of the paper surface in FIG. 10) that intersects the moving direction A of the textile-printed material P.

Figure 12:
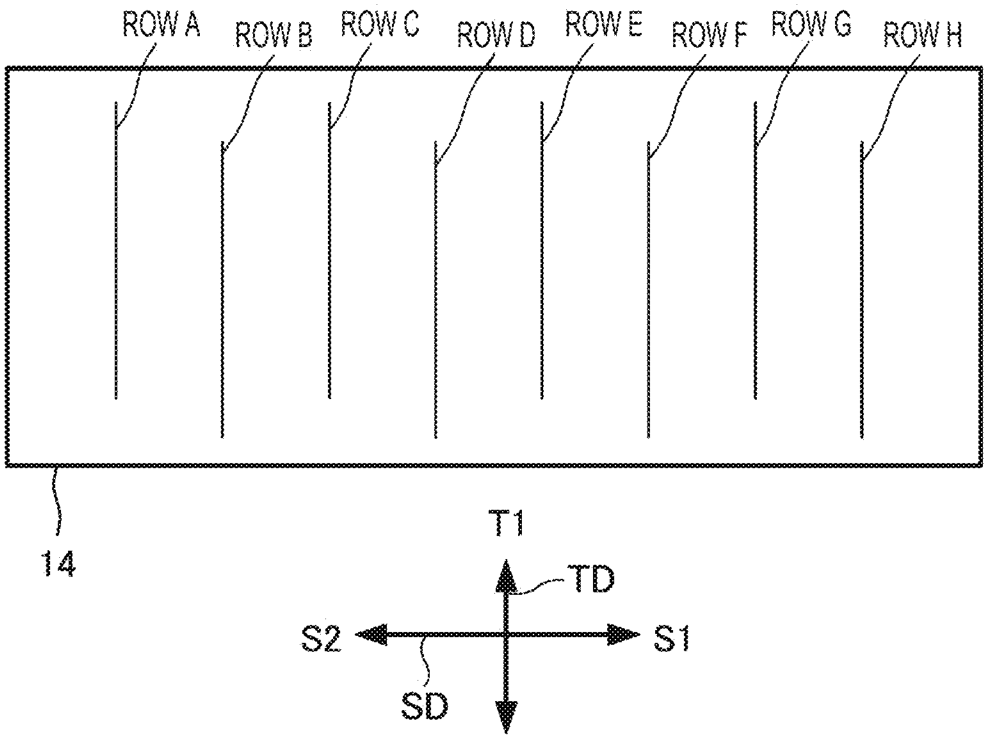
FIG. 12 is a schematic view showing an example of a nozzle row arrangement of an ink jet head according to the second embodiment of the present disclosure.

FIG. 12 shows an example of each nozzle row contained in the nozzle surface of the ink jet head 14. In FIG. 12, the ink jet head 14 has a plurality of nozzle rows made up of a plurality of nozzles arranged along a direction (the moving direction TD of the textile-printed material P) that intersects a direction in which the ink jet head 14 is moved (scanning direction SD), in which the rows are rows A to H arranged along the scanning direction SD.

At this time, by arranging the nozzle rows that eject the reaction solution such that in a case of being projected along the scanning direction SD, the nozzle rows that eject the reaction solution overlap with at least a part of the nozzle rows that eject the transparent ink composition in the moving direction TD of the textile-printed material P, the above-described Step 1 (application of the reaction solution and the transparent ink composition in the same single scanning of the ink jet head to the same region in the fabric) can be performed.

The ink and the like to be ejected from each nozzle row are selected as appropriate, but for example, it is preferable to select rows A to B as the nozzle rows that eject the reaction solution, rows C to D as the nozzle rows that eject the transparent ink composition, and rows E to H as the nozzle row that eject the colored ink composition.

In a case of a serial printer, the ink jet head 14 includes a head having a length smaller than the width of the textile-printed material P, and recording is performed as the ink jet head 14 moves in the scanning direction SD that intersects the moving direction TD of the textile-printed material P. In addition, in the serial printer, the ink jet head 14 is mounted on the carriage 13 that moves in a predetermined direction, and the ink jet head 14 moves along with the movement of the carriage 13 to eject the ink and the reaction solution onto the textile-printed material P. The movement of the textile-printed material P may be performed between the respective scannings.

In addition, the ink jet textile printing apparatus is not limited to the serial-type printer and may be a line-type printer. A schematic side view of the line printer as another example of the ink jet Textile printing apparatus is shown in FIG. 13. The line printer can have the same configuration as the serial printer except for the textile printing execution section 5.

The line printer includes a line head 300 having a length corresponding to a width of the textile-printed material P. The line head 300 may be configured to include a plurality of line heads. The line head 300 has cavities that accommodate the reaction solution, the transparent ink composition, and the colored ink composition (the ink and the like), an ejection drive section provided for each cavity, and nozzles that eject the ink and the like. A plurality of the cavities, and the ejection drive section and the nozzles provided for each cavity may be each independently provided in one head. The ejection drive section can be formed using an electromechanical conversion element such as a piezoelectric element that changes the volume of the cavity through mechanical deformation; an electronic heat conversion element that generates and ejects air bubbles in the ink by generating heat; or the like.

In the line printer, the head is fixed (substantially) without moving, and recording is performed in a single scanning of the ink jet head. The line printer is more advantageous than the serial printer in terms of a recording speed.

As shown in FIG. 10, the ink jet textile printing apparatus 1 includes a pressure applying unit 10. The pressure applying unit 10 applies pressure to the region of the textile-printed material P, to which the reaction solution and the transparent ink composition are attached, through the ink jet head 14. The pressure applying unit 10 shown in FIG. 10 is configured (for example, a roller and a squeegee) to come into line contact with the textile-printed material P to apply pressure, but may be configured to apply pressure through a surface such as a plate, or configured to apply pressure by blowing air with a blower or the like.

Incidentally, a control section 16 is a control unit that controls a drive mechanism (not shown) that drives the mounting table 7, a drive mechanism (not shown) that drives the carriage 13, and a drive mechanism (not shown) that drives the ink jet head 14.

Hereinafter, an example of the order of the above-described steps of the ink jet textile printing method according to the present embodiment using the ink jet textile printing apparatus 1 will be described. First, the mounting table 7 on which the textile-printed material P is mounted moves in a T1 direction from an installation position (left side in FIG. 10) to the initial position of the ink applying step (right side of the ink jet head 14 in FIG. 10). Next, the mounting table 7 performs a reaction solution attaching step and a transparent ink attaching step of attaching the reaction solution and the transparent ink composition through the ink jet head 14 as it moves in the T2 direction. Thereafter, the mounting table 7 performs a pressure applying step of applying pressure to the textile-printed material P through a pressure applying unit 10 as it further moves in the T2 direction, and returns to the installation position (left side in FIG. 10). Next, the mounting table 7 on which the textile-printed material P is mounted moves again from the installation position (left side in FIG. 10) in the T1 direction to the initial position for the ink applying step (right side of the ink jet head 14 in FIG. 10). Then, the mounting table 7 attaches the colored ink composition through the ink jet head 14 as it moves in the T2 direction, and performs the colored ink attaching step. Between these steps, a series of operations are performed on the textile-printed material P without being removed from the mounting table 7.

2. Ink Set

The ink set according to one embodiment of the present disclosure is an ink set used in the above-described ink jet textile printing method, the ink set including: the reaction solution; the transparent ink composition; and the colored ink composition, each described above.

By using the ink set according to the present embodiment, an effect of the fluffing on a printing surface can be reduced to form an image. The reaction solution, the transparent ink composition, and the colored ink composition contained in the ink set are as described above, and thus, a description thereof will not be repeated.

In the present disclosure, the "ink set" is a set of inks in which a reaction solution, a transparent ink composition, and a colored ink composition are combined. The ink set is a set of inks that are mixed and used. The number of the colored ink compositions included in the ink set may be only one or may be two or more. The same applies to the reaction solution and the transparent ink composition provided in the ink set.

3. Examples

Hereinafter, the first embodiment of the present disclosure will be described in more detail with reference to Examples, but the present disclosure is not limited to these Examples. Hereinafter, "%" is based on mass unless otherwise specified.

3.1 Preparation of Reaction Solution, Transparent Ink Composition, and Colored Ink Composition Each component was put into a container to have the composition shown in Table 1, mixed, stirred, and then filtered with a 5 μm membrane filter to obtain the reaction solution, the transparent ink composition, and the colored ink composition of each example. Furthermore, the numerical values of the respective components shown in the examples in the table represent % by mass unless otherwise specified. In addition, the % by mass of the pigment and the resin particles in Table 1 represents a solid content concentration, and the ion exchange water was added so that a total mass of the composition was 100% by mass.

Furthermore, as the pigment, a pigment dispersion liquid prepared in advance by the following procedure was used. C. I. Pigment White 6 (specific gravity: 4.2 g/mL) was used as a pigment, and an anionic resin dispersant was used as a pigment dispersant. Specifically, a styrene-acryl resin synthesized using 55% by mass of styrene, 20% by mass of acrylic acid, and 30% by mass of methyl methacrylate was used. 1 part by mass of the dispersant and 10 parts by mass of ion exchange water with respect to 3 parts by mass of the pigment were mixed, the obtained mixture was premixed and then dispersed with zirconia beads having a diameter of 0.03 mm at a peripheral speed of 10 m/s and a liquid temperature of 30° C. for 15 minutes using a beads mill disperser (UAM-015 manufactured by Kotobuki Kogyou Co., Ltd.), and then coarse particles were centrifugally separated by a centrifugal separator (Model-3600 manufactured by Kuboyama Shoji Co., Ltd.) to obtain a titanium oxide dispersion.

Explanations with regard to the matters described in Table 1 will be supplemented.

TAKELAC WS-6021 (product name, manufactured by Mitsui Chemicals Polyurethane Co., Ltd.)

BYK-348 (product name, manufactured by BYK Chemie Japan K. K.)

Olfine E1010 (product name, manufactured by Nissin Chemical Industry Co., Ltd.)

The viscosity was measured in an environment of 20° C. using a viscoelasticity tester MCR-300 (product name, manufactured by Pysica).

The surface tension was measured by confirming a surface tension when a platinum plate is wetted with a reaction solution or an ink in an environment of 25° C. using an automatic surface tensiometer CBVP-Z (product name, manufactured by Kyowa Interface Science Co., Ltd.).

3.2 Recording Conditions

The ink jet textile printing methods according to each of Examples and each of Comparative Examples were performed under the following conditions and the conditions described in Tables 2 to 4, using the reaction solution, the transparent ink composition, and the colored ink composition obtained by the preparations above. Furthermore, Table 2 describes forming a resin layer (Step a), Table 3 describes forming a white ink layer (Step b), and Table 4 describes overcoat treating (Step c) and a drying step (Step d). The recording was performed successively in accordance with the recording conditions in the order of Steps a, b, c, and d.

Printing machine: SC-F2200 modification machine (manufactured by Seiko Epson Corporation)

Drying: The fabric was dried at 160° C. for 3 minutes in a belt conveyor oven (Fusion R 36-6-4, manufactured by M&R Printing Equipment Inc.).

Fabric: 100% cotton, black T-shirt (Printstar), $L^+$ value of colored portion of 12

Application Conditions

Image resolution: 1,200×600 dpi

Drive Duty of each row: 100%

CR (carriage) movement speed: 6 to 40 inch/s

Head drive frequency: 3 to 60 kHz

Application amount adjustment: Adjusted by a CR movement speed and a drive frequency As the head nozzle configuration, the configuration shown in FIG. 2 was adopted, the rows A and B were nozzle rows that eject the reaction solution, the rows C and D were nozzle rows that eject the transparent ink composition, and the rows E to H were nozzle rows that eject the colored ink composition.

In Table 2, the expression of "PRINTING TIME DIFFERENCE BETWEEN REACTION SOLUTION-TRANSPARENT INK" being "SIMULTANEOUS" indicates that the reaction solution and the transparent ink composition are applied onto the same region in the fabric in a single scanning of the ink jet head.

In Table 3, the expression of the "LANDING TIME DIFFERENCE" being "SIMULTANEOUS" indicates that the reaction solution attaching step and the colored ink attaching step are performed simultaneously. More specifically, the expression indicates that the reaction solution and the colored ink composition are applied onto the same region in the fabric in a single scanning of the ink jet head.

Furthermore, the "VISCOSITY OF MIXED LIQUID OF REACTION SOLUTION AND TRANSPARENT INK IN EQUIVALENT AMOUNTS" described in Table 5 is a viscosity obtained by dropping the reaction solution and the transparent ink composition in equal amounts on a non-rotating plate to be symmetrical with respect to the center of the non-rotating plate in the measurement section consisting of a disc-shaped non-rotating plate and a disc-shaped rotating plate of a rheometer (Anton paar, MCR302e), and measuring the liquid viscosity at a shear rate of 50 [$s^{-1}$] after 10 seconds from the start of plate rotation.

3.3 Evaluation Method 3.3.1 Whiteness Measurement (Color Developing Properties)

In a textile-printed matter obtained by the ink jet textile printing method according to each of Examples and each of Comparative Examples, the $L^+$ value (whiteness) was measured using a fluorescence spectrophotometer (Konica Minolta Co., Ltd., FD-7), and the image quality (whiteness) was determined according to the following criteria.

Determination Criteria

Good: $L^+$ is 85 [−] or more.

Defective: $L^+$ is less than 85 [−].

3.3.2 Texture

A textile-printed matter obtained by the ink jet textile printing method according to each of Examples and each of Comparative Examples was cut to a size of 20×20 cm, and thus, a tension-curvature curve was measured under a shear tensile stress of 10 gf/cm and a shear torsion angle of ±8° using a tension-shear tester KE-S-FB1-A (product name, manufactured by Kato Tech Co., Ltd.). A shear hardness [gf/(cm·deg)] was determined by linear regression between the curvatures of 0.5° and 2.5° in the measured tension-curvature curve. Further, a shear hardness of a cotton fabric (Printstar 00085-CVT, the same fabric as used in each Example) onto which the reaction solution composition and the ink composition was not applied was determined in the same manner as the above-described textile-printed matter. An absolute value of a difference between the shear hardness of the textile-printed matter and the shear hardness of the cotton fabric was calculated, and the texture was evaluated according to the following evaluation criteria.

Determination Criteria

A: The absolute value of the difference in shear hardness is 3.5 or less.

B: The absolute value of the difference in shear hardness is more than 3.5 and 5.0 or less.

C: The absolute value of the difference in shear hardness is more than 5.0.

3.3.3 Rubbing Fastness Test

The rubbing fastness was evaluated according to the following dry rubbing criteria or wet rubbing criteria in accordance with a dry test or wet test specified in the "Test Method for Dyeing Fastness to Rubbing" in JIS L 0849 with respect to the textile-printed matter obtained by the ink jet textile printing method according to each of Examples and each of Comparative Examples. Furthermore, the test was performed by a clock meter method. The evaluation was performed by determining a contamination grade by a visual method in accordance with Clause 10 (determination of dyeing fastness) of JIS L 0801 cited in JIS L 0849.

Criteria for Dry Rubbing

AA: The rubbing fastness is Grade 3 or 4 (intermediate grade) or more and Grade 4 or less.

A: The rubbing fastness is Grade 2 or 3 (intermediate grade) or more and Grade 3 or less.

B: The rubbing fastness is Grade 1 or 2 (intermediate grade) or more and Grade 2 or less.

C: The rubbing fastness is Grade 1 or less.

Criteria for Wet Rubbing

AA: The rubbing fastness is Grade 3 or 4 (intermediate grade) or more and Grade 4 or less.

A: The rubbing fastness is Grade 2 or 3 (intermediate grade) or more and Grade 3 or less.

B: The rubbing fastness is Grade 1 or 2 (intermediate grade) or more and Grade 2 or less.

C: The rubbing fastness is Grade 1 or less.

3.3.4 White Ink Continuous Printing Stability

The colored ink compositions (white ink) used in each of Examples and each of Comparative Examples were filled in an ink cartridge of SC-F2200 (manufactured by Seiko Epson Corporation). Next, after confirming that ink is ejected from all the nozzles, printing was continuously performed for 1 minute. The application conditions were the same as the above-described conditions. The evaluation was performed in an environment of a temperature of 25.0° C. and a relative humidity of 40.0% until the application of the ink was completed. After printing, the number of nozzles for which abnormal ejection occurred was confirmed. This test was performed three times, and the continuous printing stability was determined according to the following criteria, using an average value of the three results.

Determination Criteria

AA: No printing omission and disturbance are observed after continuous ejection.

A: After continuous ejection, there is a printing omission and disturbance in one or more and two or less nozzles.

3.4 Evaluation Results

The evaluation results are shown in Table 5. In each of Examples relating to an ink jet textile printing method, which includes a reaction solution attaching step of attaching a reaction solution containing an aggregating agent that aggregates components in an ink, and water to a fabric using an ink jet method, a transparent ink attaching step of attaching a transparent ink composition containing anionic resin particles and water to the fabric using the ink jet method; and a colored ink attaching step of attaching a colored ink composition containing a pigment, resin particles, and water onto a region, to which the transparent ink composition is attached, using the ink jet method, in which the reaction solution attaching step and the transparent ink attaching step include Step 1: Step 1: applying the reaction solution and the transparent ink composition to the same region in the fabric in a single scanning of an ink jet head, and in Step 1, a range of the minimum value of a total attachment amount of the reaction solution and the transparent ink composition per unit area/per unit time was 34 mg/(s·inch$^2$) or more, the color developing properties and the rubbing fastness were excellent.

On the other hand, in the ink jet textile printing method according to each of Comparative Examples that does not satisfy the above-described configuration, at least one of the color developing properties and the rubbing fastness was inferior.

Furthermore, although not described in the table, the obtained textile-printed matter had excellent color developing properties and rubbing fastness even when the textile printing that satisfies the configuration was performed with a line printer.

The following contents are derived from the above-described first embodiment.

An aspect of the ink jet textile printing method includes a reaction solution attaching step of attaching a reaction solution containing an aggregating agent that aggregates components in an ink, and water to a fabric using an ink jet method, a transparent ink attaching step of attaching a transparent ink composition containing anionic resin particles and water to a fabric using the ink jet method, and a colored ink attaching step of attaching a colored ink composition containing a pigment, resin particles, and water onto a region, to which the transparent ink composition is attached, using the ink jet method, in which the reaction solution attaching step and the transparent ink attaching step have Step 1, and in Step 1, a range of a minimum value of a total attachment amount of the reaction solution and the transparent ink composition per unit area/per unit time is 34 mg/(s·inch$^2$) or more.

Step 1: applying the reaction solution and the transparent ink composition to the same region in the fabric in a single scanning of an ink jet head In the aspect of the ink jet textile printing method, Step 1 may be performed a plurality of times, the reaction solution attaching step and the transparent ink attaching step may include Step 2, and Step 2 may be performed between Steps 1 performed a plurality of times.

Step 2: transporting the fabric in a direction that intersects a direction of the scanning In any aspect of the ink jet textile printing method, the pigment may be a white pigment.

In any aspect of the ink jet textile printing method, a viscosity of a mixed liquid obtained by mixing the reaction solution and the transparent ink composition in equal amounts may be 50 mPa·s or more.

In any aspect of the ink jet textile printing method, the reaction solution attaching step may be performed simultaneously with the colored ink attaching step.

In any aspect of the ink jet textile printing method, the colored ink attaching step may be performed in a scanning different from that in the transparent ink attaching step.

In any aspect of the ink jet textile printing method, a second transparent ink attaching step of attaching a second transparent ink composition containing anionic resin particles and water onto the region of the fabric, to which the colored ink composition is attached, using an ink jet method, may be further included.

In any aspect of the ink jet textile printing method, at least one of the pigment and the resin particles in the colored ink composition may be anionic.

In any aspect of the ink jet textile printing method, the resin particles in the colored ink composition may be a urethane resin or an acryl resin.

In any aspect of the ink jet textile printing method, the colored ink composition may further contain 3.0% by mass or more of an organic solvent having a normal boiling point of 250° C. or higher.

In any aspect of the ink jet textile printing method, the fabric may have an $L^*$ of 75 or less, and may be cotton, a polyester, or a blend of cotton and a polyester.

In any aspect of the ink jet textile printing method, the reaction solution may have a pH of 2.0 or more.

In any aspect of the ink jet textile printing method, in a region in the fabric, to which the reaction solution, the transparent ink composition, and the colored ink composition are attached, a total attachment amount of the reaction solution, the transparent ink composition, and the colored ink composition may be 100 mg/inch$^2$ or more.

An aspect of the set is a set used in the above-described any aspect of the ink jet textile printing method, the set including: the reaction solution; the transparent ink composition; and the colored ink composition.

3. Examples

Hereinafter, the second embodiment of the present disclosure will be described in more detail with reference to Examples, but the present disclosure is not limited to these Examples. Hereinafter, "%" is based on mass unless otherwise specified.

3.1 Preparation of Reaction Solution, Transparent Ink Composition, and Colored Ink Composition Each component was put into a container to have the composition shown in Table 1, mixed, stirred, and then filtered with a 5 μm membrane filter to obtain the reaction solution, the transparent ink composition, and the colored ink composition of each example. Furthermore, the numerical values of the respective components shown in the examples in the table represent % by mass unless otherwise specified. In addition, the % by mass of the pigment and the resin particles in Table 1 represents a solid content concentration, and the ion exchange water was added so that a total mass of the composition was 100% by mass.

Furthermore, as the pigment, a pigment dispersion liquid prepared in advance by the following procedure was used. C. I. Pigment White 6 (specific gravity: 4.2 g/mL) which is titanium oxide was used as a pigment, and an anionic resin dispersant was used as a pigment dispersant. Specifically, a styrene-acryl resin synthesized using 55% by mass of styrene, 20% by mass of acrylic acid, and 30% by mass of methyl methacrylate was used. 1 part by mass of the dispersant and 10 parts by mass of ion exchange water with respect to 3 parts by mass of the pigment were mixed, the obtained mixture was premixed and then dispersed with zirconia beads having a diameter of 0.03 mm at a peripheral speed of 10 m/s and a liquid temperature of 30° C. for 15 minutes using a beads mill disperser (UAM-015 manufactured by Kotobuki Kogyou Co., Ltd.), and then coarse particles were centrifugally separated by a centrifugal separator (Model-3600 manufactured by Kuboyama Shoji Co., Ltd.) to obtain a titanium oxide dispersion.

Explanations with regard to the matters described in Table 1 will be supplemented.

TAKELAC WS-6021 (product name, manufactured by Mitsui Chemicals Polyurethane Co., Ltd.)

BYK-348 (product name, manufactured by BYK Chemie Japan K. K.)

Olfine E1010 (product name, manufactured by Nissin Chemical Industry Co., Ltd.)

The viscosity was measured in an environment of 20° C. using a viscoelasticity tester MCR-300 (product name, manufactured by Pysica).

The surface tension was measured by confirming a surface tension when a platinum plate is wetted with a reaction solution or an ink in an environment of 20° C. using an automatic surface tensiometer CBVP-Z (product name, manufactured by Kyowa Interface Science Co., Ltd.).

3.2 Recording Conditions

The ink jet textile printing method according to each of Examples and Comparative Examples was performed under the following conditions and the conditions described in Table 2, using the reaction solution, the transparent ink composition, and the colored ink composition obtained by the preparations above.

Printing machine: SC-F2200 (manufactured by Seiko Epson Corporation, serial type) modification machine Drying: The fabric was dried at 160° C. for 3 minutes in a belt conveyor oven (Fusion R 36-6-4, manufactured by M&R Printing Equipment Inc.).

Fabric: 100% cotton, black T-shirt (Printstar), $L^*$ value of a colored portion: 20, and an average value of fluff heights: more than 50 μm Image resolution: 1,200×600 dpi Drive Duty of each row: 100%

As the head nozzle configuration, the configuration shown in FIG. 12 was adopted, the rows A and B were nozzle rows that eject the reaction solution, the rows C and D were nozzle rows that eject the transparent ink composition, and the rows E to H were nozzle rows that eject the colored ink composition.

The fabric was mounted on a platen, and printing was performed without being removed from the platen between any steps of the reaction solution and transparent ink attaching steps, the pressure applying step with a squeegee, and the white ink attaching step.

In Examples 1 to 12, the reaction solution and transparent ink attaching steps and the white ink attaching step were performed after the pressure applying step with the squeegee. In Comparative Example 1, after the reaction solution and transparent ink attaching steps were performed, the white ink attaching step was performed. In any of Examples, after the white ink attaching step was performed, the drying was performed under the above-described conditions to obtain a textile-printed matter.

In Table 2, with regard to the presence or absence of a squeegee (wiping), "PRESENCE" in all Examples except for Example 2 indicates that the step was performed with a rubber wiper, and "PRESENCE" in Example 2 indicates that the step was performed with a rubber roller.

"VISCOSITY OF MIXED LIQUID" described in Table 2" is a viscosity obtained by dropping the reaction solution and the transparent ink composition in equal amounts on a non-rotating plate to be symmetrical with respect to the center of the non-rotating plate in the measurement section consisting of a disc-shaped non-rotating plate and a disc-shaped rotating plate of a rheometer (Anton paar, MCR302e), and measuring the liquid viscosity at a shear rate of 50 [$s^{-1}$] after 10 seconds from the start of plate rotation.

An average value of the fluff heights was measured using a 3D observation function of a digital microscope (KEYENCE, VHX-5000) to measure a height of the fiber (fluff) protruding from the fabric surface, which was taken as an average value of the fluffs at 10 points.

In Table 2, "LANDING TIME DIFFERENCE (REACTION SOLUTION/TRANSPARENT INK)" is a time difference between the attachment of the reaction solution and the attachment of the transparent ink composition in the same region of the fabric, and the unit is seconds.

Examples 1 to 6, 9 to 12, and Comparative Example 1 were performed by attaching the reaction solution and the transparent ink composition to the fabric in the same single scanning, and Examples 7 and 8 were performed by attaching the transparent ink composition in a different scanning after the reaction solution was attached.

Furthermore, in Table 2, "TIME DIFFERENCE FROM APPLICATION OF TWO LIQUIDS TO SQUEEGEE (WIPING)" represents a time difference from the attachment of the transparent ink composition to the squeegee.

3.3 Evaluation Method 3.3.1 Color Developing Properties

In a textile-printed matter obtained by the ink jet textile printing method according to each of Examples and Comparative Examples, the $L^+$ value (whiteness) was measured using a fluorescence spectrophotometer (Konica Minolta Co., Ltd., FD-7), and the color developing properties were determined according to the following criteria.

Determination Criteria

A+: $L^+$ is 90 or more.

A: $L^+$ is 80 or more and less than 90.

B: $L^+$ is 75 or more and less than 80.

C: $L^+$ is less than 75.

3.3.2 Image Quality Disturbance

In the textile-printed matter obtained by the ink jet textile printing method according to each of Examples and Comparative Examples, the surface layer (white ink layer) was visually observed, and the image quality disturbance was determined according to the following criteria.

Determination Criteria

A: There is no exposure of the medium surface layer (cotton) due to the fluffing in the white ink layer (surface layer).

B: There is a slight exposure of the medium surface layer (cotton) due to the fluffing in the white ink layer (surface layer).

C: There is an exposure of the medium surface layer (cotton) due to the fluffing in the white ink layer (surface layer).

3.3.3 Crack of Wh Ink Layer

The surface layer (white ink layer) of the textile-printed matter obtained by the ink jet textile printing method according to each of Examples and Comparative Examples was visually observed, and the occurrence of a crack was determined according to the following criteria.

Determination Criteria

A: There is no crack.

B: There is a slight crack.

C: There is a crack.

3.4 Evaluation Results

The evaluation results are shown in Table 2. In each of Examples relating to an ink jet textile printing method, which includes a reaction solution attaching step of attaching a reaction solution containing an aggregating agent that aggregates components in an ink, and water to a fabric, a transparent ink attaching step of attaching a transparent ink composition containing anionic resin particles that react with the aggregating agent and are aggregated, and water to the fabric, a colored ink attaching step of attaching a colored ink composition containing a pigment, resin particles, and water onto a region of the fabric, to which the transparent ink composition is attached, using an ink jet method, and a pressure applying step of applying pressure to a region of the fabric, to which the reaction solution and the transparent ink composition are attached, after the reaction solution attaching step and the transparent ink attaching step, and the fabric is mounted on a mounting table, and the reaction solution attaching step, the transparent ink attaching step, the pressure applying step, and the colored ink attaching step are performed without changing a relative positional relationship between the fabric and the mounting table between the respective steps, in any case, an image could be formed with a favorably reduced effect of the fluffing on the printing surface.

On the other hand, in the ink jet textile printing method according to Comparative Examples not satisfying the configuration, an image could not be formed with a favorably reduced effect of the fluffing on the printing surface being favorably reduced.

The following contents are derived from the above-described second embodiment.

One aspect of an ink jet textile printing method includes a reaction solution attaching step of attaching a reaction solution containing an aggregating agent that aggregates components in an ink, and water to a fabric, a transparent ink attaching step of attaching a transparent ink composition containing anionic resin particles that react with the aggregating agent and are aggregated, and water, to the fabric, a colored ink attaching step of attaching a colored ink composition containing a pigment, resin particles, and water onto a region of the fabric, to which the transparent ink composition is attached, using an ink jet method, and a pressure applying step of applying pressure to a region of the fabric, to which the reaction solution and the transparent ink composition are attached, after the reaction solution attaching step and the transparent ink attaching step, in which the fabric is mounted on a mounting table, and the reaction solution attaching step, the transparent ink attaching step, the pressure applying step, and the colored ink attaching step are performed without changing a relative positional relationship between the fabric and the mounting table between the respective steps.

In the aspect of the ink jet textile printing method, a time difference between the attachment of the reaction solution and the attachment of the transparent ink composition in the same region of the fabric may be within 30 seconds.

In any aspect of the ink jet textile printing method, the reaction solution attaching step and the transparent ink attaching step may include Step 1.

Step 1: Applying the Reaction Solution and the Transparent Ink Composition to the Same Region in the Fabric in the Same Single Scannings In any aspect of the ink jet textile printing method, a viscosity of each of the reaction solution and the transparent ink composition may be 3 to 8 mPa·s at 20° C., and a viscosity of a mixed liquid of the reaction solution and the transparent ink composition in equal amounts may be 50 mPa·s or more at 20° C.

In any aspect of the ink jet textile printing method, a total application amount of the reaction solution and the transparent ink composition may be 0.02 g/inch$^2$ or more.

In any aspect of the ink jet textile printing method, an application amount ratio of the reaction solution to the transparent ink composition may be 1:10 to 10:1.

In any aspect of the ink jet textile printing method, the fabric may be a fabric having fluffs.

In any aspect of the ink jet textile printing method, a value of a brightness $L^+$ in an $L^+a^+b^+$ color system of the fabric may be 70 or less.

In any aspect of the ink jet textile printing method, the pigment may be a white pigment.

In any aspect of the ink jet textile printing method, the aggregating agent may contain an organic acid, and may contain the organic acid in an amount of 1% to 6% by mass with respect to the total amount of the reaction solution.

In any aspect of the ink jet textile printing method, the pressure applying step may be performed by direct contact between the fabric and a pressure applying unit.

In any aspect of the ink jet textile printing method, the reaction solution may contain a surfactant, and a content of the surfactant may be 2.0% by mass or less with respect to the total amount of the reaction solution.

In any aspect of the ink jet textile printing method, the pressure applying step may be performed before the colored ink attaching step.

In any aspect of the ink jet textile printing method, the pressure applying step may be performed within 30 minutes after the transparent ink attaching step.

In any aspect of the ink jet textile printing method, the reaction solution attaching step and the transparent ink attaching step may be performed using an ink jet method.

In any aspect of the ink jet textile printing method, the reaction solution may have a pH of 2.0 or more.

In any aspect of the ink jet textile printing method, a total attachment amount of the reaction solution, the transparent ink composition, and the colored ink compositions may be 100 mg/inch$^2$ or more.

An aspect of the ink set is an ink set used in the ink jet textile printing method according to any of the aspects, the ink set including: the reaction solution; the transparent ink composition; and the colored ink composition.

The present disclosure is not limited to the above-described embodiments, and various modifications can be made. For example, the present disclosure includes a configuration substantially the same as the configuration described in the embodiments, for example, a configuration having the same function, method, and effect, or a configuration having the same object and effect. Furthermore, the present disclosure includes configurations in which non-essential parts of the configuration described in the embodiments are replaced. In addition, the present disclosure includes configurations that achieve the same operational effects or configurations that can achieve the same objects as those of the configurations described in the embodiments. Moreover, the present disclosure includes configurations in which a known technology is added to the configurations described in the embodiments.

What is claimed is:

1. An ink jet textile printing method comprising:

a reaction solution attaching step of attaching a reaction solution containing an aggregating agent that aggregates components in an ink, and water to a fabric using an ink jet method;

a transparent ink attaching step of attaching a transparent ink composition containing anionic resin particles and water to a fabric using the ink jet method; and a colored ink attaching step of attaching a colored ink composition containing a pigment, resin particles, and water onto a region to which the transparent ink composition is attached, using the ink jet method, wherein the reaction solution attaching step and the transparent ink attaching step include Step 1, and in Step 1, a range of a minimum value of a total attachment amount of the reaction solution and the transparent ink composition per unit area/per unit time is 34 mg/(s·inch$^2$) or more, Step 1: applying the reaction solution and the transparent ink composition to the same region in the fabric in a single scanning of an ink jet head.

2. The ink jet textile printing method according to claim 1, wherein

Step 1 is performed a plurality of times, the reaction solution attaching step and the transparent ink attaching step include Step 2, and Step 2 is performed between Steps 1 performed a plurality of times, Step 2: transporting the fabric in a direction that intersects a direction of the scanning.

3. The ink jet textile printing method according to claim 1, wherein the pigment is a white pigment.

4. The ink jet textile printing method according to claim 1, wherein a viscosity of a mixed liquid obtained by mixing the reaction solution and the transparent ink composition in equal amounts is 50 mPa·s or more.

5. The ink jet textile printing method according to claim 1, wherein the reaction solution attaching step is performed simultaneously with the colored ink attaching step.

6. The ink jet textile printing method according to claim 1, wherein the colored ink attaching step is performed in a scanning different from that in the transparent ink attaching step.

7. The ink jet textile printing method according to claim 1, further comprising:

a second transparent ink attaching step of attaching a second transparent ink composition containing anionic resin particles and water onto the region of the fabric, to which the colored ink composition is attached, using an ink jet method.

8. The ink jet textile printing method according to claim 1, wherein at least one of the pigment and the resin particles in the colored ink composition is anionic.

9. The ink jet textile printing method according to claim 1, wherein the resin particles in the colored ink composition are a urethane resin or an acryl resin.

10. The ink jet textile printing method according to claim 1, wherein the colored ink composition further contains 3.0% by mass or more of an organic solvent having a normal boiling point of 250° C. or higher.

11. The ink jet textile printing method according to claim 1, wherein the fabric has an $L^+$ of 75 or less, and is cotton, a polyester, or a blend of cotton and a polyester.

12. The ink jet textile printing method according to claim 1, wherein the reaction solution has a pH of 2.0 or more.

13. The ink jet textile printing method according to claim 1, wherein in a region in the fabric, to which the reaction solution, the transparent ink composition, and the colored ink composition are attached, a total attachment amount of the reaction solution, the transparent ink composition, and the colored ink composition is 100 mg/inch$^2$ or more.

14. A set used in the ink jet textile printing method according to claim 1, the set comprising:

the reaction solution;

the transparent ink composition; and the colored ink composition.

15. An ink jet textile printing method comprising:

a reaction solution attaching step of attaching a reaction solution containing an aggregating agent that aggregates components in an ink, and water to a fabric;

a transparent ink attaching step of attaching a transparent ink composition containing anionic resin particles that react with the aggregating agent and are aggregated, and water to the fabric;

a colored ink attaching step of attaching a colored ink composition containing a pigment, resin particles, and water onto a region of the fabric, to which the transparent ink composition is attached, using an ink jet method; and a pressure applying step of applying pressure to a region of the fabric, to which the reaction solution and the transparent ink composition are attached, after the reaction solution attaching step and the transparent ink attaching step, wherein the fabric is mounted on a mounting table, and the reaction solution attaching step, the transparent ink attaching step, the pressure applying step, and the colored ink attaching step are performed without changing a relative positional relationship between the fabric and the mounting table between the respective steps.

16. The ink jet textile printing method according to claim 15, wherein a time difference between the attachment of the reaction solution and the attachment of the transparent ink composition in the same region of the fabric is within 30 seconds.

17. The ink jet textile printing method according to claim 15, wherein the reaction solution attaching step and the transparent ink attaching step include Step 1, Step 1: applying the reaction solution and the transparent ink composition to the same region in the fabric in the same single scanning.

18. The ink jet textile printing method according to claim 15, wherein a viscosity of each of the reaction solution and the transparent ink composition is 3 to 8 mPa·s at 20° C., and a viscosity of a mixed liquid of the reaction solution and the transparent ink composition in equal amounts is 50 mPa·s or more at 20° C.

19. The ink jet textile printing method according to claim 15, wherein a total application amount of the reaction solution and the transparent ink composition is 0.02 g/inch$^2$ or more.

20. An ink set used in the ink jet textile printing method according to claim 15, the ink set comprising:

the reaction solution;

the transparent ink composition; and the colored ink composition.

* * * * *